United States Patent [19]

Bass et al.

[11] 4,236,964
[45] Dec. 2, 1980

[54] CONFINEMENT OF HIGH TEMPERATURE PLASMAS

[75] Inventors: Robert W. Bass, Provo; Helaman R. P. Ferguson, Orem, both of Utah; Harvey J. Fletcher, Coltsneck, N.J.; John H. Gardner, Provo, Utah; B. Kent Harrison, Provo, Utah; Kenneth M. Larsen, Provo, Utah

[73] Assignee: Brigham Young University, Provo, Utah

[21] Appl. No.: 515,859

[22] Filed: Oct. 18, 1974

Related U.S. Application Data

[63] Continuation-in-part of Ser. No. 300,781, Oct. 25, 1972, abandoned.

[51] Int. Cl.$^2$ ................................. G21B 1/00
[52] U.S. Cl. ........................ 176/3; 315/117.5
[58] Field of Search ........................ 176/1–3, 176/5; 315/111.7

[56] References Cited

U.S. PATENT DOCUMENTS

| | | | |
|---|---|---|---|
| 3,009,080 | 11/1961 | Loos | 176/3 |
| 3,088,894 | 5/1963 | Koenig | 176/1 |
| 3,219,534 | 11/1965 | Furth | 176/1 |
| 3,278,384 | 10/1966 | Lenard et al. | 176/1 |
| 3,663,362 | 5/1972 | Stix | 176/2 |
| 3,677,890 | 7/1972 | Hartman | 176/1 |
| 3,692,626 | 9/1972 | Ohkawa | 176/3 |

OTHER PUBLICATIONS

Soviet Physics–Technical Physics, vol. 7, No. 3, 9/62, pp. 187–191, by Skornyakov.
Physics of Fluids, vol. 9, 1966, pp. 2295–2296, by Yoshikawa et al.
Technology Review 12/76, pp. 20–24, 33–39, 41–43.
MATT-1050, 8/74, pp. 526–529.
ERDA-28, 1/75, pp. 1–3, 8–10.
Bulletin of the American Physical Society, 11-16-71, p. 1239, by Bass.
Proceedings of the Utah Academy of Sciences, Arts & Letters, vol. 50, part 2, 1973, by Gardner et al., pp. 1–11.

*Primary Examiner*—Harvey E. Behrend
*Attorney, Agent, or Firm*—Jules P. Kirsch

[57] ABSTRACT

A high temperature plasma is magnetically confined without leaks or cusps in a smooth toroidal configuration by tangential magnetic field lines on its surface which have a zero rotation number, and include a selected finite even non-zero number of closed toroidal magnetic field lines, which are limit cycles in the sense that all other surface field lines are asympototic to neighboring pairs of these closed field lines, and the poloidal cross-section of the plasma is non-convex. The resulting unique structure makes the confined plasma relatively insensitive to approximations, tolerances, and variations in the parameters of design, construction and operation. Furthermore, use of the sense of averaging appropriate to evaluation of interchange instabilities shows that the resulting magnetic bottle is an optimal toroidal magnetic well.

10 Claims, 51 Drawing Figures

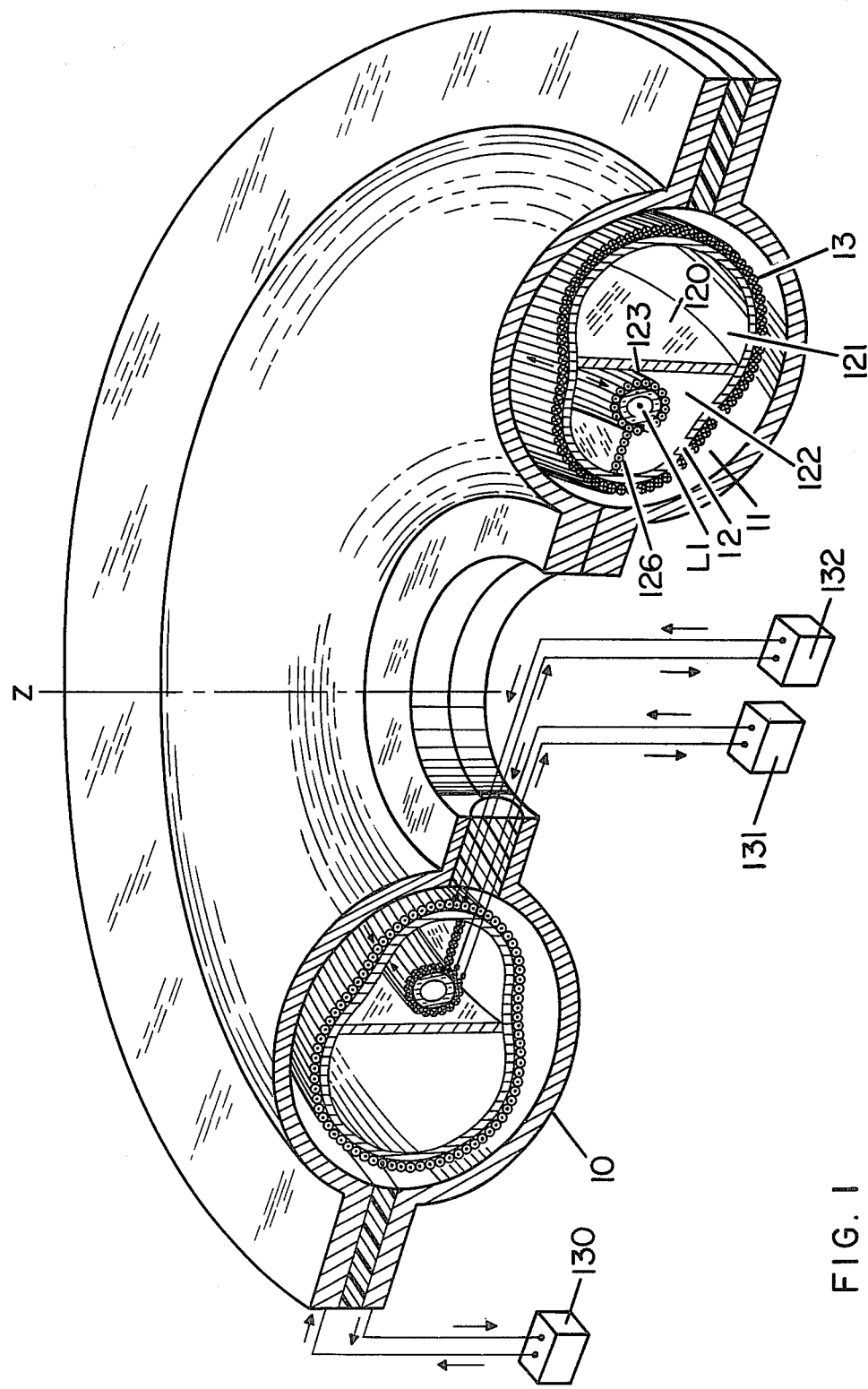
FIG. I

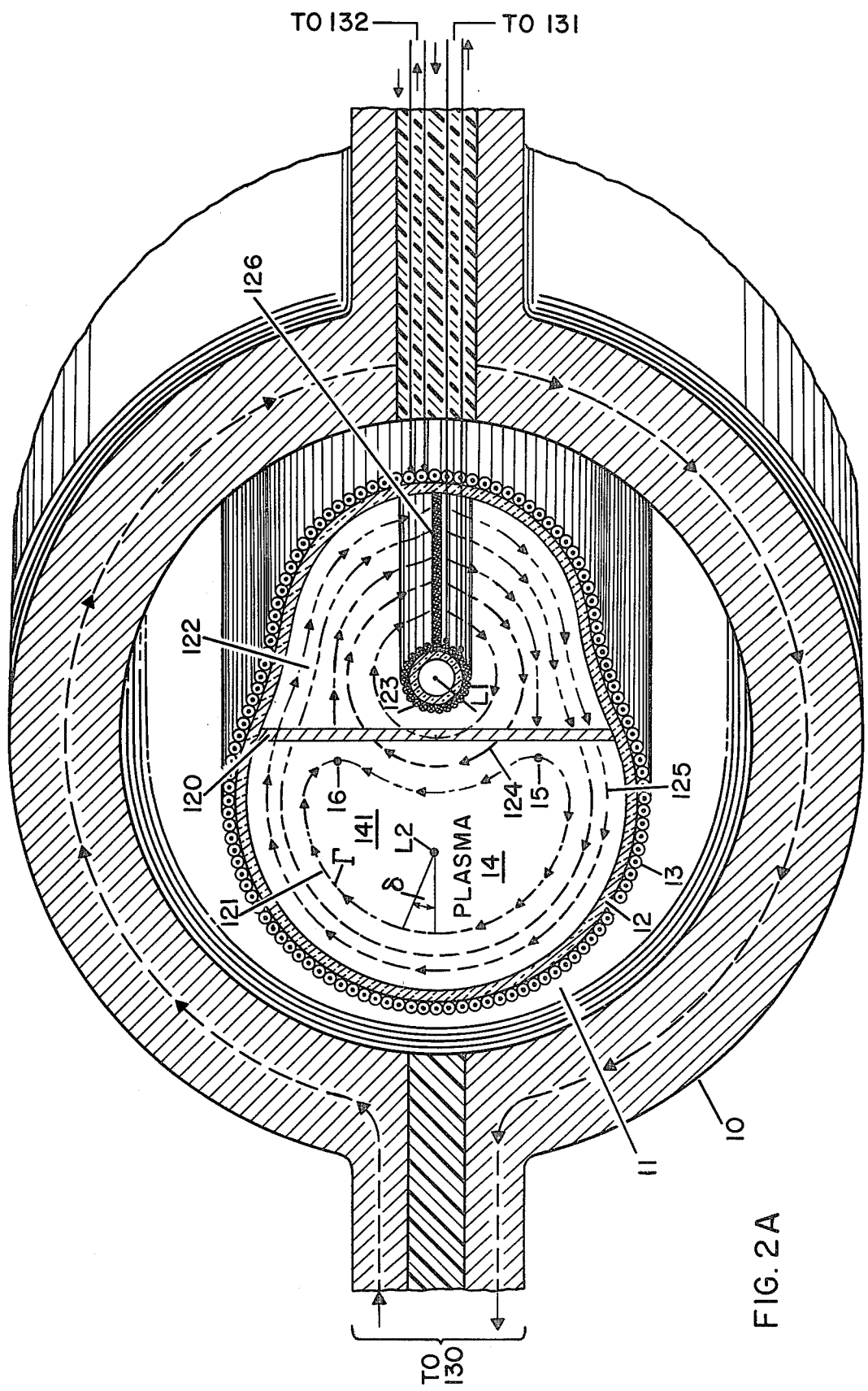

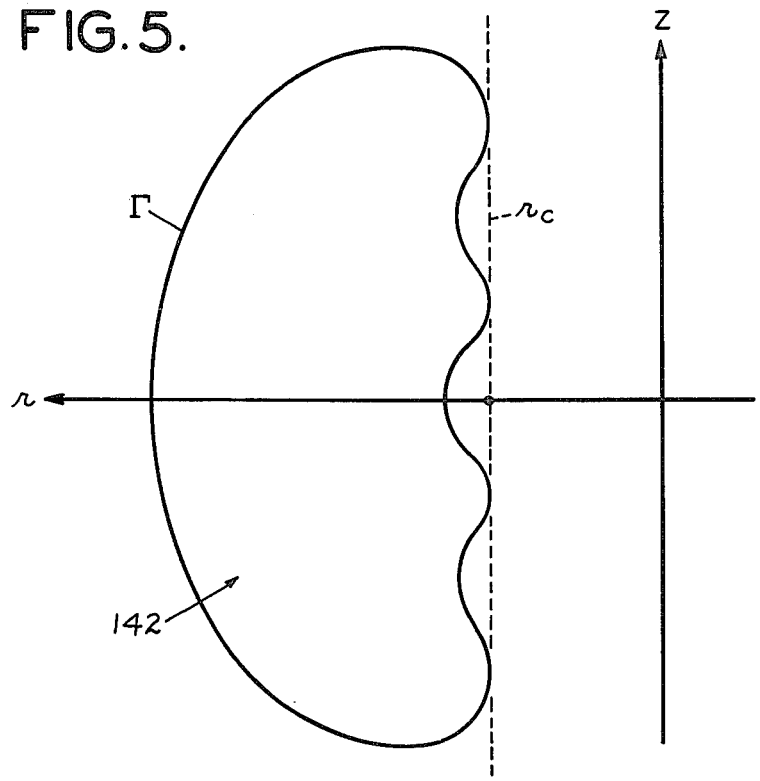
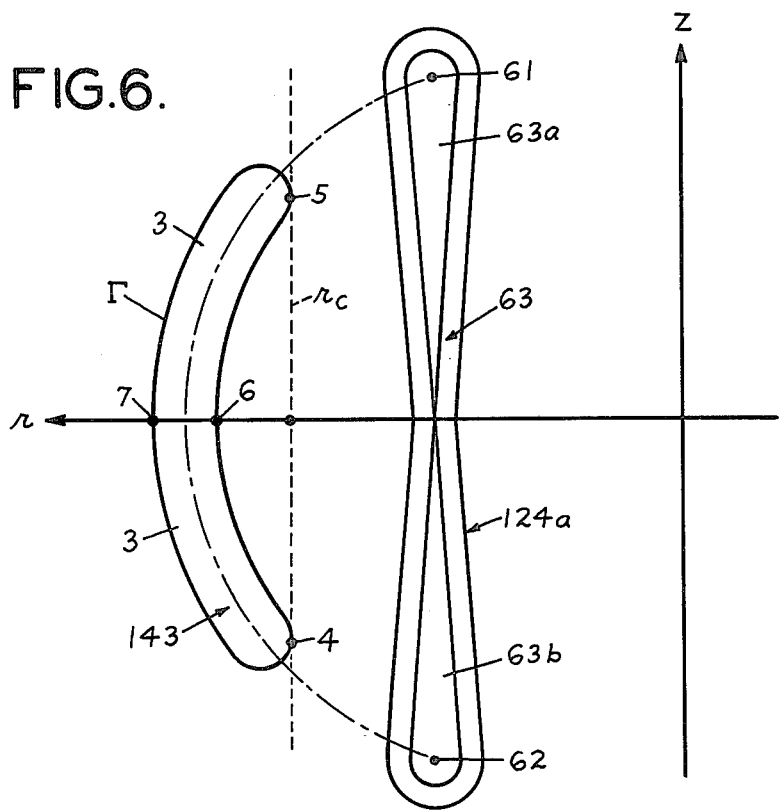

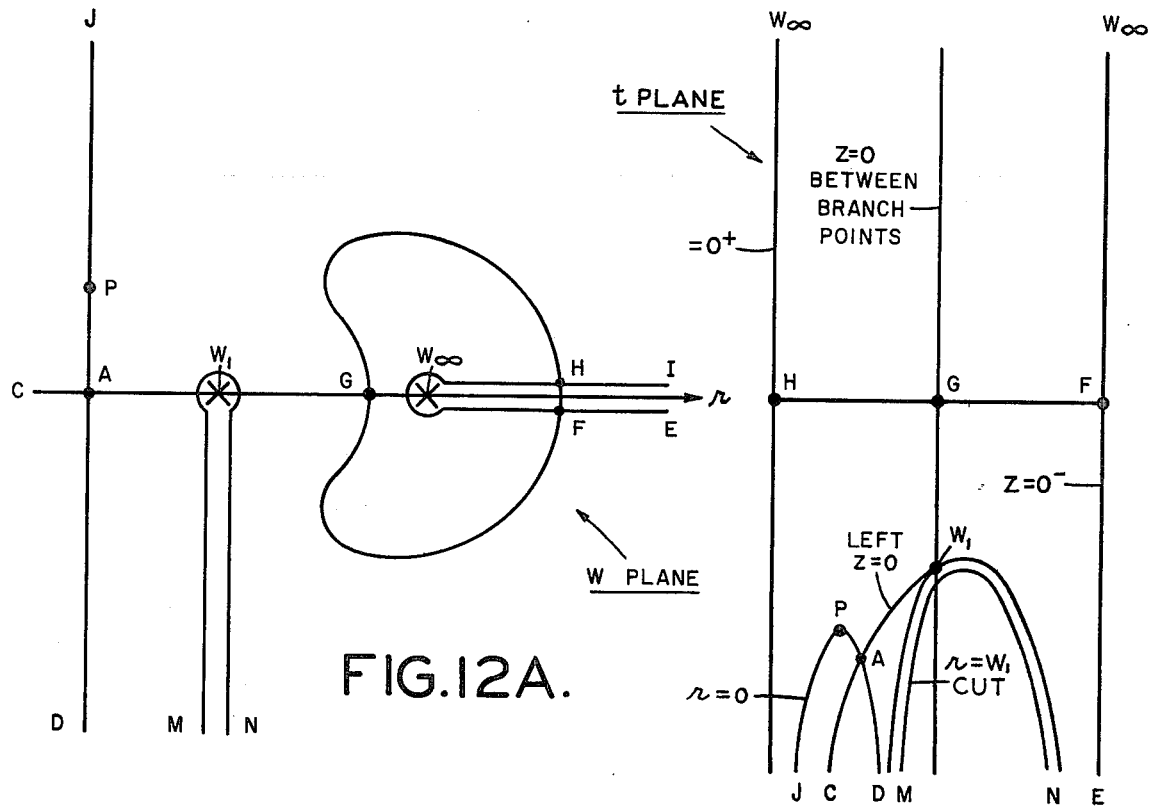
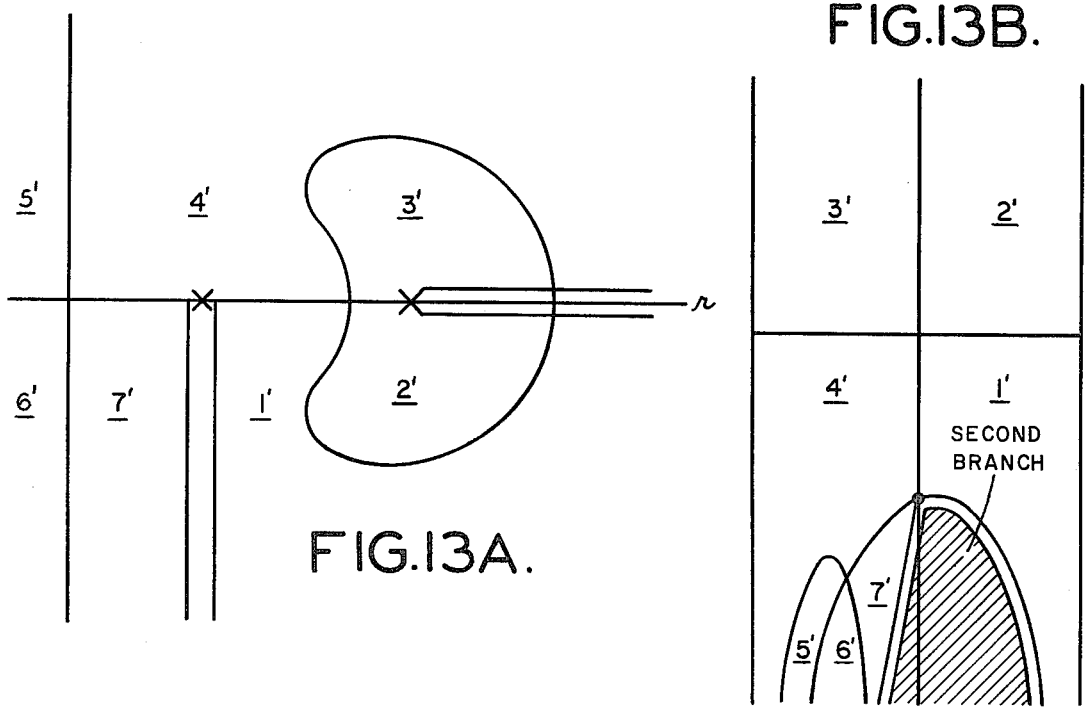

FIG.14A.
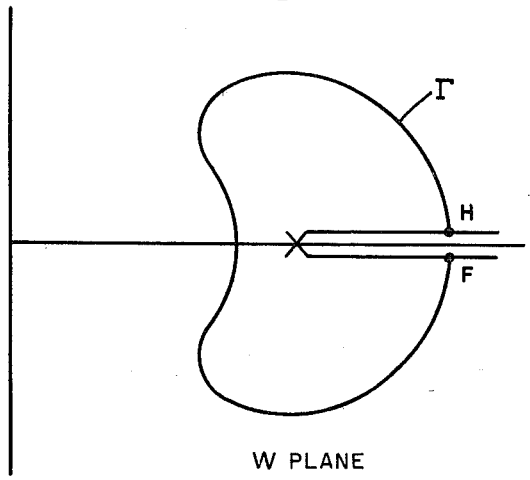
W PLANE
FIG.14B.
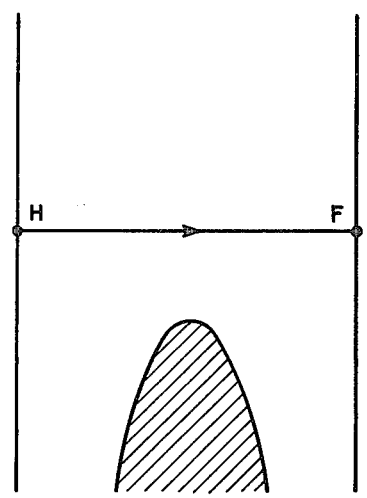
t PLANE
FIG.15.
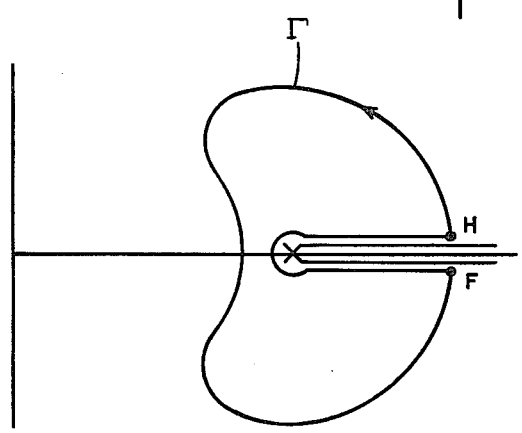
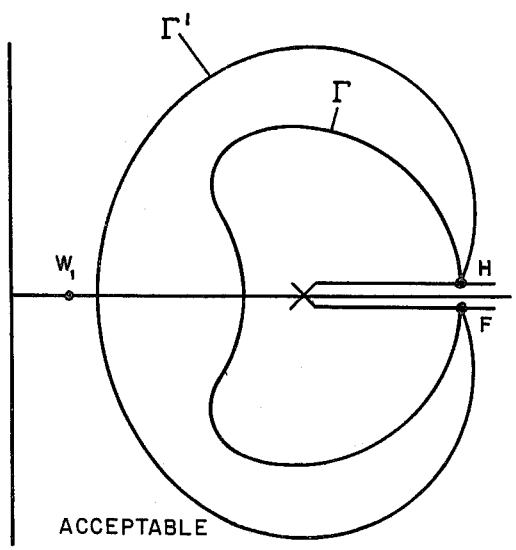
ACCEPTABLE
FIG.16A.
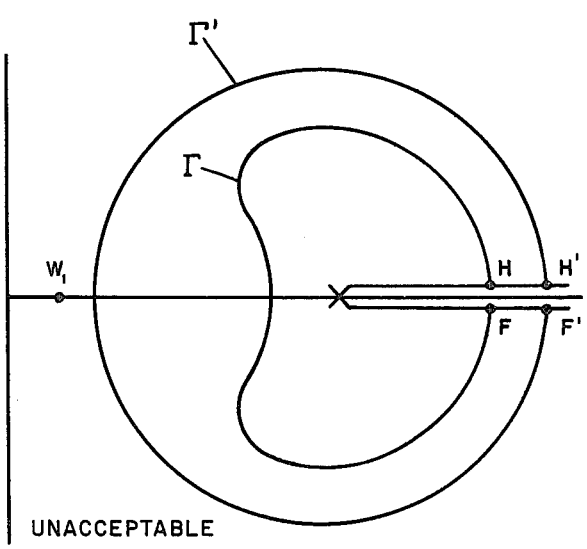
UNACCEPTABLE
FIG.16B.

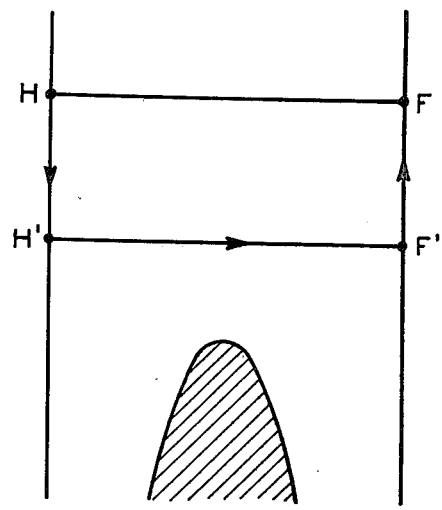
FIG.17.
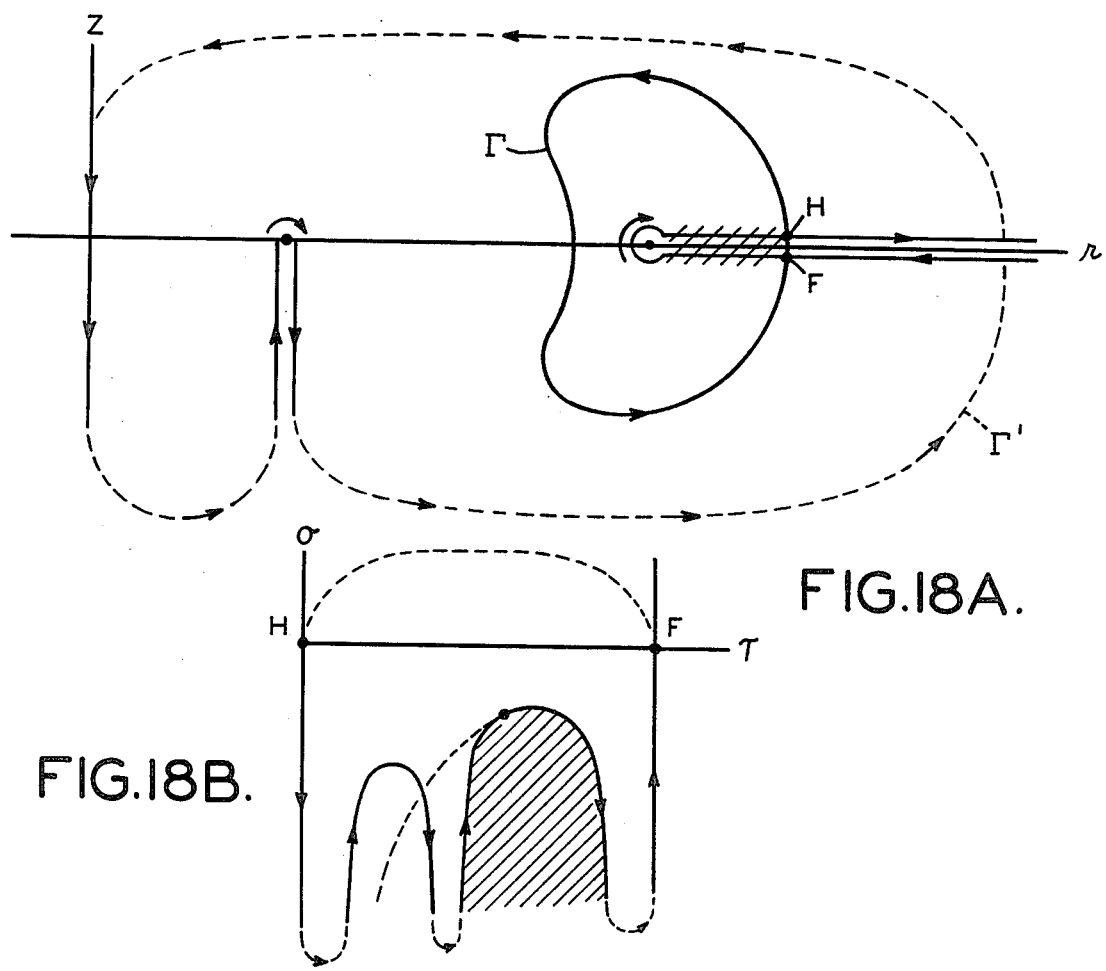
FIG.18A.
FIG.18B.

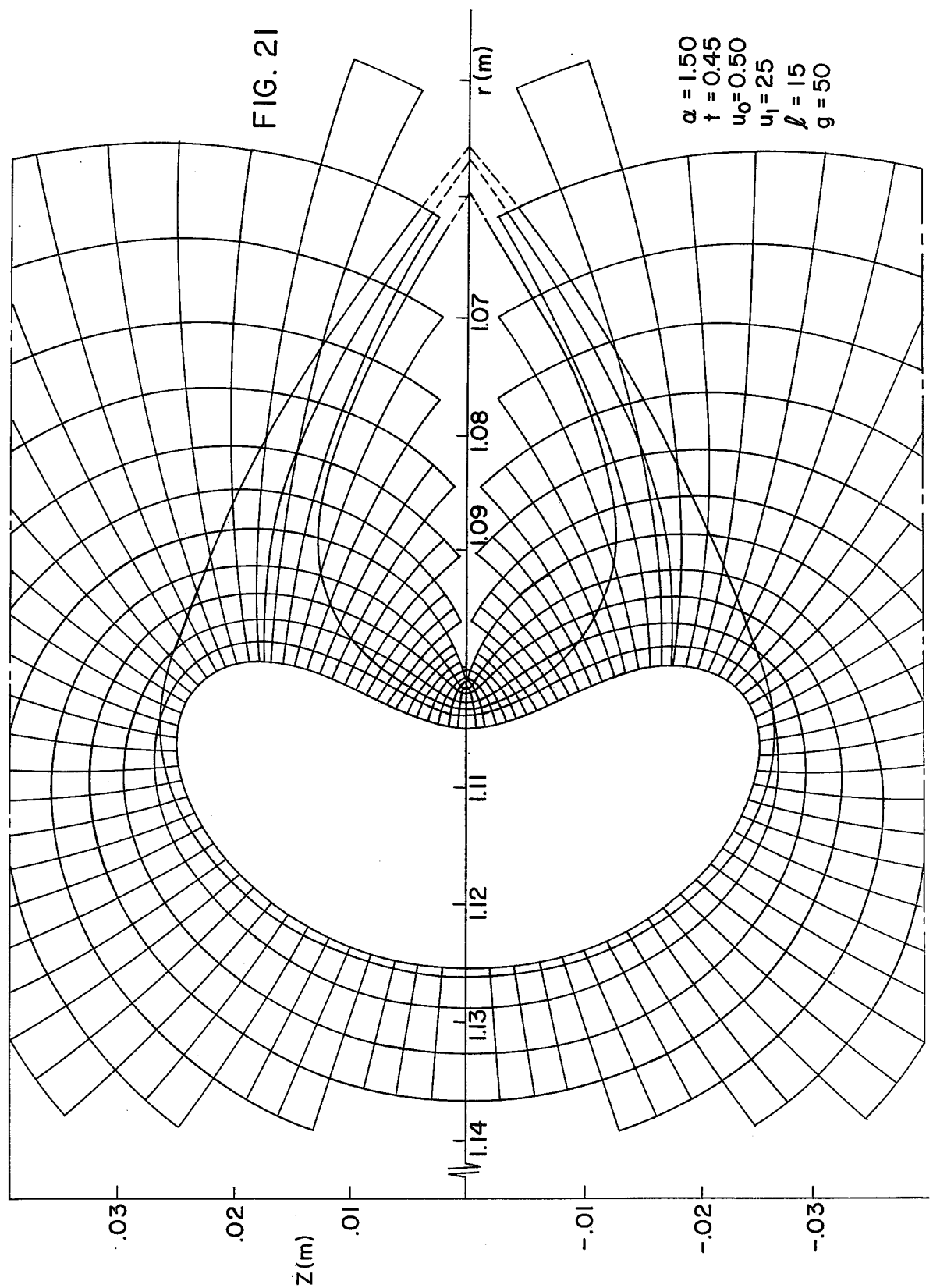

FIG.24.
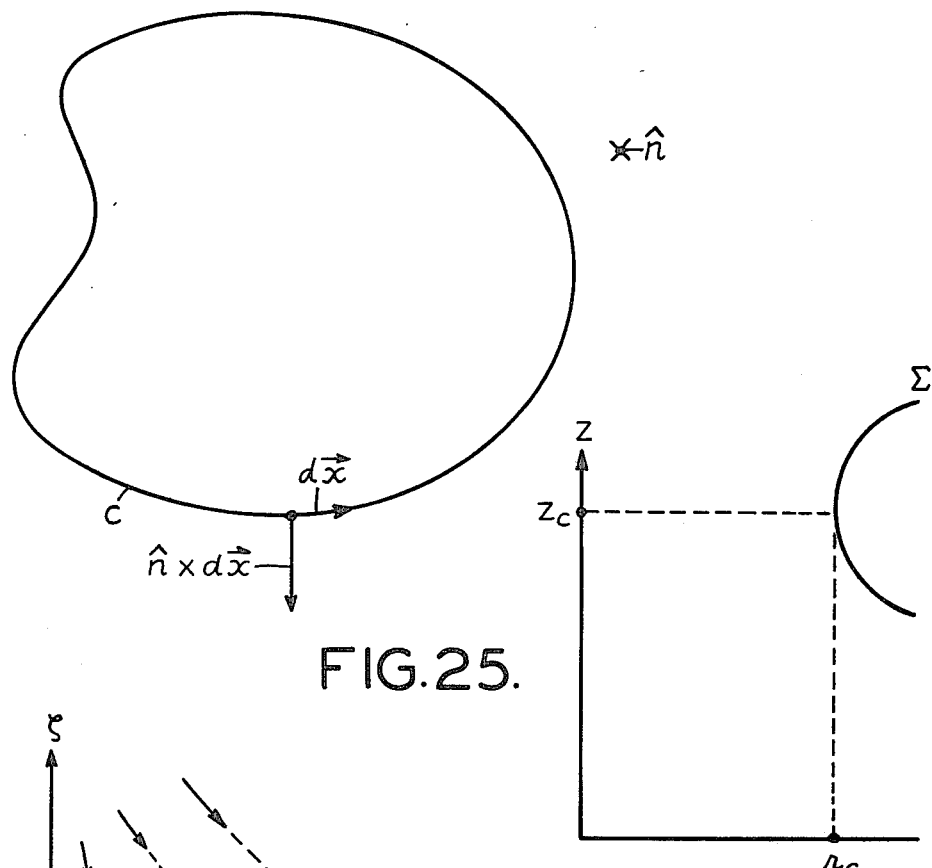
FIG.25.
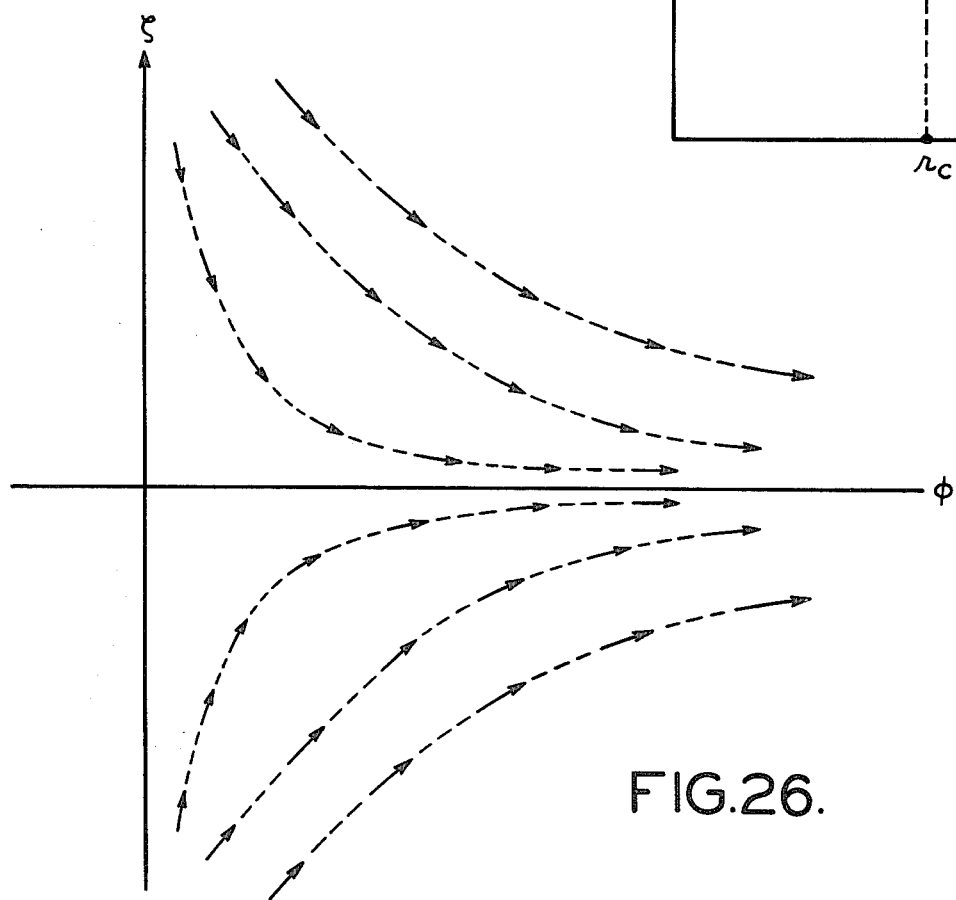
FIG.26.

CONFINEMENT OF HIGH TEMPERATURE PLASMAS

BACKGROUND OF THE INVENTION

This application is a continuation in part of application Ser. No. 300,781, filed Oct. 25, 1972, now abandoned, entitled "Confinement of High Temperature Plasmas."

The production of useful energy by nuclear fusion has been the subject of extensive research in a number of different countries for approximately twenty years. A recent world-wide survey of various fusion research facilities and the fusion devices at those facilities is reported in "World Survey of Major Facilities in Controlled Fusion" (Amasa S. Bishop ed. 1970). However, although many different approaches have been suggested and tried, no one has yet succeeded in producing controlled nonexplosive energy in useful quantities by nuclear fusion.

Research on the generation of energy by nuclear fusion has centered on the problem of confining within a vacuum relatively low density gases, such as deuterium, which have been raised to temperatures sufficiently high for fusion reactions to take place. At the temperatures required for fusion reactions to take place, such gases become fully ionized and are referred to as plasmas, and the inability to confine such high temperature plasmas for a sufficiently long time to obtain more energy from fusion reactions within the plasma than is supplied to the plasma, has been the principal obstacle to the useful production of nonexplosive energy by nuclear fusion.

A number of arrangements have been proposed for confining high temperature plasmas within a vacuum, most of which are based upon using one or more magnetic fields which exert forces on the electrically charged particles composing the plasmas. Several of these magnetic confinement arrangements, sometimes referred to by the term "magnetic bottles," are disclosed in "Progress Toward Fusion Power," Fowler and Post, 215 *Scientific American* 27 (1966); "The Prospects of Fusion Power", Gough and Eastlund, 224 *Scientific American* 50 (1971); "The Road to Controlled Nuclear Fusion", Artsimovich, 239 *Nature* 18 (1972); and U.S. Pat. Nos. 3,009,080 granted to H. G. Loos on Nov. 14, 1961, and 3,088,894 granted to H. R. Koenig on May 7, 1963. However, none of these magnetic confinement schemes has been capable of maintaining the confinement of a plasma for more than brief periods which are too short to be of practical usefulness in the production of energy. The inability of known magnetic confinement schemes to maintain the confinement of plasmas for more than very brief periods has been attributed to the unstable nature of plasmas, and has led to the investigation of the possible instabilities of various plasma configurations, and of techniques for overcoming these instabilities. See, for example, *Elementary Plasma Physics*, Arzimovich (1963, 1965), Chapter 8.

One of the widely used techniques attempted for the confinement of plasmas is to form the plasma in a toroidal vessel so that the plasma is shaped into a ring shaped loop resembling a "doughnut". Examples of variations of this technique are the "Stellarator", "Scyllac" and "Tokomak" machines described in the above-mentioned articles, and the apparatus disclosed in the above-mentioned Loos and Koenig U.S. Pat. Nos. 3,009,080 and 3,088,894. Although this technique and its variations have been known and used for a number of years, long term plasma stability sufficient for the production of useful energy by nuclear fusion has not yet been achieved.

BRIEF SUMMARY OF THE INVENTION

This invention relates to the generation of energy by nuclear fusion, and in particular to the confinement of high temperature plasmas sufficiently long for the energy generated by fusion reactions within such a plasma to exceed the energy supplied to the plasma both to compensate for plasma energy losses, and, if necessary, to maintain the plasma at a sufficiently high temperature.

The present invention provides a solution to the problem of confining a high temperature plasma sufficiently long to obtain useful energy by nuclear fusion, based upon the discovery that there exists a class of toroidal magnetic confinement arrangements characterized by "structural stability". "Structural stability" is defined as that property of plasmas confined by the class of magnetic confinement arrangements of this invention, which makes such plasmas relatively insensitive, for sufficiently long periods of time, to approximations, tolerances and variations in the parameters of design, construction and operation of such arrangements.

The class of magnetic confinement arrangements of this invention is characterized by the provision of magnetic field lines at the surface of a toroidal plasma which satisfy the requirements of static structural stability. These requirements include the conditions that only a finite number of magnetic field lines are closed. In addition, in order to prevent plasma leaks, it is further required that the magnetic field be everywhere non-zero. Finally, for reasons explained in detail in the following description, it is required that the limit cycles of the magnetic field lines be even and non-zero in number and that the rotational transform angle of the magnetic field lines be identically and persistently zero. Magnetic field lines that satisfy these requirements may be achieved by a set of current carrying conductors properly arranged with respect to the exterior of the plasma so that the resulting field lines generated at the surface of the plasma by the currents within the conductors include an even finite number of closed toroidal field lines which divide the plasma surface into a corresponding even number of toroidal regions, where the poloidal field lines in each region are opposite in direction to the poloidal field lines on the adjacent region or regions and the rotational transform angle of all the magnetic field lines in all of the regions is zero. Toroidal plasmas confined by such magnetic field lines constitute a class of plasmas in which each of the members of the class is characterized by a non-convex poloidal cross-section, for example, a cross-section resembling either a "kidney bean", that is, an approximation of the Limacon of Pascal, or a "banana" shaped curve, and in which the poloidal cross-section of such plasma has an even finite number of stagnation points which correspond in number and location to the closed magnetic field lines on the surface of the plasma.

BRIEF DESCRIPTION OF THE DRAWINGS

The present invention will be fully understood from the following detailed description of illustrative embodiments thereof taken in connection with the appended drawings, in which like reference characters designate like elements throughout the several drawings:

FIG. 1 is a schematic perspective view partially in section illustrating the various current conductors and other elements embodying the principles of this invention;

FIG. 2A is a cross-section of a portion of the elements shown in FIG. 1 in which the non-convex cross-section of the plasma is necessary for static structural stability for the reasons given in the following detailed description;

FIG. 5 is a cross-section of an alternative toroidal plasma configuration in accordance with the principles of this invention in which the number of poloidal stagnation points is equal to four;

FIG. 6 is a cross-section of another toroidal plasma configuration in accordance with the principles of this invention;

FIGS. 10 through 33 are graphs of assistance in following the descriptions in Part II, sub-parts A–M of the specification.

Figure 2B:
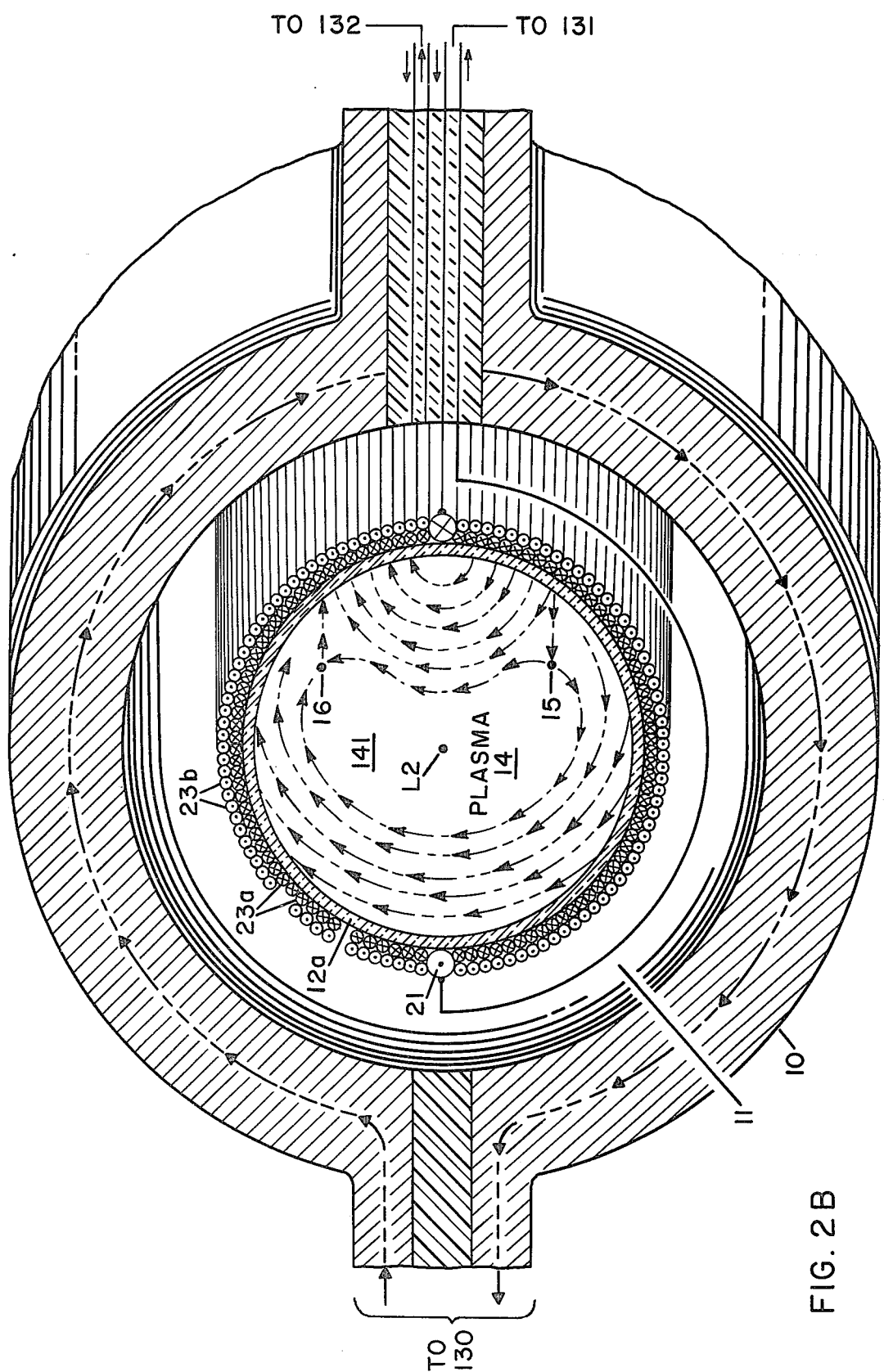
FIG. 2B is a cross-section of a portion of elements alternative to those shown in FIG. 2A.

To avoid unnecessarily complicating the drawings, the insulators or other means well known to those skilled in this art for maintaining the conductors in their proper positions have not been shown. For the same reason, power supplies shown in the drawings should be understood to be representative of a multiplicity of power supplies necessary to drive those several currents disclosed herein as required by the principles of this invention.

DETAILED DESCRIPTION OF THE INVENTION

PART I

APPARATUS EMBODYING THEORETICAL PRINCIPLES

Figure 3A:
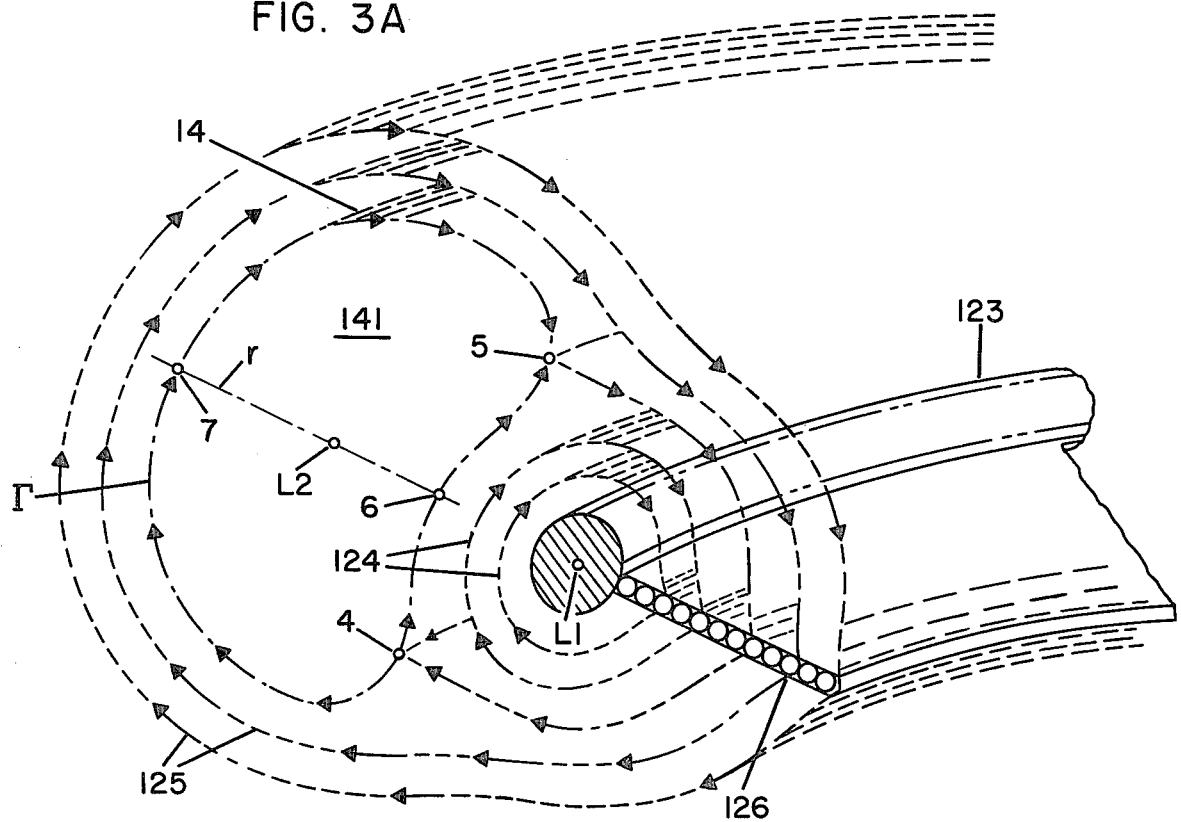
FIG. 3A is a perspective view showing in partial section the families of magnetic surfaces generated by the current conductors shown in FIG. 2A.

Referring to FIGS. 1 and 2, a hollow current carrying conductor 10, which may be either a single integral conductor or a plurality of segmented conductors, defines a toroidal chamber 11 within which there is mounted a suitably non-conductive toroidal envelope 12 formed of an electrically insulating, magnetically permeable material such as quartz or porcelain. Both conductor 10 and envelope 12 have a common axis Z which will be referred to in this specification and in the claims as "toroidal axis" or "axis of the toroid". The interior of envelope 12 is divided by internal wall 120 into two gas-tight chambers 121 and 122, and chamber 121 is filled with a suitable gas such as deuterium at a relatively low pressure, for example, on the order of one-thousandth of atmospheric pressure. Within chamber 122 there are mounted toroidal or azimuthal current carrying conductors 123 and 126 also having axis Z as their common toroidal axis. Conductor 123 may take the form of either a plurality of toroidal current carrying wires arranged about a longitudinal axis L1 and also having axis Z as a common toroidal axis, as shown by circles enclosing a dot in FIGS. 1 and 2, or a single toroidal current carrying conductor centered on longitudinal axis L1 as shown in FIG. 3A. Conductor 126 is embedded in an insulator which also serves as a support for 123, and conductor 126 may take the form of a plurality of current carrying wires as shown in FIGS. 1, 2A and 3A.

Mounted exteriorly of envelope 12 is a toroidal current carrying conductor 13 which may take the form of a plurality of toroidal current carrying wires illustrated by small circles each enclosing an "x" in FIGS. 1 and 2, all of which have axis Z as a common toroidal axis.

The gas within chamber 121 is first ionized to become a toroidal plasma, having Z as its toroidal axis, by any one of a number of well-known arrangements (not shown) such as those disclosed in "Controlled Thermonuclear Reactions", Glasstone & Lovberg, pp. 116–163 (1960). Following ionization of the gas within chamber 121 to form a plasma, current carrying conductors 10, 123 and 13 are respectively energized in the following manner by suitable capacitor banks 130, 131, 132 such as those shown in H. G. Loos U.S. Pat. No. 3,009,080, to confine the toroidal plasma within chamber 121 to have the configuration 14 illustrated in FIGS. 2A, 2B, 3A, 3B and 4A. Current is directed poloidally through conductor 10, that is, transversely around the toroidal chamber 11 enclosed by conductor 10 as shown by the arrows in FIGS. 2A and 2B. At the same time current is directed through conductors 123, 126 and 13, with current being directed through conductors 123 and 126 in a direction opposite to the direction of current through conductor 13. For example, current may be directed through conductor 13 in a counterclockwise direction around toroidal axis Z, as indicated in FIG. 1 by an "x" within the circles denoting the wires of conductor 13, whereas current is directed through conductors 123 and 126 in a clockwise direction around toroidal axis Z, as indicated in FIG. 1 by the dots within the circles denoting the wires of conductors 123 and 126.

Figure 3B:
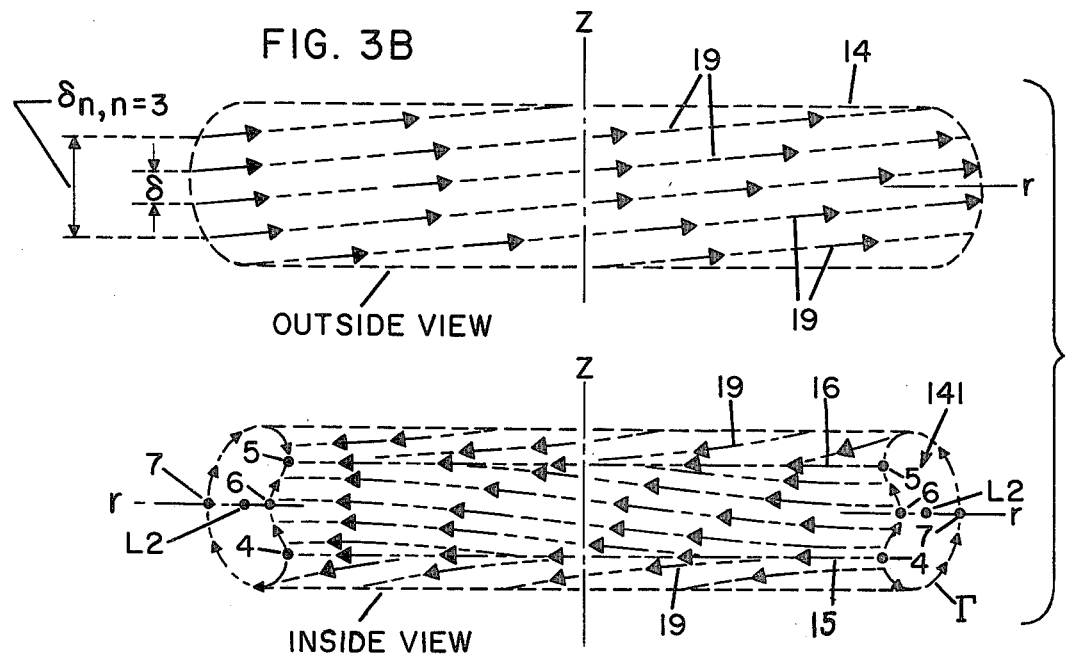
FIG. 3B is a pair of side views of a plasma confined in accordance with this invention, the upper of said pair of side views illustrating an outside view of the magnetic field lines on the outer or larger radius surface of said plasma, and the lower of said side views illustrating an inside view of the magnetic field lines and limit-cycles or closed magnetic field line orbits on the inner or smaller radius surface of said plasma.

As will be explained in detail in the following portions of this specification, the currents flowing through conductors 10, 123, 126 and 13 generate within the interior of envelope 12 sets or families of toroidal magnetic fields or surfaces 124 and 125, as indicated by the lines with arrows in FIG. 2A and by the examplary surfaces in FIG. 3A. The existence of two stagnation points, 4 and 5, in the poloidal component of the magnetic field is evident in FIG. 3A from the directions of the arrows which indicate the direction of the magnetic field lines produced by the currents in the plasma surface and in the wires 123 and 126. These currents also induce magnetic field lines 19 on the surface of plasma 14, as shown in FIG. 3B, the magnetic surfaces 124, 125 and the magnetic field lines 19 having certain properties required by this invention as defined below.

The magnetic field contributed by the current flowing through conductor 10 tends to displace the magnetic field lines 19 on the surface of plasma 14 inwardly toward its longitudinal axis L2, thereby tending to compress the plasma about its longitudinal axis L2, as well as to curve the magnetic field lines 19 on the surface of plasma 14 about toroidal axis Z. Currents in the wires 10, 123, 126 and 13 are adjusted pursuant to the criteria of static structural stability explained herein, thereby to yield the final equilibrium configuration of the magnetic field.

The magnetic field contributed by the current flowing through conductors 123 and 126 adjusted in accordance with the principles of this invention serves to provide a region on the inner surface of plasma 14, that is, on the surface nearer toroidal axis Z and the smaller radius or internal wall 120 of envelope 12, on which magnetic field lines 19 are curved or pushed toward the longitudinal axis L2 of plasma 14 to form a "dimple" so that the poloidal cross section of plasma 14 is non-convex. This region is illustrated in the lower side view of FIG. 3B by the area between lines 15 and 16. The non-convex poloidal cross section may take any one of several forms, for example, a "kidney bean" shape 141 as shown in FIG. 2A, 2B, 3A and 4B, a modified "kidney bean" shape 142 as shown in FIG. 5, or a "banana" shape 143 as shown in FIG. 6.

The magnetic field generated by conductor 13 acts upon plasma 14 to prevent outward movement of plasma 14 away from torodial axis Z toward the outer wall or larger radius side of chamber 121.

The combined effect of the magnetic field provided by currents through conductors 10, 123, 126, and 13 serves to confine plasma 14 so as to satisfy the requirements of static "structural stability" explained in detail in Part II of this specification.

Referring now to FIG. 3A, the two families or sets of magnetic fields or surfaces 124, 125 which are generated within envelope 12 by current through conductors 10, 123, 126 and 13, are characterized by the following properties. The family of magnetic fields 124 is nested toroidally about conductor 123, and the other family of magnetic fields 125 is nested toroidally between envelope 12 and the outer boundaries of both the family of magnetic fields 124 and plasma 14. The magnetic field lines enter and leave the vacuum volume surrounding plasma 14 from the conductor 126. There is discontinuity in the tangential component of the magnetic field at the point where the magnetic field lines enter and leave from conductor 126, and the magnitude of this discontinuity is determined by the specific values of the currents in the conductors 10, 123, 126 and 13. It will be observed in FIGS. 3A and 3B that the poloidal component of the magnetic field at the surface of plasma 14 is not uniform in direction, but is characterized by two oppositely directed magnetic fields. Thus on the inner segment 465 which comprises arc 4 to 6 plus arc 6 to 5 of the boundary Γ of the poloidal cross section of plasma 14, that is, on the boundary of the poloidal cross section of plasma 14 which is nearer conductor 123 and the toroidal axis Z of plasma 14, the poloidal mangetic field line has a direction which is opposite to the direction of the poloidal field line on the outer segment 475 which comprises arc 4 to 7 plus arc 7 to 5 of Γ which is adjacent the outer wall of envelope 12 and further away from the toroidal axis Z of plasma 14. As a result, the poloidal components of the mangetic field lines 19 on the surface of plasma 14 are divided into two groups, each following the direction of the next adjacent one of the two sets of magnetic fields 124, 125 generated within chamber 121. As shown in FIGS. 3A and 3B, the poloidal components of the magnetic field lines 19 on the inner segment 465 of boundary Γ have the same direction as adjacent magnetic surface family 124, while the poloidal components of the magnetic field lines 19 on the outer segment 475 of boundary Γ follow the direction of the adjacent magnetic surface family 125.

As explained in detail in Part II of this specification the rotational transform angle of the magnetic field lines 19 on the surface of plasma 14 is required by the principles of this invention to be identically and persistently zero for all sufficiently small deviations in the parameters of the overall system. This requirement is illustrated in FIGS. 2A and 3B, in which the magnetic field lines 19 on the plasma surface are divided into two regions by magnetic field lines 15 and 16 on the surface of plasma 14. Field lines 15 and 16 are "closed", that is, they describe a closed circular, toroidal orbit on the surface of plasma 14. In accordance with principles of this invention as set forth in Part II of this specification, the number, N, of closed magnetic field lines such as 15, 16 must be even, that is, N=2, 4, 6, ..., and these closed field lines divide the surface of plasma 14 into a corresponding number of N toroidal regions. Thus as illustrated in FIG. 3B (inside view), the two closed magnetic field lines 15 and 16 divide the surface of plasma 14 into a corresponding pair of toroidal regions. It is explained in Part II how to compute the current strengths in conductors 10, 123, 126 and 13 in order to achieve a magnetic field on the surface of plasma 14 with these required properties.

Within the plasma surface regions between the closed magnetic field lines, all other magnetic field lines describe non-closed toroidal paths which asymptotically approach or depart from the closed field lines. This is illustrated, for example, in FIG. 3B (inside view), in which the non-closed magnetic field lines 19 asymptotically depart from closed field line 15 and asymptotically approach closed field line 16 but do not cross either of closed lines 15 and 16. FIGS. 2A and 3B also illustrate that the path of a non-closed field line 19 is displaced by a finite angle, δ, during each orbit around the circumference of plasma 14. This angle cannot exceed 2π or 360° during any given orbit around the circumference of plasma 14 because no non-closed magnetic field line 19 can cross closed lines 15 and 16. The total displacement angle $\delta_n$ after n circuits of a magnetic field line 19 around the circumference of plasma 14 cannot exceed 2π for the same reason.

By definition, the rotational transform angle of magnetic field lines 19 is the limit of the ratio of total displacement angle $\delta_n$ to 2πn, for an arbitrarily large value of n, that is $$\lim_{n \to \infty} \frac{\delta_n}{2\pi n}.$$

Because $\delta_n$ cannot exceed 2π in order to comply with the structural stability principles of this invention, the limit ratio $\delta_n/2\pi n$, for n arbitrarily large, is identically zero and remains persistently zero for non-closed magnetic field lines 19. In addition, because all of the closed field lines have zero rotational transform angles by virtue of their closed nature, the entire class of both closed and non-closed magnetic field lines on the surface of plasma 14 is characterized by a zero rotational transform angle. The requirement of a finite even number of closed field lines to which all other field lines on the surface are asymptotic is an important feature of the present invention. Hyperbolic stagnation points of the poloidal field must be produced at a critical radius disclosed herein by a specific configuration of external currents computed in accordance with the principles disclosed herein.

It is to be understood that a plasma characterized by structural stability, as defined in this specification, may be obtained by means for generating magnetic fields other than those specifically disclosed herein, but which follow the principles of this invention. Thus there may be positioned within the vacuum volume surrounding the plasma, conductors which are spatially arranged in locations other than or in place of all or a portion of conductors 13, 123, and 126, for example, as shown in FIG. 2B, a suitably arranged plurality of conductors 21, 22 and conductor pairs 23a, 24b which provide magnetic dipoles in the poloidal field. Either well-known analytical or numerical techniques may be employed to select and locate appropriate conductors; for example, see Part II of this specification and sub-parts C and D thereof.

It is also to be understood that although the arrangements shown in FIGS. 1 and 2A disclose conductors at or coincident with flux surfaces or flux singularities, for example, the outer member of the family of surfaces 125 or the inner member of 124, surfaces other than flux surfaces may be selected, in which case appropriately chosen conventional magnetic dipole devices may be employed as shown in FIG. 2B to provide the magnetic field which would otherwise be generated by conductors at the flux surfaces.

Example

Figure 34:
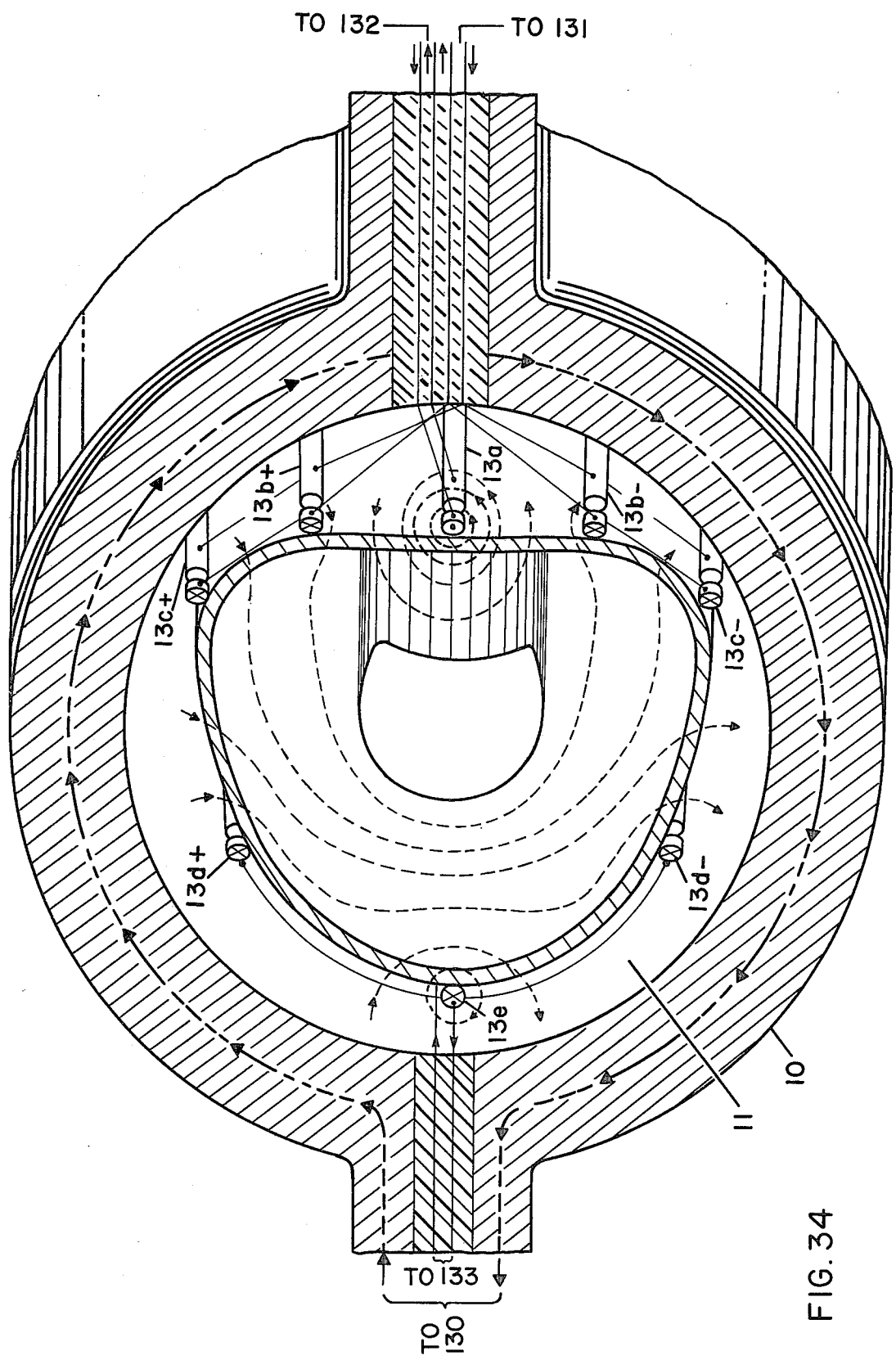
FIGS. 34, 35 and 36 illustrate a specific embodiment of the invention in which locations of wires and current values are shown.
Figure 35:
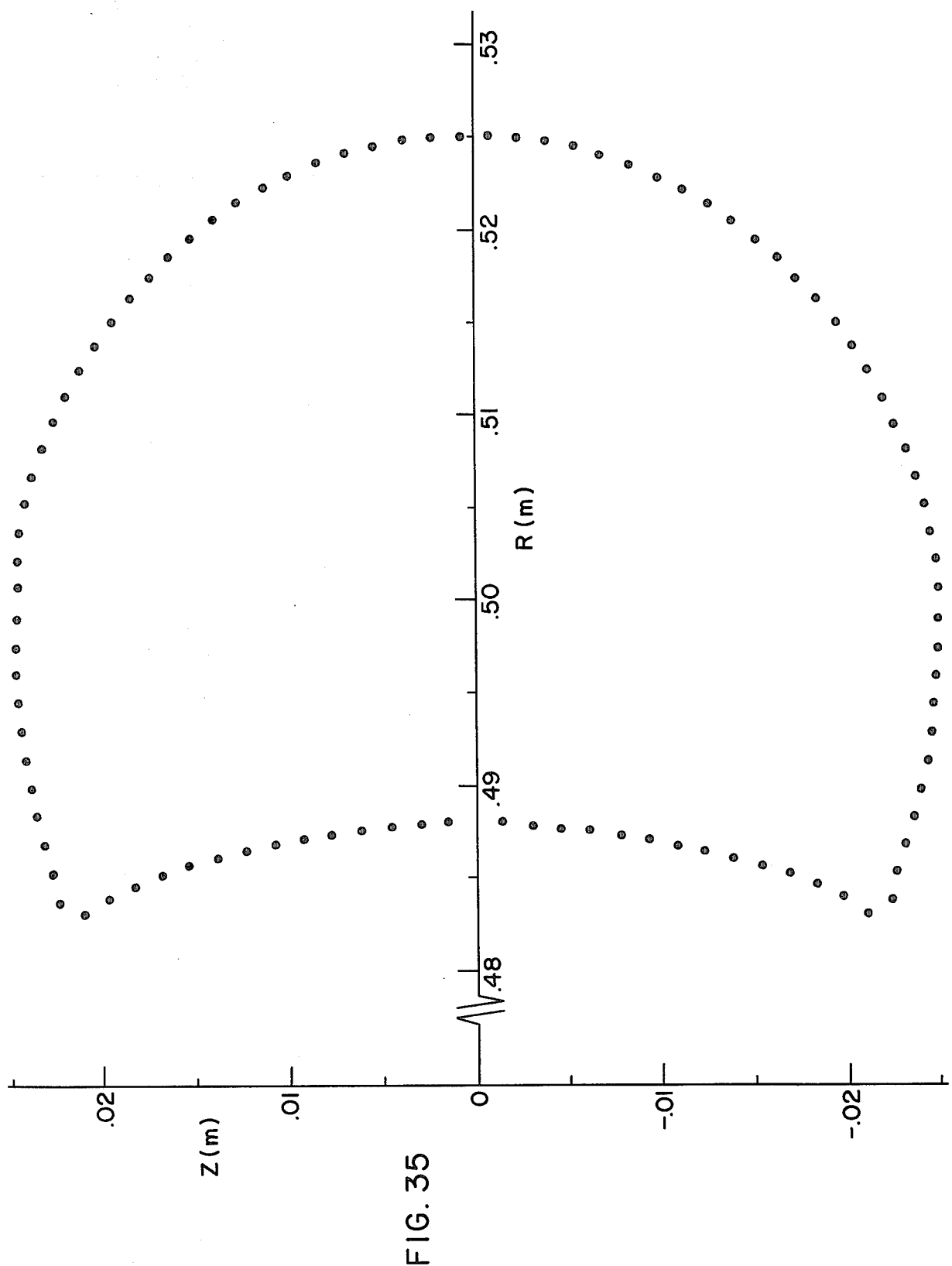
Figure 36:
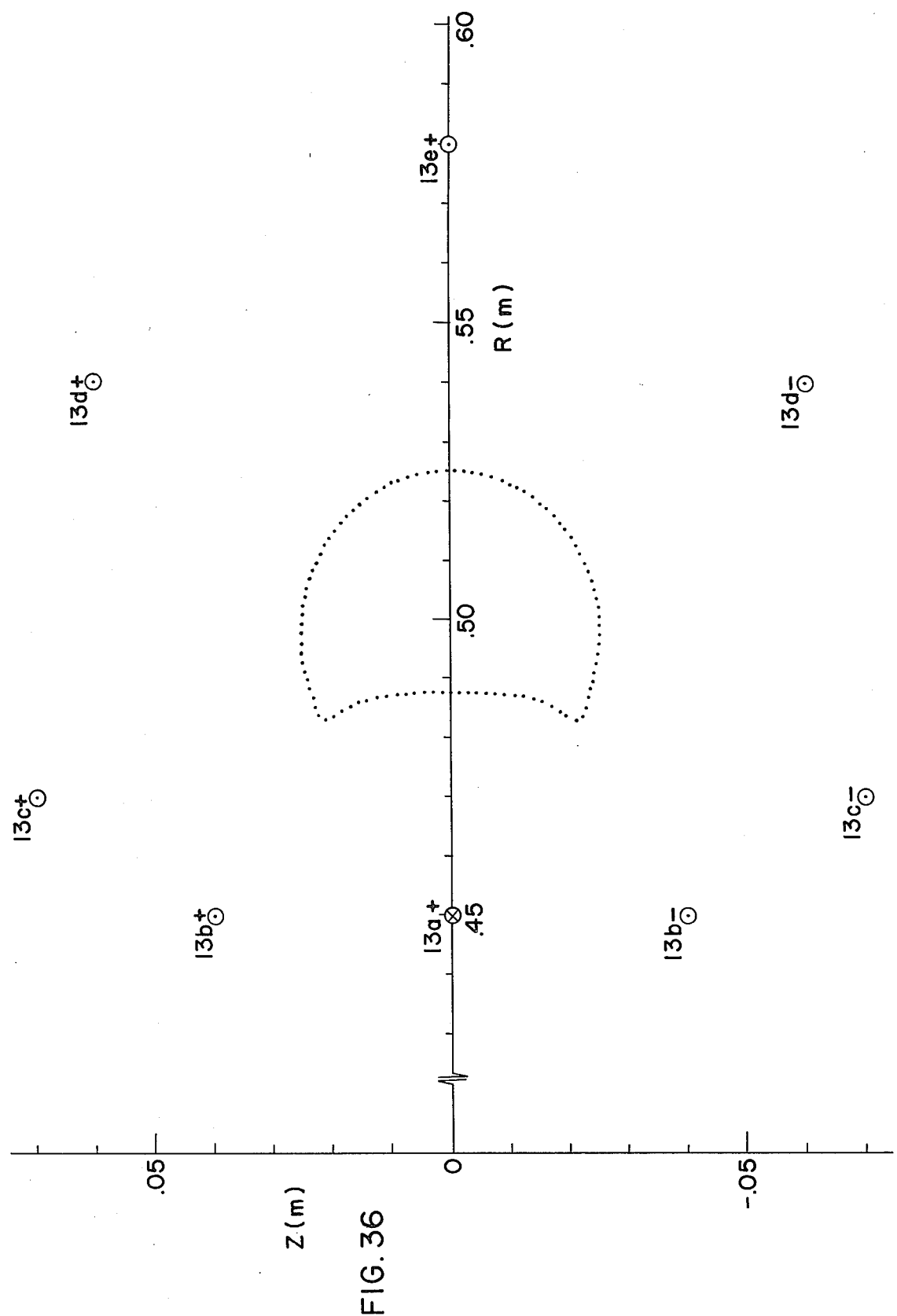

The poloidal cross-section of a toroidal plasma provided with topological stability in accordance with the principles of this invention is illustrated in FIGS. 34, 35, and 36. The plasma has an outside diameter of 1.02 meters and an overall height of 0.045 meters. The boundary, $\Gamma$, of the plasma cross-section is described by the set of position values given in Table I below. These position values were obtained in accordance with the principles of this invention by locating the conductors 13 to produce a tangent magnetic field constant in magnitude everywhere on the surface of the plasma.

The plasma equilibrium configuration for the embodiment shown in FIG. 35 may be obtained by magnetic induction, in which case the magnetic pressure is composed of two contributions, one toroidal and the other poloidal.

$$\frac{B^2}{2\mu} = \frac{B_t^2}{2\mu} + \frac{B_p^2}{2\mu} \quad (MKS \text{ units})$$

The toroidal contribution is:

$$\frac{B_t^2}{2\mu} = \frac{B_o^2 r_c^2}{2\mu r^2}$$

where $B_o$ and $r_c$ are initial values of the total equilibrium magnetic field magnitude on the plasma surface and the minimum radius of the plasma equilibrium boundary cross-section, respectively. The poloidal contribution is:

$$\frac{B_p^2}{2\mu} = \frac{\mu K^2}{2}$$

where the surface current density K is that of the boundary condition $$\hat{n} \times (\vec{B}_+ - \vec{B}_-) = \mu \vec{K}$$

(see Stratton, Electromagnetic Theory, McGraw-Hill, 1941.) The surface current density $K_n$ corresponding to the position of the $n^{th}$ conductor on the plasma surface is $$K_n = \frac{J_n}{\Delta l_n}$$

where $J_n$ is the current induced in that conductor and $\Delta l_n$ the length of boundary corresponding to that conductor allotted to it.

The locations and currents of the external conductors for the embodiment shown in FIG. 35 are given in Table II. FIG. 36 illustrates the position of the equilibrium plasma boundary r relative to the locations of the conductors 13a, 13b+, 13b−, 13c+, 13c−, 13d+, 13d−, 13e specified in Table II. (To avoid unnecessarily complicating the drawings of FIGS. 34 and 36, the insulators or other well known means for maintaining these conductors to their proper positions have not been shown). These currents correspond to a total magnetic field at the plasma of 200,000 Gauss. Lower magnetic fields would require proportionally lower currents.

TABLE I

Point Positions Of Plasma Boundary $\Gamma$ Shown in FIG. 35

| r (meter) | z (meter) |
|---|---|
| .5251 | ±.0007 |
| .5250 | ±.0023 |
| .5248 | ±.0039 |
| .5245 | ±.0054 |
| .5240 | ±.0070 |
| .5235 | ±.0084 |
| .5229 | ±.0099 |
| .5222 | ±.0113 |
| .5214 | ±.0127 |
| .5205 | ±.0140 |
| .5195 | ±.0152 |
| .5184 | ±.0164 |
| .5173 | ±.0175 |
| .5161 | ±.0185 |
| .5149 | ±.0195 |
| .5136 | ±.0204 |
| .5122 | ±.0213 |
| .5108 | ±.0220 |
| .5094 | ±.0227 |
| .5080 | ±.0233 |
| .5065 | ±.0238 |
| .5049 | ±.0243 |
| .5034 | ±.0246 |
| .5018 | ±.0249 |
| .5003 | ±.0251 |
| .4987 | ±.0252 |
| .4971 | ±.0252 |
| .4955 | ±.0251 |
| .4940 | ±.0249 |
| .4924 | ±.0247 |
| .4908 | ±.0244 |
| .4893 | ±.0240 |
| .4878 | ±.0236 |
| .4863 | ±.0232 |
| .4847 | ±.0227 |
| .4832 | ±.0225 |
| .4832 | ±.0209 |

TABLE I-continued

Point Positions Of Plasma Boundary Γ Shown in FIG. 35

| r (meter) | z (meter) |
|---|---|
| .4840 | ±.0195 |
| .4847 | ±.0181 |
| .4852 | ±.0166 |
| .4857 | ±.0151 |
| .4862 | ±.0136 |
| .4866 | ±.0120 |
| .4869 | ±.0105 |
| .4872 | ±.0089 |
| .4874 | ±.0074 |
| .4876 | ±.0058 |
| .4878 | ±.0042 |
| .4879 | ±.0027 |
| .4878 | ±.0011 |

TABLE II

Locations And Currents Of External Conductors Shown in FIG. 36

| Wire | r (meters) | z (meters) | current (amps) |
|---|---|---|---|
| 13a | .45 | 0 | +600,000 |
| 13b+ | .45 | +.04 | −130,000 |
| 13b− | .45 | −.04 | −130,000 |
| 13c+ | .47 | +.07 | −130,000 |
| 13c− | .47 | −.07 | −130,000 |
| 13d+ | .54 | +.06 | −240,000 |
| 13d− | .54 | −.06 | −240,000 |
| 13e | .58 | 0 | −240,000 |

PART II

THEORETICAL PRINCIPLES

The following nomenclature will be used in this portion of the specification and sub-parts A–M thereof:

NOMENCLATURE

| | |
|---|---|
| $\vec{B}$ | magnetic field vector |
| $\vec{r}$ | position radius vector |
| $\vec{j}$ | electric current vector |
| B | magnetic field strength (length of $\vec{B}$ or $\vec{B} \cdot \vec{B}$) |
| μ | magnetic permeability |
| $B^2/2\mu$ | magnetic pressure |
| p | plasma fluid pressure |
| β | ratio of plasma fluid pressure to external magnetic pressure |
| Σ | surface (compact orientable 2-manifold) forming interface between plasma and vacuum, i.e. plasma boundary |
| $\vec{n}$ | normal vector to Σ |
| s | arc length along field line |
| α | pertaining to positive limit set of a field line |
| ω | pertaining to negative limit set of a field line |
| $(x_1, x_2)$ | local coordinates on Σ |
| $(X_1, X_2)$ | components of B on Σ local coordinate system |
| γ | closed field line on Σ (topological circle) |
| $(r, \theta, z)$ | cylindrical coordinates |
| ψ | magnetic flux function |
| Γ | intersection of Σ with plane $\theta = 0$ |
| ∂ | partial differential operator |
| d | differential operator |
| ∇ | gradient operator |
| Δ | Laplace's operator ($\Delta = \nabla \cdot \nabla$) |
| Δ* | Stokes' operator |
| V | volume |
| S | surface area |
| $r_c$ | critical radius |
| ε | indicator |

In the following description of the theoretical principles underlying this invention, it will be understood that although there are two distinct aspects of structural stability of toroidal plasmas, static and dynamic, only static structural stability will be considered in detail. For a toroidal plasma characterized by static structural stability in accordance with the principles of this invention, dynamic structural stability can be achieved by well-known techniques such as systematic theoretical multi-channel design procedure of the type used in the design and development of aerospace-vehicle stabilization systems. Accordingly, unless expressly stated otherwise, the term "structural stability" in the following description will refer only to static structural stability.

Consider a plasma confined in a certain finite bounded region of space by a magnetic filed B, where the plasma contains no internal conductors of current and where there is litle or no magnetic field inside the plasma. At the plasma boundary or surface Σ forming the interface of the plasma and the magnetic field B, it is required that the total pressure $p_t$, which is the sum of the plasma fluid pressure, p, and the magnetic pressure, $B^2/2\mu$, where μ is the permeability, that is, $$p_t = p + B^2/2\mu,$$

must be continuous across the plasma-vacuum boundary. That is, the total pressure must be the same on each side of surface Σ (see Part II, sub-part A thereof). Using the subscript "i" to denote the pressure inside the plasma and the subscript "o" to denote pressure outside the plasma, one has $$p_i + \frac{B_i^2}{2\mu} = p_o + \frac{B_o^2}{2\mu} \qquad (2)$$

Because the plasma fluid pressure $p_o$ is zero outside of the plasma, equation (2) can be written $$p_i + \frac{B_i^2}{2\mu} = \frac{B_o^2}{2\mu}. \qquad (3)$$

The quantity β is defined as the ratio of plasma fluid pressure inside the plasma, $p_i$, to the magnetic pressure outside the plasma, $B_o^2/2\mu$, that is, $$\beta = p_i/(B_o^2/2\mu). \qquad (4)$$

It is evident from its definition that the universal parameter β lies between zero and one. By requiring that there be little or no magnetic field inside the plasma (which is achieved for a high conductivity plasma, by induced currents in the plasma surface which prevent the penetration of magnetic field to the interior; this may be achieved by rapidly turning on the currents in the external conductors), equation (3) can be rewritten $$p_i = \frac{B_o^2}{2\mu}, \qquad (5)$$

and by substitution of the result of equation (5) in equation (4) it is evident that β will approach unity under these conditions. Consideration of transport processes, particularly finite resistivity, shows that the requirement of dynamic stability of the plasma makes it preferable, but not necessary, that the value of β approach unity (high β values) as closely as possible. It is to be understood that the principles of this invention are equally applicable to low and medium values of β. With unity β under equilibrium conditions the fluid pressure on the interior of the plasma will have the same nonzero value everywhere, so that there will be a general steady fluid flow within the plasma (see Part II, sub-part H). Then according to equation (5), the magnetic pressure outside the plasma is non-zero everywhere on the boundary or surface of the plasma.

It is also required that the plasma surface $\Sigma$ have no cusps or edges, and that the surface must be closed, that is, $\Sigma$ cannot have any topological boundaries. It is further required that $\Sigma$ be orientable in the sense that it has a unique inside and outside, that is, no part of $\Sigma$ can interpenetrate another part of $\Sigma$, or in mathematical terminology, that $\Sigma$ be a compact orientable 2-manifold.

Another boundary condition for $\Sigma$ (see Part II, sub-part A) is that the normal component of the magnetic field outside the plasma be continuous across $\Sigma$, which implies that the magnetic field at the surface of the plasma is tangent to $\Sigma$ and therefore forms a non-vanishing tangent magnetic vector field everywhere on $\Sigma$.

It can be shown by the Lefschetz-Hopf fixed point theorem that by requiring $\Sigma$ to be a compact orientable 2-manifold without any fixed point and the normal component of the magnetic field outside the plasma to be continuous across $\Sigma$, then $\Sigma$ must be topologically a torus, that is, the topological product of two topological circles.

The next requirement is that the confinement of a toroidal plasma be statically "structurally stable", that is, such a plasma must have equilibrium characteristics that are insensitive to small variations in those system parameters which determine the qualitative or topological properties of the magnetic field line configuration or portrait on $\Sigma$ so that this portrait is unchanged by such variations. The necessary and sufficient criteria for structural stability of an arbitrary vector field on a topological torus have been set forth by M. Peixoto (See references in *Foundations of Mechanics*, Abraham (1967) and by V. A. Pliss (as expressed by the terms "coarseness" in *Nonlocal Problems in the Theory of Oscillations* (1964, 1966); see also, Systèmes Grossiers", Andronov & Pontriagin, 14 *Dokl. Akad. Nauk. SSSR* (1937):

(a) there is only a finite number of singularities, all generic;
(b) The $\alpha$- and $\omega$-limit sets of every trajectory can only be singularities or closed orbits;
(c) no trajectory connects saddle points;
(d) there is only a finite number of closed orbits, all simple.

"Singularities" in the above criteria (a) and (b) refer to points where the vector field vanishes, and such points are usually called "stagnation points" in the art to which the present invention relates. A "saddle point" is a type of singularity also referred to as a "hyperbolic stagnation point".

Applying these criteria of structural stability to a plasma in a magnetic field under the conditions set forth above, in which the plasma boundary corresponds to the topological torus and the magnetic field corresponds to the vector field, criteria (a) and (c) are satisfied because the magnetic field is non-zero everywhere on the plasma surface $\Sigma$ which means that there are no singularities.

"Trajectories" and "orbits" refer to the arc-length parameterization of the magnetic field lines obtained by integrating on $\Sigma$ the ordinary nonlinear vector differential equation $$\frac{d\vec{r}}{ds} = \vec{B}_o(\vec{r})/B_o(\vec{r}).$$

The "$\alpha$" or "$\omega$" limit set of these magnetic field lines is the totality of limit points of the lines in the limit of the arc-length parameter s respectively approaching $-\infty$ or $+\infty$. Because there are no singularities, by criterion (b) the limit sets must be closed or endless orbits, that is, the limit sets must be limit-cycles or closed orbits which are in the $\alpha$- or $\omega$- limit sets of other distinct magnetic field lines.

Criterion (d) requires that the number of closed orbits be both finite and "simple". In order to be "simple", $$\exp \int_\gamma \left( \frac{\partial X_1}{\partial x_1} + \frac{\partial X_2}{\partial x_2} \right) ds \neq 1, \tag{6}$$

where the integrand of equation (6) is the two-dimensional divergence of the magnetic field on the plasma surface $\Sigma$, in which $x_1$ and $x_2$ are local coordinates on the plasma surface, $X_1$ and $X_2$ are the corresponding components of the magnetic field line at those coordinates, and $\gamma$ is the closed orbit under consideration.

It is shown in Part II, sub-parts E, F, and G below that by combining the criteria of structural stability with Maxwell's Equations and Bernoulli's Theorem for steady fluid flow, as exemplified by the considerations underlying equation (3) above, the magnetic field line configuration on the surface of the plasma must satisfy the following criteria in order to achieve structural stability:

(a) the rotational transform angle of the magnetic field lines on the surface of the plasma is identically zero;
(b) the number N of closed orbits is finite and even (N=2, 4, 6, ... ); and
(c) the closed orbits are not only simple but also must occur in pairs in which the members of each pair are asymptotically stable for increasing or decreasing arc-lengths (once a particular assignment of the sence of increasing arc length has been made).

Application of these criteria to the simplest case of two closed magnetic field lines (which is the non-redundant case because all of the other cases for N even require the duplication of certain elements), makes it apparent that one of the two closed field lines is asymptotically stable, that is, neighboring field lines approach it asymptotically, and the other closed field line is asymptotically unstable in the sense that neighboring field lines move away from it asymptotically. ("Asymptotically" as used here refers to parameterization by arc-length, not by time.) See, for example, closed lines 15 and 16 and the neighboring field lines 19 in FIG. 3B. As shown in Part II, sub-part G below, the requirement that the two field lines with closed orbits be simple, is equivalent to the requirement that the "flow" induced on the plasma surface $\Sigma$ by arc-length parameterization of the field lines not be, on the average, area-preserving in the immediate neighborhoods of the two closed field lines.

It will now be shown that under the requirements set forth above, the equations for equilibrium is magnetofluid dynamics have a unique type of solution in the form of a class of physically realizable toroidal plasma configurations. This class of physically realizable toroidal plasma configurations is characterized by the following properties:

(1) The two closed orbit magnetic field lines are two limit cycles on the plasma surface, one asymptotically stable and the other asymptotically unstable.
(2) The poloidal cross-section of the plasma is characterized by two stagnation points in the poloidal magnetic field on the plasma surface, each stagnation point corresponding to the poloidal cross-section of one of the two limit cycles on the plasma surface.
(3) The poloidal cross-section is non-convex.

No plasma confinement process hitherto advocated has this characteristic of static structural stability including non-area-preserving flow in the neighborhood of each (isolated) closed field line, since none uses the possiblity of asymptotic field lines on the plasma surface, and in particular, in prior plasma confinement devices no closed field line is isolated. This does not contradict the volume-preserving nature of the corresponding vacuum field flow, since the nearest vacuum magnetic shells are neither nested with, nor, in the vacuum, homologous to $\Sigma$. As explained previously in connection with FIG. 3A, it has been discovered that there is a class of physically realizeable arrangements for magnetic confinement of plasmas within a vacuum, consisting of at least two one-parameter families of nested toroidal magnetic surfaces each immediately adjacent to at least a portion of the plasma and a third single member magnetic surface family constituting the plasma-vacuum interface, where none of the first two families of surfaces is homologous to the third single member magnetic surface family and where the third single member magnetic surface family is simultaneously characterized by an identically zero rotational transform angle. A specific set of families of nested magnetic surfaces satisfying these criteria is illustrated in FIG. 3A, in which family 124 is homologous to conductor 123 (disregarding conductor 126), and family 125 is homologous both to envelope 12 and the geometrical union of family 124 with the surface of plasma 14.

The terms "homologous", "union" and "homotopic" used in this specification have the respective meanings well-known in the discipline of mathematical topology. In addition, it will be understood that as used throughout this specificaton and in the claims, the terms "vacuum" or "vacuum volume" mean the geometrical volume surrounding a plasma, regardless of the presence or absence of magnetically permeable matter and exclusive of electrical conductors, within which there is a magnetic field which confines the plasma to be structurally stable in accordance with the principles of this invention.

The following properties of the practical realization of this invention in accordance with the theoretical principles of this inventin are all natural and reasonable from the viewpoint of practical engineering:
(a) finite plasma volume;
(b) connectedness of the plasma volume;
(c) local homotopic triviality of the plasma volume (in particular, no internal conductors);
(d) closure of the device;
(e) plasma surface is a compact orientable manifold;
(f) non-redundancy of limit cycles;
(g) axial symmetry;
(h) static structural stability.

Under these requirements the standard equations of equilibrium have a unique type of solution, radically different from those hitherto given serious consideration in this art. A mathematicl framework suitable for specification of this solution is presented in detail in Part II, sub-part B. The following are the essential elements of the mathematical framework for this type of solution.

Let z be a coordinate along the toroidal axis of symmetry, and let $(r, \theta)$ be polar coordinates in any plane through the z-axis (that is, any poloidal plane). Then $(r, \theta, z)$ constitutes a standard system of cylindrical coordinates, and the vector $\vec{B}$ in this coordinate system has components $(B_r, B_\theta, B_z)$. Without loss of generality, the vacuum field may be characterized by arbitrary constants c and $p_o$ and a scalar magnetic flux function $\psi = \psi(r, x)$ such that $$B_r = -\frac{1}{r}\frac{\partial \psi}{\partial z}, B_\theta = \frac{c}{r}, B_z = \frac{1}{r}\frac{\partial \psi}{\partial r}. \tag{7}$$

The function $\psi$ is well-known to those versed in the present art, as is the fact that its gradient, $\nabla\psi$, is necessarily normal to the surface $\Sigma$. The constant c is determined by the current in the external poloidal conductors (or, equivalently, along the z-axis). The constant $p_o$ denotes the equilibrium plasma fluid pressure.

The constant c completely determines the toroidal magnetic field. The poloidal field is uniquely determined by the constant $p_o$ and the function $\psi$; but, as will now be shown, $\psi$ is uniquely determined by choice of c, $p_o$, and the geometry of $\Sigma$. Hence, finally, once c and $p_o$ have been specified, the vacuum field is uniquely determined solely by the choice of the geometry of $\Sigma$.

Figure 4A:
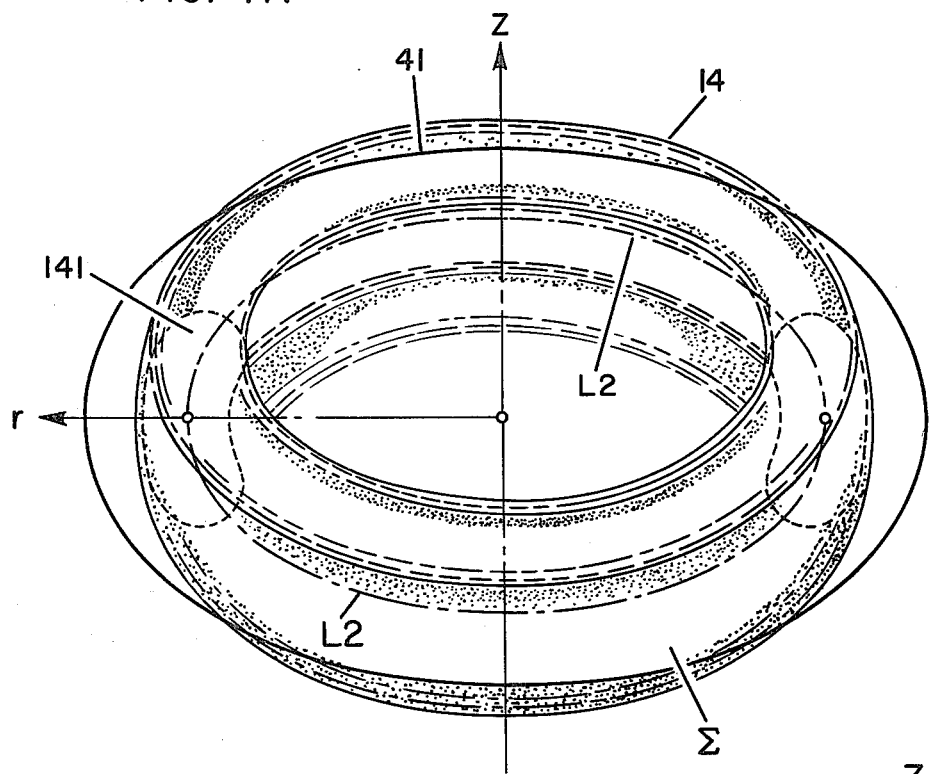
FIG. 4A is a perspective view partially in section illustrating a toroidal plasma configuration in accordance with the principles of this invention.
Figure 4B:
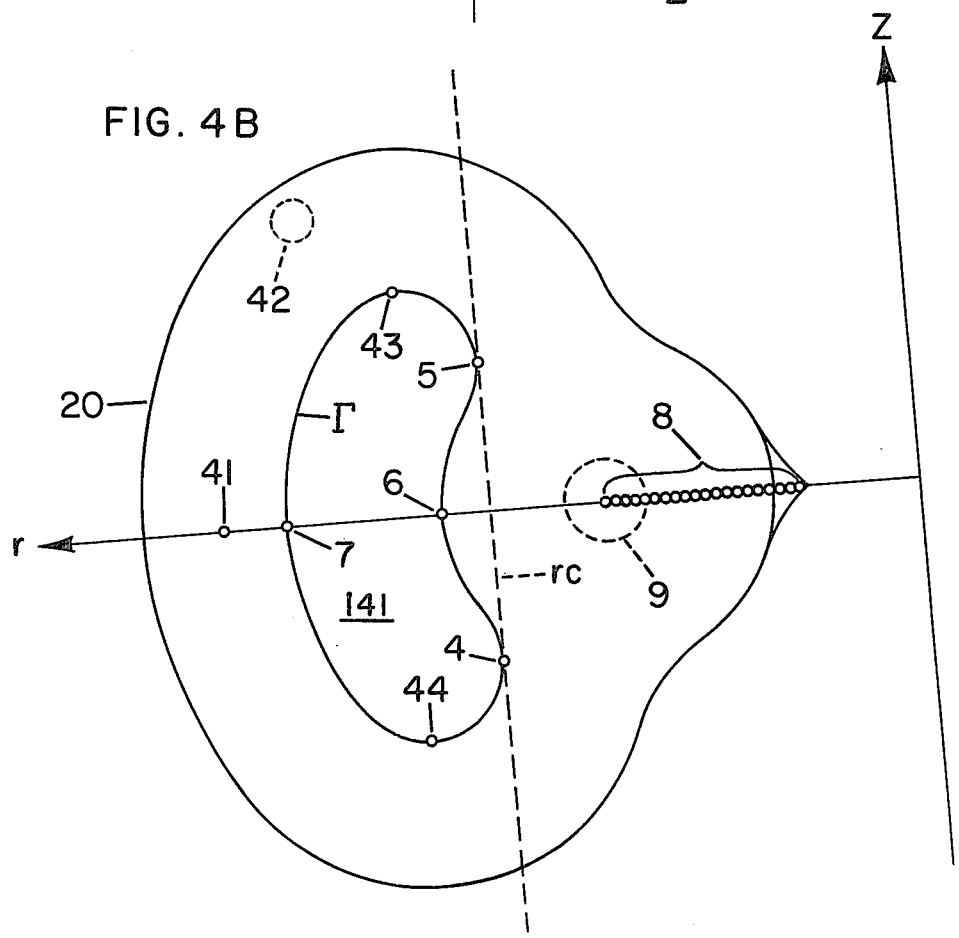
FIG. 4B is a cross-section of the toroidal plasma shown in FIG. 4A.

This situation is illustrated in FIGS. 4A and 4B where 14 denotes the topological torus representing the plasma volume, and $\Sigma$ denotes the surface of the plasma volume. The poloidal cross-section of this torus is 141 and $\Gamma$ denotes the poloidal cross-section of just the surface $\Sigma$ and is the curve $$\Gamma: \psi(r, z) = 0. \tag{8}$$

On $\Gamma$ the pressure balance condition (see Part II, sub-part B) is:

$$|\nabla\psi|^2 = 2\mu p_o r^2 - c^2. \tag{9}$$

Clearly, for small enough r, the right-hand side of equation (9) is $< 0$, whereas the left-hand side is always $\geq 0$. Therefore, there is a minimum r, $r_c$, at which equation (9) can be satisfied, that is, there is a minimum r, $r_c$, at which a physically real solution exists. Thus, as shown in FIGS. 4A, 4B and 5, the plasma volume must always lie to the left of the vertical line $r = r_c$. The critical radius $r_c$ is given by $$r_c = \frac{|c|}{\sqrt{2\mu p_o}}, \tag{10}$$

and the boundary condition which, together with equation (8), determines $\psi$ on the exterior of $\Gamma$ as a solution of Stokes' Equation, is $$\frac{\partial \psi}{\partial n} \equiv \vec{n} \cdot \nabla\psi = \pm |\nabla\psi| = \pm c\sqrt{\left(\frac{r^2}{r_c}\right) - 1}. \tag{11}$$

If $\Gamma$ lies wholly to the left of $r_c$, then a particular value of the $\pm$ sign choice in equation (11) must be made, for $\partial\psi/\partial n$ cannot then vanish anywhere on $\Gamma$. But this implies that the vector field on $\Sigma$ necessarily has a non-zero rotational transform angle, which violates requirement (a) of the structural stability criteria of the present invention.

Figure 9:
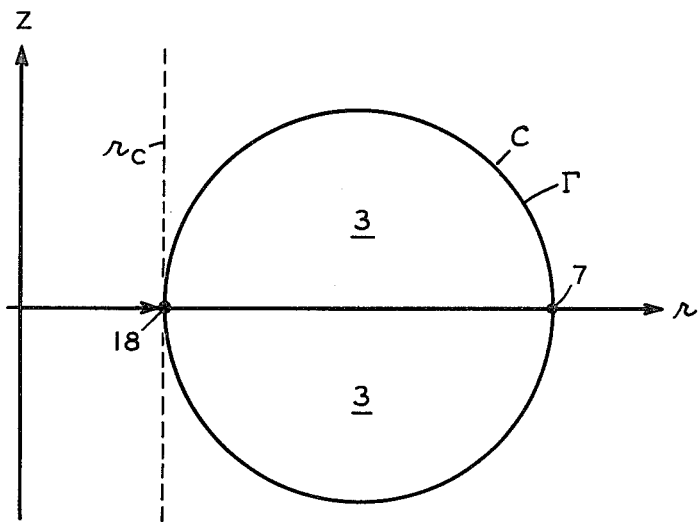

By way of example, if, as in FIG. 9, one were to choose as $\Gamma$ the boundary C of an arbitrary convex body which touches $r_c$ at just one point, 18, then by equation (11), the poloidal field must have a stagnation point at that point because there is a stagnation point at any point where $\Gamma$ touches $r_c$. The point 18 must be an elliptic singularity, implying the presence of a solid conductor at this point, and if the plasma should touch an external conductor at point 18, this would ruin the thermal insulation required for controlled fusion reactions. However, by producing oppositely directed sheet-currents on the left and right hand sides of $\Gamma$ and by allowing the square-root in equation (11) above to change sign at a point where $\Gamma$ touches $r_c$, the requirement of zero rotational transform is satisfied by converting the singularity from an elliptic one to a hyperbolic one; it then becomes evident that a second point of contact with $r_c$, which implies a non-convex poloidal cross-section, will permit the sign to be changed back again to its original value, which is necessary, by equation (11), in order that $\partial\psi/\partial n$ shall have no discontinuities on $\Gamma$. (Otherwise Stokes' Equation would have not have a physically realizable solution). The resulting "kidney-bean" or non-convex poloidal cross section 141 shown in FIGS. 4A, 4B, together with its associated magnetic field, is the consequence of not only the choice of a non-convex poloidal plasma cross-section 141 but also the choice of oppositely directed toroidal sheet-currents which permit $\partial 104/\partial n$ to change sign as indicated at points 4 and 5 in FIG. 4B.

Thus by choosing $\Gamma$ to have a non-convex shape that touches the line $r=r_c$ at two points, 4 and 5, the requirement of two limit-cycles on $\Sigma$ is achieved. Since, at 4 and 5, $r=r_c$, then by equation (11), $|\nabla\psi|=0$, and this gives $B_r = B_z = 0$. Thus the only magnetic field component present at 4 and 5 is toroidal (azimuthal), and so, as shown in FIG. 3B, the two field lines 15 and 16 respectively passing through points 4 and 5 are circles on $\Sigma$, parallel to the $r\theta$-plane, with centers on the z-axis. On the segment 465 of $\Gamma$ we can take $\partial\psi/\partial n>0$ and on segment 475, $\partial\psi/\partial n>0$ (or vice versa).

The postulated normal discontinuity in B across $\Sigma$ is achieved by surface current on $\Sigma$. These currents are oppositely directed in the two regions on $\Sigma$ defined by the two limit cycles indicated in FIG. 3B by lines 15 and 16. In the redundant case of N>2 limit cycles, there are N/2 pairs of closed orbit magnetic field lines which divide the plasma surface into N adjacent toroidal regions or N/2 pairs of adjacent toroidal regions. Accordingly, the non-convex poloidal cross-section of such a surface has N poloidal stagnation points corresponding in number and geometrical location to the N limit cycles; for example, FIG. 5 illustrates N=4 stagnation points. Similarly, there are N toroidal sheet currents, one on each of the N adjacent toroidal regions, where each toroidal sheet current is opposite in direction to the toroidal sheet current on the two immediately adjacent toroidal regions.

The curve 20 in FIG. 4B is a "flux surface", i.e. a surface $\psi=$ constant. Toroidal currents appropriately placed on such a surface, together with induced toroidal plasma surface currents, generate the vacuum poloidal field; additional, oppositely directed toroidal currents are needed at each of points 8 (It will be shown below that these points lie along a branch cut.). However, one could, if desired, replace the current at points 8 by a family of toroidal currents appropriately placed on one of the nearby flux surfaces surrounding the outermost one of the points 8, such as 9. Outside the surface generated by axial rotation of curve 20, strong poloidal currents (not shown), together with induced poloidal surface currents, produce the toroidal magnetic field in the vacuum.

Existence of an analytic solution to Stokes' Equation in the neighborhood of $\Gamma$ is proved by the Cauchy-Kovalevski Theorem, provided that $\Gamma$ is an analytic curve, and provided that $\partial\psi/\partial n$ is analytic on $\Gamma$; this last fact, underlies the physical realizability of the principles of this invention, which is proved in Part II, sub-part B.

For simplicity of calculation one may take $\Gamma$ to be a Limacon of Pascal, although this may not lead to an optimal configuration because the resulting branch cut 8 turns out to be uncomfortably near to the plasma. Another possibility is to choose $\Gamma$ to be a "banana" shaped curve as shown in FIG. 6, which can be done utilizing cap-cyclide coordinates as shown in Part II, sub-part I. In this case one finds two possible singularities, as at 61 and 62. However, from the point of view of the present objective, namely plasma confinement, there is no essential difference between the choice of $\Gamma$ disclosed in FIGS. 4B and 6.

In order to verify the "simplicity" of the limit-cycles through 4 and 5 as shown in FIG. 3B (as required for structural stability), one can represent the solution for the magnetic field in a neighborhood of either limit-cycle by a power series expansion of $\vec{B}$ and $\Gamma$ convergent near the limit-cycle as proved in Part II, sub-part G.

The above are the principal considerations in showing the existence and uniqueness of a solution satisfying the last-named requirements (a, b, c, d, e, f, g, h). If the condition (f) of non-redundancy is relaxed, then solutions of the type shown in FIG. 5 are possible where the number of limit cycles and therefore stagnation points is increased by a multiple of two.

Note that the vacuum volume is at least triply-connected, by which we mean that there exists in said volume at least three independent non-homologous, geometrical cycles, including one which is homotopic to a point. These cycles are, for example, 41 in FIG. 4A, $\Gamma$ and 42 in FIG. 4B. Thus conditions (a, b, c, d, e) and (g, h) imply a plasma configuration which is a topological torus, axially symmetric with a non-convex poloidal cross-section and with the associated vacuum volume at least triply-connected (unless dipoles are used shown in FIG. 2B).

Using established terminology of this art, in which a "Tokomak" is referred to as low-beta toroidal plasma monopole, and a "Gulf Energy and Environmental Systems Doublet" is referred to as a low-beat toroidal plasma monopole doublet (see "The Tokomak Approach in Fusion Research", Coppi and Rem, 227 *Scientific American* 65 (1972)), the preferred form of the present invention may be characterized as a high-beta toroidal plasma dipole.

Turning now to the subject of dynamic structural stability, or equivalently, of (dynamic) asymptotic stability of the plasma pseudo equilibrium (cf. Part II, sub-part J), all five subjects of electrical resistivity, heat conduction, compressibility, viscosity, and the Maxwell "displacement current" (effect of finite rather than infinite speed of electromagnetic waves) are to be considered simultaneously, rather than one or a few at a time, which is all that has been hitherto accomplished in the art. The reduction of the eleven simultaneous partial differential equations of EMTFD (electromagnetothermofluiddynamical) wave motion to a simple scalar static equation, namely Helmholtz's equation for the geometrical shapes of the standing modes of sound waves, plus a seventh-degree polynomial dispersion relation for the complex frequencies of the plasma's normal modes of vibration, renders the physical nature of the plasma's macroscopic oscillations quite understandable. (A special case of the above analysis may be found by taking the determinant of simultaneous homogeneous linear equation (2.60) and (2.61) of R. J. Tayler's "Plasma Waves And Oscillations", p. 113 of *Physics of Hot Plasmas*, edited by Rye and Taylor, Oliver and Boyd, 1970.). There will be inside the plasma principally four kinds of three-dimensional waves, namely (i) entropy waves;
(ii) "slow" magnetosonic waves;
(iii) "fast" magnetosonic waves;
(iv) electromagnetosonic waves.

Waves (ii) and (iii) are modified sound waves and modified Alfvén waves, or vice versa (depending on which is slower), while waves (iv) are modified electromagnetic waves. One novel conclusion of this analysis is that, among hitherto considered tubular plasma column-confinement methods, only those in the category of "infinitely long" (that is, open-ended) theta pinches (that is, of zero rotational transform) possess dynamic structural stability. Another result (see FIGS. 7 and 8 and Part II, sub-part K) is that it is easier to achieve dynamic structural stability for high beta (near $\beta=1$) than for low beta (near $\beta=0$). In particular, the analysis below and the graphs in FIGS. 7 and 8 indicate that over-idealized "Energy Principle" calculations, in which four of the above-mentioned physical effects are ignored, yield physically reliable results only regarding dynamic instability at high beta. Thus Teller's celebrated geometrical criterion for the dynamic instability of diamagnetic plasmas may be employed. Use of this criterion in the manner of Pfirsch and Wobig (see Pfirsch and Wobig, *Proceedings, Culham Conference on Nuclear Fusion*, Vol. I, 1966, p. 757) shows that interchange or global flute instabilities cannot occur because in the appropriate sense of "minimum average B" the present configuration is an optimal toroidal "magnetic well". Obviously the outer region of the plasma surface (between points 43 and 44 in FIG. 4B) has unfavorable curvature and may, for example, suffer local ripple instabilities of the type known in this art as "local flute instabilities" (see Pfirsch and Wobig, *Proceedings, Culham Conference on Nuclear Fusion*, Vol. I, 1966, p. 757). Such instabilities grow until the assumptions of linearizeability made in their analysis are no longer valid, but need not grow indefinitely. The unlimited growth of such instabilities can be suppressed effectively in at least two independent ways:

(i) by choosing a large enough toroidal aspect-ratio, (i.e. ratio of major to minor toroidal radii) the equivalent surface tension created by line typing plus finite Larmor radius effects will suppress the instabilities, as shown in Part II, sub-part L;
(ii) by automatic feedback stabilization.

Hitherto feedback stabilization has been demonstrated convincingly only upon certain open-ended devices (linear theta pinches and quiescent or "Q-machine" magnetic mirror devices) which appear to have static structural stability. This is not surprising, for static structural stability of the plasma configuration is necessary for a property known in systems engineering theory as "identifiability", which in turn is necessary for the rational design of feedback stability augmentation or stabilization systems.

For ordinary linear electro-mechanical systems with a finite number of degrees of freedom, static structural stability is equivalent to the requirement that there be no repeated (or "degenerate") complex frequencies and no vanishing real parts of any complex frequencies, while dynamic asymptotic structural stability is equivalent to the requirement that all complex frequencies must have negative real parts. The simultaneous imposition of these two (logically independent) requirements restricts attention to a class of systems sufficiently "well-behaved" to be amenable to routine systems engineering techniques. For example, a rather general procedure for designing a feedback control system applicable to the present plasma configuration is given in "Magnetic Feedback Stabilization in A Tokomak" by Yu. P. Ladikov and Yu. I. Samoilenko, Zuhrnal Technicheskoi Fiziki, Vol. 42, No. 10, pp. 2062–2073, Oct. 1972 (English translation in Soviet Physics—Technical Physics, Vol. 17, No. 10, pp. 1644–1650, April 1973). A similar consideration for nonlinear systems with infinitely many degrees of freedom is implied in the principles underlying the present invention.

Figure 10A:
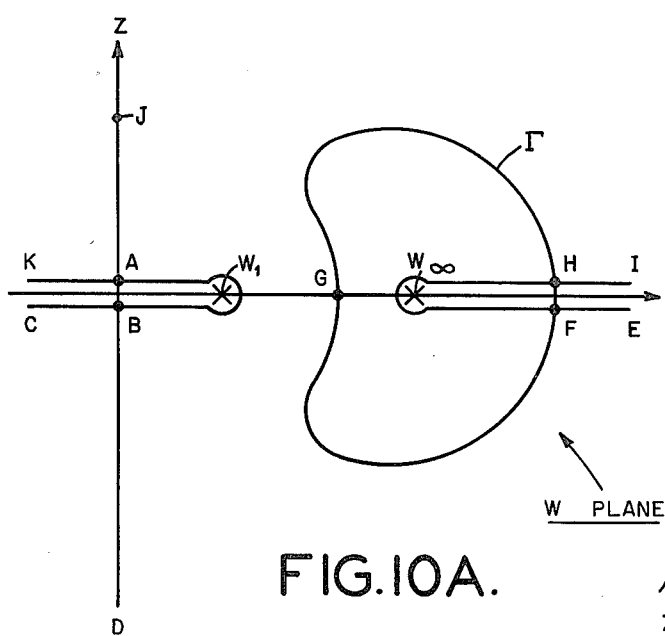
Figure 10B:
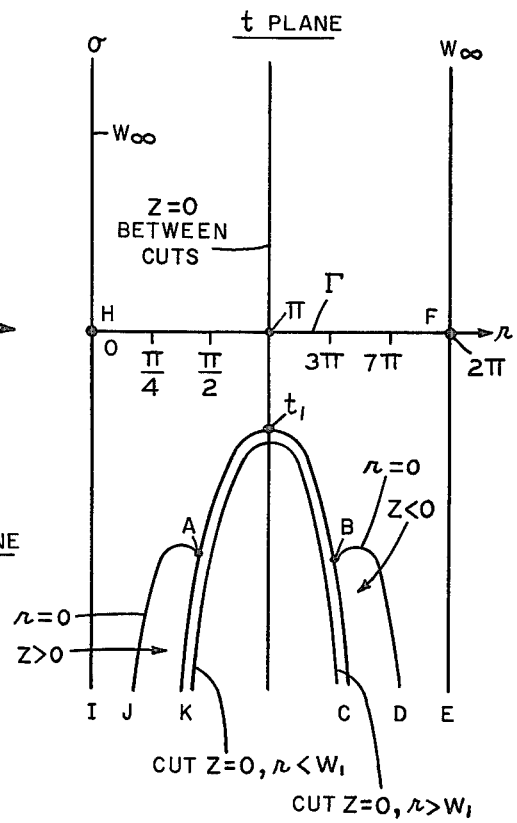
Figure 11A:
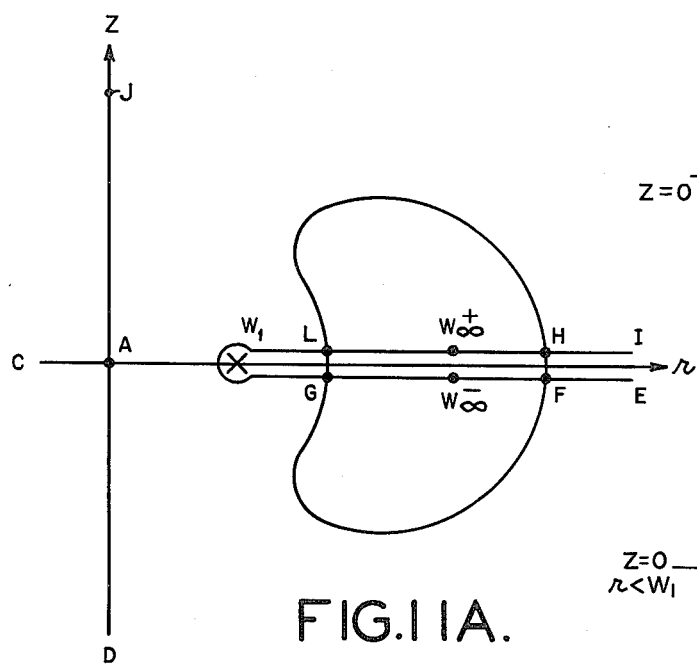
Figure 11B:
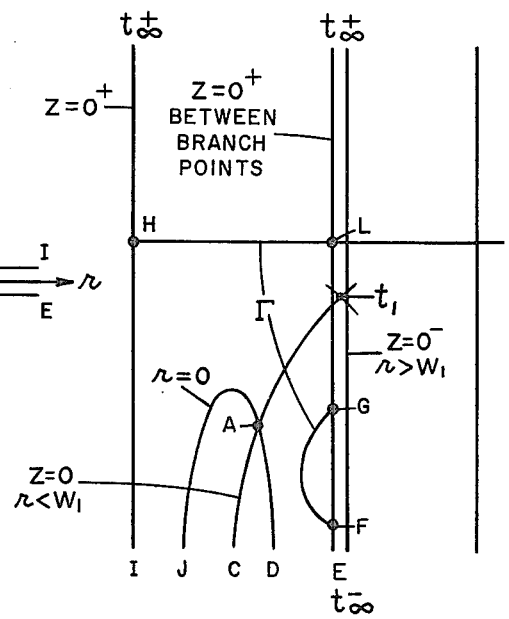

The method of computing the external currents required by the principles of this invention is the standard numerical problem in the art of solving elliptic partial differential equations; see, for example, the section on "Toroidal Equilibra With Scalar Pressure" in the chapter on Computational Problems by J. Kileen, pp. 231, 232 of *Physics of Hot Plasmas*, edited by Rye and Taylor, Oliver and Boyd, 1970. In fact, inserting equations (7) into the vacuum magnetic field equations $$\nabla \cdot \vec{B} = 0, \quad \nabla \times \vec{B} = 0 \tag{12}$$

one finds the well-known Stokes' equation:

$$\frac{\partial^2 \psi}{\partial r^2} - \frac{1}{r} \frac{\partial \psi}{\partial r} + \frac{\partial^2 \psi}{\partial z^2} = 0 \tag{13}$$

which is to be solved outside of $\Gamma$ with the Cauchy data (8) and (11) in the manner explained above and illustrated in FIG. 13. The specific numerical examples shown in FIGS. 10, 11 and 12 were computed by applying a standard five-point difference equation approximation to equations (8), (11) and (13).

A. EQUILIBRIUM BOUNDARY CONDITION

The equations for equilibrium in magneto-fluid dynamics are $$\nabla \cdot \vec{B} = 0, \tag{1.1}$$
$$\nabla \times \vec{B} = \vec{j}, \tag{1.2}$$
$$\vec{j} \times \vec{B} = \nabla p. \tag{1.3}$$

Let V denote a volume in the shape of a small "pill box" with one face of area $\Delta S$ inside and one parallel to the normal $\vec{n}$ to the surface $\Sigma$ at a point inside the volume. The element of area of the outer face is then approximately $\vec{dS} \cong \vec{n} \Delta S$ while that of the inner face is $\vec{dS} \cong -\vec{n} \Delta S$. The following calculations become accurate in the limit as the volume V is taken to decrease to zero. By the Divergence Theorem of Gauss, $$\iiint_V \nabla \cdot \vec{B} \, dV = \iint_S \vec{B} \cdot \vec{n} \, dS = 0 \tag{1.4}$$

where (1.1) is used. The surface integral is approximately (after canceling $\Delta S$)

$$[\vec{n} \cdot \vec{B}]_o - [\vec{n} \cdot \vec{B}]_i = 0 \tag{1.5}$$

where the subscripts o and i denote outside and inside of $\Sigma$, respectively. Thus *the normal component of $\vec{B}$ must be continuous across $\Sigma$*.

Next, use (1.1) again to obtain the identity $$\nabla \cdot \vec{B}\vec{B} = \vec{B}(\nabla \cdot \vec{B}) + (\vec{B} \cdot \nabla)\vec{B} = (\vec{B} \cdot \nabla)\vec{B} \tag{1.6}$$

pertaining to the dyad $\vec{B}\vec{B}$. Now combine (1.2) and (1.3) to find $$\nabla p = (\nabla \times \vec{B}) \times \vec{B} = (\vec{B} \cdot \nabla)B - \tfrac{1}{2}\nabla \vec{B} \cdot \vec{B} = \nabla \cdot \vec{B}\vec{B} - \tfrac{1}{2}\nabla B^2$$

or $$\nabla(p + \tfrac{1}{2}B^2) - \nabla \cdot \vec{B}\vec{B} = 0. \tag{1.7}$$

Thus, as before $$\iiint \{\nabla(p + \tfrac{1}{2}B^2) - \nabla \cdot \vec{B}\vec{B}\} dV = 0 = \iint \{(p + \tfrac{1}{2}B^2)\vec{n} - (\vec{n} \cdot \vec{B})\vec{B}\} dS \cong (\{(p+\tfrac{1}{2}B^2)_o - (p+\tfrac{1}{2}B^2)_i\}\vec{n} - \{[(\vec{n} \cdot \vec{B})\vec{B}]_o - [(\vec{n} \cdot \vec{B})\vec{B}]_i\})\Delta S \tag{1.8}$$

Take the dot product of (1.8) with $\vec{n}$ and divide by $\Delta S$ to obtain $$(p + \tfrac{1}{2}B^2)_o - (p + \tfrac{1}{2}B^2)_i - \{(\vec{n} \cdot \vec{B})_o^2 - (\vec{n} \cdot \vec{B})_i^2\} = 0. \tag{1.9}$$

Now apply (1.5) in (1.9) to obtain, finally $$(p + \tfrac{1}{2}B^2)_o - (p + \tfrac{1}{2}B^2)_i = 0, \tag{1.10}$$

thus proving that *the total pressure $p_T$ must be continuous across $\Sigma$*, where $$p_T = p + \tfrac{1}{2}B^2. \tag{1.11}$$

B. ANALYTICITY OF THE BOUNDARY CONDITION

In order to establish the *physical realizability* of the magnetic field configuration of FIGS. 3a and 3b, it is necessary to show that equations (1.1)–(1.3) have a regular (real anayltic) solution satisfying the boundary conditions (1.5) and (1.10) in some external neighborhood of $\Sigma$, i.e., that there need be no external conductors tangent to or intersecting $\Sigma$ at any point. Indeed, the vacuum magnetic field cannot exist where B has a singularity in the sense of analytic function theory); hence the loci of singularities of B is necessarily a subset of the loci of required external conductors. The nearest external conductor must therefore be at least as close to $\Sigma$ as the nearest singularity of B. Hence it is required to show that the nearest singularity of B lies at a finite (non-infinitesimal) distance from the plasma, i.e. that no singularities of B lie on the surface $\Sigma$.

This can be accomplished by quoting the Cauchy-Kovalevski theorem. From the physical point of view, since $\Sigma$ is freely disposable by the reactor designer, one may without loss of generality assume that $\Sigma$ is a real-analytic two-manifold. It will be shown that B is determined by an analytic partial differential equation, so that it remains only to show that the boundary conditions determining B are also analytic in order for the physical realizability of the required magnetic configuration to be established.

This calculation is greatly facilitated by (though it does not necessitate) the use of the assumption of *axial symmetry* and the subsequent introduction of appropriate cylindrical coordinates (r,$\theta$,z).

Under the requirement of axial symmetry ($\partial/\partial\theta \equiv 0$), equation (1.1) becomes $$\frac{1}{r}\frac{\partial}{\partial r}(rB_r) + \frac{\partial B_z}{\partial z} = 0, \tag{2.1}$$

which can be satisfied by choosing $$B_r = -\frac{1}{r}\frac{\partial \psi}{\partial z}, \quad B_z = \frac{1}{r}\frac{\partial \psi}{\partial r} \tag{2.2}$$

where $\Psi$ is a function of r and z, as yet arbitrary, called the *flux function*. Equations (1.2) and (1.3) may be combined to eliminate $\vec{J}$, yielding $$(\nabla \times \vec{B}) \times \vec{B} = \nabla p. \tag{2.3}$$

The $\theta$ component of equation (2.3) is the Jacobian identity $$\frac{\partial(rB_\theta, \psi)}{\partial(r,z)} \equiv 0, \tag{2.4}$$

which implies that $$B_\theta = \frac{1}{r} f(\psi) \tag{2.5}$$

where f is an arbitrary function of $\Psi$. Similarly, the other two components of equation (2.3) now give $$\frac{\partial(p, \psi)}{\partial(r,z)} \equiv 0, \tag{2.6}$$

which implies that $$p = g(\Psi) \tag{2.7}$$

where g is an arbitrary fucntion of $\Psi$, and $$\frac{\partial^2 \psi}{\partial r^2} - \frac{1}{r}\frac{\partial \psi}{\partial r} + \frac{\partial^2 \psi}{\partial z^2} + f(\psi)f'(\psi) + r^2 g'(\psi) = 0, \tag{2.8}$$

where ' denotes differentiation with respect to $\Psi$. A proof that the same equation holds also for a class of non-zero steady fluid velocities is given in sub-part H.

These equations hold both inside and outside the plasma. For the case of low or medium power production per unit volume (which implies $\beta = 1$), equation (2.8) must be solved with suitable functions f and g. A choice frequently used in this art is to take f and g to be linear functions, with constant co-efficients, of $\psi$, in which case equation (2.8) becomes linear in $\psi$. The resultant equation is separable and has a well known complete system of eigenfunctions in terms of which every possible solution may be expanded. A more complicated but more accurate procedure would be to choose f and g so that equation (2.8) is compatible with Spitzer's generalization of Ohm's Law (see equation (10.8) below). For ease of illustration, we shall confine further attention principally to the $\beta = 1$ case, although the principles of the present invention are applicable to arbitrary values of $\beta$ ($0 < \beta < 1$) in the manner just indicated.

For the case of maximum power production per unit volume (which implies $\beta = 1$) the equations for the interior of the plasma simply reduce to the equation.

$p$ = constant   (2.9)

Thus, on $\Sigma$, $\psi$ = constant. We may, without loss of generality, choose this constant to be zero.

Outside $\Sigma$, since $\vec{p}$ and $\vec{j}$ both vanish, we see that $f'(\Psi)=0$ and $g(\Psi)=0$. Thus, outside $\Sigma$ equation (2.8) reduces to Stokes' Equation, $$\Delta_* \psi \equiv \frac{\partial^2 \psi}{\partial r^2} - \frac{1}{r} \frac{\partial \psi}{\partial r} + \frac{\partial^2 \psi}{\partial z^2} = 0 \quad (2.10)$$

while equation (2.5) becomes $$B_\theta = \frac{c}{r} \quad (2.11)$$

where c is some constant.

Note that $\nabla \Psi$ is normal to $\Sigma$ and that $\vec{B} \cdot \nabla \Psi = 0$ as required by equation (1.5) when $\vec{B}_i = 0$.

We illustrate this situation in FIGS. 4a and 4b. In FIG. 4a, 14 is the topological torus representing the plasma volume; the surface of this is $\Sigma$. The poloidal cross-section 6-7 of this torus is shown in FIG. 4b where 141 represents the cross-section of the plasma volume; $\Gamma$ is the poloidal cross-section of $\Sigma$ and is the curve $\Gamma: \Psi(r, z) = 0.$   (2.12)

We have illustrated a curve which is symmetircal relative to the r-axis. This is done for convenience, and a magnetic confinement device may be constructed in this way, but it is not an essential requirement.

It is easy to verify that, on $\Gamma$, equation (5) of Part 2A above may now be written as $$p = \frac{1}{2\mu} \left[ \frac{c^2}{r^2} + \frac{1}{r^2} |\nabla \Psi|^2 \right]$$

or, equivalently, on $\Gamma$ $$|\nabla \Psi|^2 = 2\mu p r^2 - c^2. \quad (2.13)$$

Clearly, for small enough r, the right-hand side of equation 2.13 is $<0$, whereas the left-hand side is always $\geq 0$. Therefore, there is a minimum r, $r_c$, at which equation (2.13) can be satisfied, i.e., at which a physically real solution exists. Thus, in FIGS. 4a and 4b, the plasma volume 141 must *always* lie to the right of the vertical line $r = r_c$. The critical radius $r_c$ is given by $$r_c = \frac{|c|}{\sqrt{2\mu p}} \quad (2.14)$$

and we have $$\frac{\partial \psi}{\partial n} \equiv \vec{n} \cdot \nabla \psi = \pm |\nabla \psi| = \pm c \sqrt{\left(\frac{r}{r_c}\right)^2 - 1}. \quad (2.15)$$

If $\Gamma$ lies wholly to the right of $r_c$, then a particular value of the $\pm$ sign choice in (2.15) must be made, for $\partial \Psi/\partial n$ cannot then vanish anywhere on $\Gamma$. But this implies that the vector filed on $\Sigma$ necessarily has a non-zero rotational transform angle, which violates requirement (a) of the structural stability criteria of the present method.

It will be seen in sub-parts E and F that $\Gamma$ cannot intersect the line $r = r_c$ in an odd or an infinite number of times without violating the structural stability criteria.

The only remaining possibility is that $\Gamma$ intersect the line $r = r_c$ twice, as in FIG. 4b, or an even number N of times, as illustrated in FIG. 5 for the case $N = 4$.

The problem of physical realizeability now becomes the problem of solving Stokes' Equation $$\Delta \Psi = 0 \quad (2.16)$$

in an exterior neighborhood of $\Gamma$ together with the boundary conditions $$\psi = 0, \quad \partial \psi/\partial n = \epsilon \sqrt{r^2 - r_c^2} \quad (2.17)$$

on $\Gamma$. Here $$\epsilon = \pm (|c|/r_c) = \pm \sqrt{2\mu p}.$$

In order to define this problem more precisely, the following assumptions will be made.

(i) The boundary $\Gamma$ is defined parametrically by $r = r(t)$, $z = z(t)$, $0 \leq t \leq 2\pi$, where $r(t)$ and $z(t)$ are real analytic functions of t (i.e. are equal to their Taylor series for each t).

(ii) for all t, $0 \leq t < 2\pi$, $\{\dot{r}\}^2 + \{\dot{z}\}^2 > 0$.

(iii) The equation $r = r_c$ holds only at points where the boundary $\Gamma$ is nearest to the z-axis, i.e., r(t) is a minimum for $t = t_o$ where $r(t_o) = r_c$.

(iv) The curvature of the boundary $\Gamma$ is not zero when $r = r_c$.

(v) The indicator $\epsilon$ changes from $+\sqrt{2\mu p}$ to $-\sqrt{2\mu p}$ or vice versa above and below a point where $r = r_c$.

Under the preceding assumptions, the function $\epsilon \sqrt{r^2 - r_c^2}$ is real analytic at all points of the boundary $\Gamma$, as will now be shown.

The function $\epsilon \sqrt{r^2 - r_c^2}$ is analytic at points where $r > r_c$ because $\epsilon$ is a constant in a neighborhood of such a point and the square root of positive real analytic functions is real analytic.

For a point $(r_c, z_o)$ where assumptions (i) through (v) are satisfied, $z(t)$ has a real analytic inverse $t(z)$ in a neighborhood of $z_o$ by the inverse function theorem, where $z_o = z(t_o)$, $r_c = r(t_o)$; indeed, $\dot{r}(t_o) = 0$ by (iii) so that $\dot{z}(t_o) \neq 0$ by (ii).

Thus $r = r(t(z)) = \tilde{r}(z)$ is an analytic function of z in a neighborhood of $z_o$. By (iii), $r'(z_o) = 0$ and, by (iv), $r\Delta(z_o) > 0$. Hence $$r(z) = r(z_o) + \frac{r''(z_o)}{2}(z - z_o)^2 + \ldots + \frac{r^{(n)}(z_o)}{n!}(z - z_o)^n + \ldots \quad (2.19)$$

$$\epsilon \sqrt{r - r_c} = \epsilon |z - z_o| \sqrt{\frac{r''(z_o)}{2} + \ldots + \frac{r^{(n)}(z_o)}{n!}(z - z_o)^{n-2} + \ldots}. \quad (2.20)$$

Both $\epsilon$ and $(z - z_o)$ change sign at $z_o$ so either $\epsilon(z - z_o) = (z - z_o)$ or $\epsilon(z - z_o) = -(z - z_o)$, depending on $\epsilon$, and these are both real analytic. Also the function under the radical sign in (2.20) is real analytic and positive in a neighborhood of $z_o$ so $\epsilon \sqrt{r - r_c}$ is real analytic in a neighborhood of $(r_c, z_o)$.

The function $\sqrt{r + r_c}$ is real analytic since $(r + r_c) > 0$ by (iii). Thus $\epsilon \sqrt{r^2 - r_c^2} = (\sqrt{r + r_c}) \epsilon \sqrt{r - r_c}$ is real analytic at all points of the boundary. Hence the Cauchy-Kovalevski theorem implies that (2.16)–(2.17) has a real analytic solution in some exterior neighborhood of $\Gamma$. Therefore *the class of magnetic field configuration shown in FIGS. 3a and 3b, including such generalizations as are suggested in FIG. 5, is physically realizable.*

C. GLOBAL FLUX-LINE PORTRAITS BY CONTOUR INTEGRATION

The problem is to solve the equation $$\psi_{rr} + \psi_{zz} - \frac{1}{r}\psi_r = 0$$

in the region between $r > 0$ and outside of an analytic curve $\Gamma$, subject to the boundary conditions $\Psi =$ on $\Gamma$ and $$\frac{\partial \psi}{\partial n} = F(t)$$

on $\Gamma$. $\Psi(r,z)$ is to be continuous in r and z on $\Gamma$. F(t) is given by $\epsilon A \sqrt{r^2(t) - r_c^2}$ and $$A = \sqrt{2\mu \cdot p}, \quad r_c = \sqrt{\frac{C_o^2 - C_i^2}{2\mu_o p}} = \frac{C}{\sqrt{2\mu_o p}}.$$

Here, $\mu_o$, p, C, A, $r_c$ are positive constant with $C_o > C_i$. $\Gamma$ is a simple, smooth, closed curve given by $r = r(t)$, $z = z(t)$ where r(t) and z(t) are analytic and periodic of period $2\pi$. $\Gamma$ lies to the right of $r = r_c$ and touches this line at exactly two different points, $P_1$ and $P_2$. As t increases $\Gamma$ is traced in a counter-clockwise direction. Proceeding in this direction from $P_1$ to $P_2$, $\epsilon = -1$. On the remainder of the curve $\epsilon = +1$. $\partial \Psi / \partial n$ is the outward normal to $\Gamma$. Assume $\dot{r}^2 + \dot{z}^2 > 0$ $$\frac{\partial \psi}{\partial n} = \frac{\psi_r \dot{r} + \psi_z \dot{z}}{\sqrt{\dot{r}^2 + \dot{z}^2}} = \nabla \psi \cdot \frac{\nabla \psi}{|\nabla \psi|} = |\nabla \psi|$$

Assume $\dot{z}_i \neq 0$ at $P_1$ and $P_2$ and the curvature at $P_1$ and $P_2$ is not zero. Solution:

$$\Psi(r,z) = \Phi(r,z) - \phi(r,z)$$

where $$\Phi(r,z) = -\sqrt{r} \int_0^{2\pi} G(r,z,r(t),z(t)) f(t) dt$$

and $$f(t) = A\left\{ \frac{(r^2(t) - r_c^2)(\dot{r}^2 + \dot{z}^2)}{r(t)} \right\}^{\frac{1}{2}}$$

and $$G(r,z,r^1,z^1) = \frac{1}{2\pi}(rr^1)^{\frac{1}{2}} \int_0^{\pi} \frac{\cos\theta d\theta}{\left(r^2 + r^{12} + (z - z^1)^2 - 2rr^1\cos\theta\right)^{\frac{1}{2}}}$$

$$= \frac{1}{2\pi k}[(2 - k^2)K(k) - 2E(k)] \text{ Elliptic integrals}$$

and $$k^2 = \frac{4rr^1}{(r + r^1)^2 + (z - z^1)^2} \leq 1$$

$$G = \begin{cases} \frac{1}{2\pi} \sum_{n=-\infty}^{\infty} \frac{1}{n^2 - \frac{1}{4}} q_n(\xi) p_n(\xi^1) e^{in(\eta - \eta^1)}, & \xi < \xi^1 \\ -\frac{1}{2\pi} \sum_{n=-\infty}^{\infty} \frac{1}{n^2 - \frac{1}{4}} q_n(\xi) p_n(\xi) e^{in(\eta - \eta^1)}, & \xi < \xi^1 \end{cases}$$

$$r = \frac{a \sinh\xi}{\cosh\xi - \cos\eta}, \quad z = b + \frac{a \sin\eta}{\cosh\xi - \cos\eta}$$

$$P_n(\xi) = \frac{1}{\pi}(n^2 - \tfrac{1}{4})\sinh^{3/2}\xi \int_0^{\Sigma} \frac{\sin^2\phi d\phi}{(\cosh\xi + \cos\phi\sinh\xi)^{n+3/2}},$$

$$q_n(\xi) = -(n - \tfrac{1}{2})\sinh^{\frac{1}{2}}\xi \int_0^{\infty} \cosh t \, dt/(\cosh\xi + \cosh t \sinh\xi)^{n+\frac{1}{2}}$$

$$\phi(r,z) = \left(\frac{a \sinh\xi}{\cosh\xi - \cos\eta}\right)^{\frac{1}{2}} \sum_{n=-\infty}^{\infty} a_n q_n(\xi) e^{in\eta}, \quad a_{-n} = a_n^*$$

$$a_n = \frac{1}{2\pi(n^2 - \tfrac{1}{4})} \int_{\Gamma'} e^{-in\eta} p_n(\xi) g(w) dw$$

$$g(w) = A\left[\frac{\tilde{W}(t)(r^2(t) - r_c^2)}{r(t)\dot{W}(t)}\right]^{\frac{1}{2}}$$

$\Gamma'$ must include the same singularities of g(w) inside $\Gamma$ but none of the singularities of g(w) outside $\Gamma$. a,b is any point inside $\Gamma'$. r,z is inside the circle $\xi_o$ which is the bi-polar coordinate with a,b as coordinate center which reaches the nearest singularity of g(w).

If $\Gamma' = \Gamma$ or if $\xi$ is all inside $\Gamma$ then $\phi(r,z) = \Phi(r,z)$.

Bipolar Coordinates $$w = \rho + iz = ib + a\frac{e^{\xi - i\eta} + 1}{e^{\xi - i\eta} - 1}$$

$$\bar{t} = \xi - i\eta = \ln\frac{w + a - ib}{w - a - ib}$$

$\phi(r,z)$ is defined for all r,z in a circle about the point (a $\coth\xi_o$, b) of radius $a\csch\xi_o$, where the nearest singularity of g(w) outside $\Gamma$ is at $r_1, z_1$ and $\xi_o$ is a solution of the equation $(r_1 - a \coth\xi_o)^2 + (z_1 - b)^2 = (a \csch \xi_o)^2$. Since $\phi$ is also an analytic function of a and b in $\Gamma^1$ we can take $\overline{a,b}$ anywhere in $\Gamma^1$ and find the nearest singularity, $(r_2, z_2)$ and compute the new circle of convergence $$(r_2 - \overline{a} \coth \overline{\xi}_0)^2 = (z_2 - \overline{b})^2 = (\overline{a} \csch \overline{\xi}_0)^2$$

Since $\Gamma'$ can include any point in the half-plane $r > 0$ and still not include the singularities of $g(w)$ outside $\Gamma$ we need only this continuation to get to any point on the half-plane (except, of course, the singularities). This does not give the whole plane with one circle, but it does give the stream function near any desired point. If the branch cuts are to the left of the singularities, it should be remembered that the circle $\xi_o$ might be tangent to one of these lines rather than through a singularity. If we integrate in the t-plane we must be sure that we stay in the region which is 1—1 with the w-plane.

Application to a Limacon

The only singularity of a limacon outside of $\Gamma$ is at $t_1 = \pi - i \ln b/a$:

$$w_1 = \beta + \frac{2}{2} - \frac{b^2}{2a} = w(t_1)$$

$$w(t) = \beta + \frac{a}{2} - \frac{b^2}{2a} + \frac{1}{2a}(b + a e^{-\alpha + i\tau})^2, t = \tau + i\alpha$$

$$r = Rw(t) = \beta + \frac{a}{2} + be^{-\sigma}\cos\tau + \frac{a}{2}e^{-2\sigma}(\cos^2\tau - 1),$$

$$w = r + iz$$

$P$ is the principal part of the branch. It depends on the choice of cut.

$$\sqrt{\frac{2}{a}(w - w_1)} = \sqrt{\frac{2R}{a}} e^{i\theta}, w = w_1 + Re^{i\theta}$$

$$R = \frac{a}{2}[(\frac{b^2}{a^2} - 1\frac{2\beta}{a} + \frac{2r}{a})^2 + (\frac{2z}{a})^2]^{\frac{1}{2}}$$

$$\theta = \arctan \frac{2z/a}{\frac{b^2}{a^2} - 1\frac{2\beta}{a} + \frac{2r}{a}}$$

$$t = -i \ln[-\frac{b}{a} + \sqrt{\frac{2}{a}} R \cos\frac{\theta}{2} + i\sqrt{\frac{2R}{a}} \sin\frac{\theta}{2}]$$

$$= -i \ln(Ae^{\frac{i\tau}{n}}) = \tau - i \ln A$$

$$A = [(\frac{b}{a} + \sqrt{\frac{2R}{a}} \cos\frac{\theta}{2})^2 + (\sqrt{\frac{2R}{a}} \sin\frac{\theta}{2})^2]^{\frac{1}{2}}$$

$$\tau = \arctan\left\{\frac{\sqrt{\frac{2R}{a}} \sin\theta/2}{-\frac{b}{a} + \sqrt{\frac{2R}{a}} \cos\frac{\theta}{2}}\right\}$$

Choose the branch $> \tau > 2\pi$

Stokes Equation and Legendre Functions $$\mu_{\xi\xi} + \mu_{\eta\eta} - \frac{3}{4\sinh^2\xi} \mu = 0 \text{ Separate variables } \mu = F(\xi)H(\eta)$$

$$H''(\eta) + n^2 H(\eta) = 0 \quad H = e^{in\eta}$$

$$F'' - n^2 F - (\frac{3}{4\sinh^2\xi}) F = 0$$

Let $F = \sqrt{\sinh\xi} \ G$ and $\cosh\xi = x$

In our case

General
$$\begin{cases}
(1 - x^2)\frac{d^2G}{dx^2} - \frac{2xG}{dx} + [\nu(\nu + 1) - \frac{\mu^2}{1 - k^2}]G = 0 \ \mu = 1 \ \nu = n - \frac{1}{2} \\
G = A P_\nu^\mu(x) + BQ_\nu^\mu(x) \\
P_\nu^\mu(x) = \frac{2^{-\nu-1}\pi^{-\frac{1}{2}}\Gamma(-\frac{1}{2}-\nu)x^{-\nu+\mu-1}}{(x^2 - 1)^{\mu/2}\Gamma(-\mu - \nu)} F(\frac{1}{2} + \frac{\nu}{2} - \frac{\mu}{2}, 1 + \frac{\nu}{2} - \frac{\mu}{2}; \nu + \frac{3}{2}; \frac{1}{x^2}) \\
+ \frac{2^\nu \Gamma(\frac{1}{2} + \nu)x^{\mu+\nu}}{(x^2 - 1)^{\mu/2}\Gamma(1 + \nu - \mu)} F(-\frac{\nu}{2} - \frac{\mu}{2}, \frac{1}{2} - \frac{\nu}{2} - \frac{\mu}{2}; \frac{1}{2} - \nu; \frac{1}{x^2}) \\
Q_\nu^\mu(x) = e^{i\mu\pi}2^{-\nu-1\frac{1}{2}}\frac{\Gamma(\nu + \mu + 1)}{\Gamma(\nu + \frac{3}{2})} x^{-\mu-\nu-1}(x^2-1)^{\mu/2}F(1 + \frac{\mu}{2} \ \frac{\nu}{2}, \frac{1}{2} + \frac{\mu}{2} \ \frac{\nu}{2}; \nu + \frac{3}{2}; \frac{1}{x^2} \\
F(a,b;c;x) = 1 + \frac{ab}{c} x + \frac{a(a + 1)b(b + 1)}{c(c + 1)} \frac{x^2}{2!} + \frac{a(a + 1)(a + 2)b(b + 1)(b + 2)}{c(c + 1)(c + 2)} \frac{x^3}{3!} + \cdots \\
= \sum_{n=0}^{\omega} \frac{\Gamma(a + n)}{\Gamma(a)} \frac{\Gamma(b + n)}{\Gamma(b)} \frac{\Gamma(c)}{\Gamma(c + n)} \frac{x^n}{n!}
\end{cases}$$

$$P_\nu^1(x) = (x^2 - 1)^{\frac{1}{2}} p_\nu^1(x) = (x^2 - 1)^{\frac{1}{2}} \frac{dp\nu}{dx}$$

$$P_{n-\frac{1}{2}}^m(\cosh\xi) = \frac{\Gamma(n + m + \frac{1}{2})(\sinh\xi)^m}{\Gamma(n - m + \frac{1}{2})2^m \sqrt{\pi} \ \Gamma(m + \frac{1}{2})} \int_0^\pi \frac{\sin\phi d\phi}{(\cosh\xi + \cos\phi\sinh\xi)^{n+m+\frac{1}{2}}}$$

$$Q_{n-\frac{1}{2}}^m(\cosh\xi) = \frac{(-1)^m \Gamma(n + \frac{1}{2})}{\Gamma(n - m + \frac{1}{2})} \int_0^\infty \frac{\cosh m \ t \ dt}{(\cosh\xi + \cosh t \sinh\xi)^{n+\frac{1}{2}}}$$

$P_{n-\frac{1}{2}}(\cosh\xi) = $ series on page 1023 of Gradstyn $$Q_{n-\frac{1}{2}}^m(\cosh\xi) = \frac{(-1)^m 2^m \Gamma(n + m + \frac{1}{2}) \sqrt{\pi}}{(m + 1)} (\sinh\xi)^m e^{-(n+m+\frac{1}{2})\xi}$$

$$\cdot F(m + \frac{1}{2}, n + m + \frac{1}{2}; n + 1; e^{-2\xi})$$

$$P_n(\xi) = \sqrt{\sinh\xi} \ P_{n-\frac{1}{2}}^1(\cosh\xi), \ q_n(\xi) = \sqrt{\sinh\xi} \ Q_{n-\frac{1}{2}}^1(\cosh\xi)$$

$z = Iw(t) = e^{-\sigma}\sin\tau(b + a e^{-\sigma}\cos\tau)$ $$t = -i \ln(-\frac{b}{a} + P\sqrt{\frac{2}{a}(w - w_1)})$$

The Cut:

The cut at $w_1$ can be chosen in at least 3 different ways:
 (a) on the real axis to the left of $w_1$
 (b) on the real axis to the right of $w_1$
 (c) below the z axis at $r = w_1$ (a) and (b) have the advantage of symmetry with respect to the r axis. (b) has the advantage that the two cuts overlap. To the left of $w_1$ are no singularities. (a) and (c) have the advantage that the cut doesn't go through the Limacon. In (b) the top and bottom parts of the Limacon are in separate regions of the t-plane. (b) and (c) have the advantage that there is no singularity to the left of $w_1$. Since we are interested in values on the real axis, (c) seems to be the best choice, despite the lack of symmetry. The 3 cuts are indicated in FIGS. 10–13.

Angles:
In (a) $\theta$ is chosen so that $-\pi < \theta < \pi$
In (b) $\theta$ is chosen so that $0 < \theta < 2\pi$
In (c) $\theta$ is chosen so that $(-\pi)/2 < \theta < 3\pi/2$ The coordinates for case (c) are:

$w_\infty = \beta + \dfrac{a}{2}$  $\quad t_\infty = \tau + i\infty \quad 0 < \tau < 2\pi$
depends on direction of approach $w_1 = \beta + \dfrac{a}{2} - \dfrac{b^2}{2a}$  $\quad t_1 = \pi - i\ln\dfrac{b}{a}$ $w_A = 0$ $t_A = \cos^{-1}\dfrac{b}{a\sqrt{1 + \dfrac{2\beta}{a}}} - \dfrac{i}{2}\ln(1 + \dfrac{2\beta}{d})$ the same $\sigma$ value on $r = 0$ as $\tau = \pi/2$ $w_C = -\infty + oi$  $\quad t_C = \dfrac{\pi^+}{2} - i\infty$ $w_D = -i\infty$  $\quad t_D = \dfrac{7}{4}\pi - i\infty$ $w_E = \infty - io$  $\quad t_E = 2\pi - i\infty$
$w_F = \beta + a + b - io$  $\quad t_F = 2\pi$
$w_G = \beta + a - b$  $\quad t_G = \pi$
$w_H = \beta + a + b + io$  $\quad t_H = 0$
$w_I = \infty + io$  $\quad t_I = -\infty + oi$
$w_J = i\infty$  $\quad t_J = \dfrac{\pi}{4} + -i\infty$ $w_M = w_1^- - i\infty$  $\quad t_M = \dfrac{3\pi}{4} - i\infty$ $w_N = w_1^+ - i\infty$  $\quad t_N = \dfrac{7\pi}{4} - i\infty$ $w_P = i\,p$  $\quad t_P = \cos^{-1}\dfrac{b}{\sqrt{8a(w_1 + \dfrac{b^2}{4a})}} - \dfrac{i}{2}\ln(1 + \dfrac{2\beta}{a} - \dfrac{b^2}{2a^2})$ max. value of $\sigma$ on $r = 0$ curve There are 4 curves in the t plane corresponding to $z=0$.

(1) $\tau = \pi \quad \sigma > -\ln b/a$
(2) $\pi/2 < \tau < \pi \quad \sigma = -\ln(-b/a \cos\tau)$
(3) $\tau = 0 \quad -\infty < \sigma < \infty$
(4) $\tau = 2\pi \quad -\infty < \sigma < \infty$ Jörgens give a real integral $$a_n = \dfrac{1}{2\pi(n^2 - \tfrac{1}{4})} \int_0^{2\pi} e^{-in\eta(t)} p_n(\xi(t)) f(t) dt = \int_0^{2\pi} F(t) dt$$

This is equivalent to a line integral on $\Gamma$ $$a_n = \int_\Gamma F(t) dt$$

where the integral goes from H to F, in a counter-clockwise direction. See FIG. 14.

This is not a closed path unless it avoids the cut as indicated in FIG. 15.

When we distort $\Gamma$, to a new curve $\Gamma^1$, the beginning point H and the ending point F must not change, if the $a_n$ is to be invariant. See FIG. 16.

The second example would be okay if we included integrals along the cut from $H^1$ to H and from F to $F^1$. In the t-plane this is shown in FIG. 17.

If we wanted $\Gamma^1$ to cover the whole plane to the right of $z=0$ and outside $\Gamma$ we would integrate from H to F as shown in FIG. 18.

$$a_n = \int_0^{2\pi} F(t)dt = \int_H^F F(t)dt =$$

$$\int_H^I + \int_I^J + \int_J^P + \int_P^D + \int_D^M + \int_M^l + \int_l^{} + \int_l^N + \int_N^E + \int_E^F$$

Any contour inside of this contour could be taken if the numerical work is simpler. However, the path $\Gamma^1$ should include the segment from A to 1 if we are inerested in finding flux lines to the left of $W_1$. In locating a to the right of $W_\infty$ the nearest singularity is the branch cut. The integral (16) can be distorted in a similar way if one avoids the point r,z.

After $\Psi$ has been computed at every point, the curves for the fluxlines $\Psi(r,z)=$constant can be computed from $$\dfrac{dr}{ds} = -\psi_z(r,z)/r$$

$$\dfrac{dz}{ds} = \psi_r(r,z)/r$$

$r(s_0)=r_0$, $z(s_0)=z_0$
This gives $r=r(s)$, $z=z(s)$ as the parametric equations of the flux lines.

D. NUMERICAL COMPUTATION OF SOLUTIONS OF STOKES' EQUATION WITH PRESSURE BALANCE BOUNDARY CONDITIONS

INTRODUCTION

Figure 19:
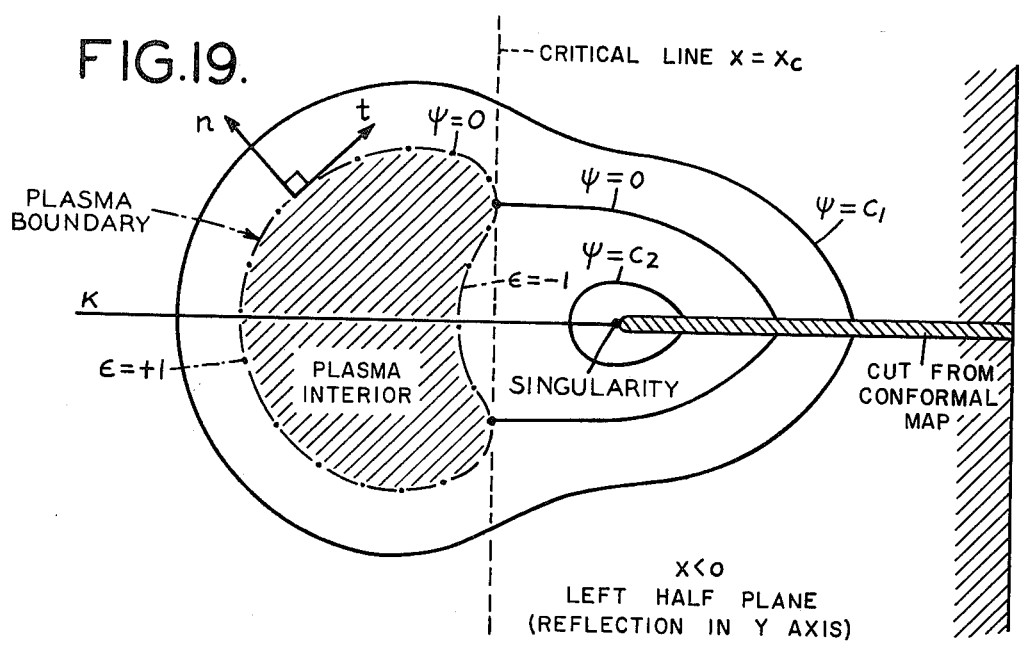
Figure 22:
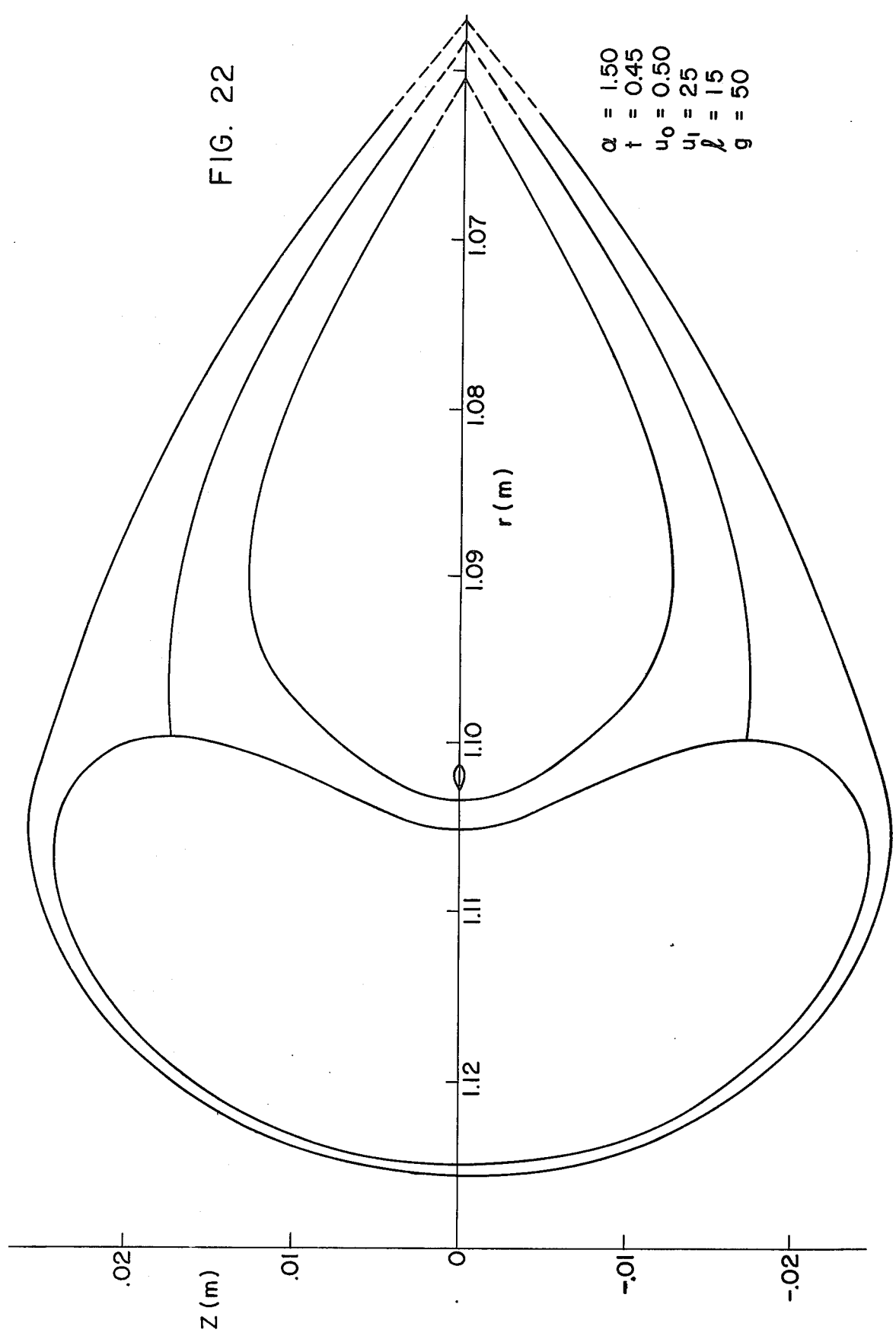
Figure 23:
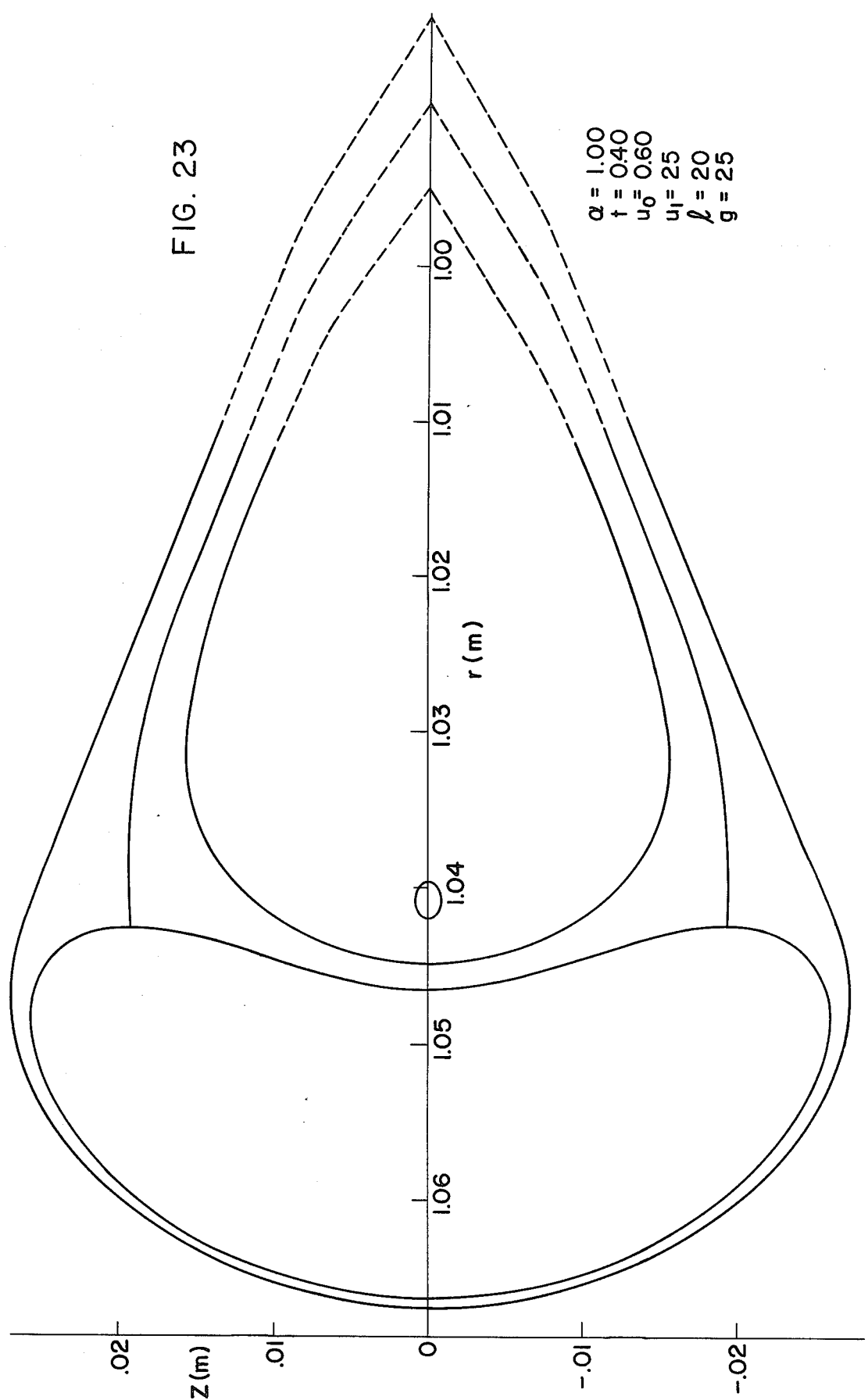

We describe the results of applying difference methods to the numerical solution of an elliptic partial differential equation (Stokes') in the region exterior to a nonconvex boundary which boundary has Cauchy-type conditions involving both values of the solution and of the normal derivative. Five point difference equations (Laplace type) corresponding to Stokes' equation are constructed in the usual manner for a conformal but noncartesian grid. Given the value of the function on the boundary and a second order approximation of the function via the normal derivative in the first exterior difference layer off of the boundary, the function can be continued into the exterior by employing the five point difference scheme. Although this continuation cannot be carried out indefinitely, the solutions we seek are essentially local ones; that is, we usually need only to go beyond one singularity outside the plasma boundary. FIG. 19 is a sketch summarizing the numerical results and establishes our notation. The subsequent FIGS. 21-23 are scale reproductions of actual calculated plots and upon fixing a coordinate system may be regarded as numerical data suitable for the construction of specific machines. (The dotted curves are the expected extrapolations beyond the range of the difference procedure.)

A DIFFERENCE METHOD

The purpose of this section is two-fold. One is to locate a reasonable source of non-convex regions of the type suggested by FIG. 19. We should thus be able (without seriously altering the numerical technique for solving Stokes' equation for such a boundary) to control the aspect ratio, dimple, etc., of the region. The second is to develop the difference equations germane to such a family.

the boundary value problem exposed above consisted of a simple closed analytic curve, Γ, lying in the right half plane. The interior region associated with this curve is assumed to abe a non-convex region as in FIG. 19 (or its mirror-image in the y-axis) and touches the critical line at exactly two points. We assume for convenience that the region is symmetric with respect to the horizontal axis. We suppose that the solution, Ψ, of Stokes' equation is zero on the curve Γ and its (outwardly directed) normal derivative equal to a prescribed function derived from the pressure balance of the plasma and the magnetic field at the plasma surface. (We view Γ as a cross-section of this plasma surface.) The problem is to solve the system (a) $\Delta_* \Psi = 0$ (exterior to Γ)
(b) $\partial \Psi / \partial n = f$ (equality on the curve Γ)
(c) $\Psi = 0$ (equality on the curve Γ)

where $\Psi = \Psi(x,y)$, $f = \epsilon \sqrt{x^2 - x_c^2}$, the values of $\epsilon$ are indicated in FIG. 19, n is the (outwardly-directed) normal, $\partial/\partial n$ is the normal derivative and $\Delta_*$ is the (elliptic) Stokes' operator $$\Delta_* = \frac{\partial^2}{\partial x^2} - \frac{1}{x} \frac{\partial}{\partial x} + \frac{\partial^2}{\partial y^2}.$$

We refer to this as a Cauchy-Stokes system.

Figure 20A:
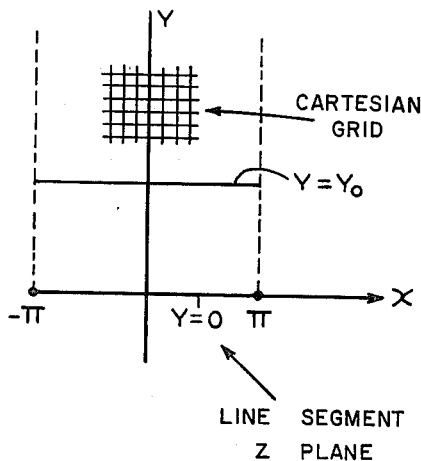
Figure 20B:
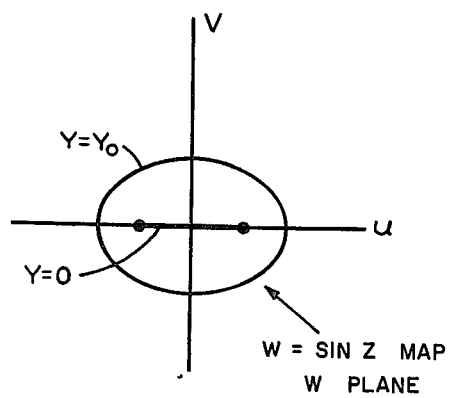
Figure 20C:
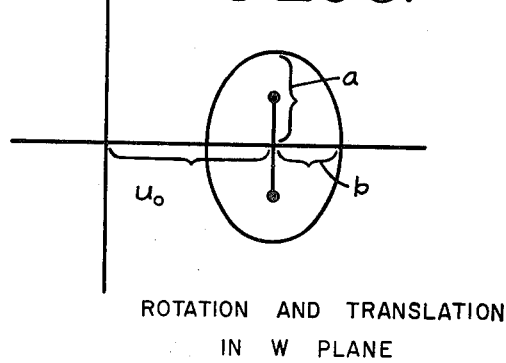
Figure 20D:
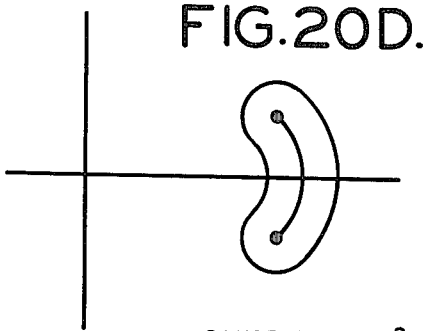

Since Γ is a simple closed curve, one expects that a reasonable source of such curves can be had by conformal mapping of a line segment. Furthermore, a line segment has a natural grid associated with it, hence the conformal map will carry this grid into a natural grid around the curve Γ. We will compose several conformal maps as follows. Refer to the z-plane with coordinates $x,y,z=x+iy$, and the W-plane $u,v,w=u+iv$. Take the line segment, $-\pi < x \leq \pi$, $y=0$ as in FIG. 20a, map to the W-plane in FIG. 20b, via the sin z map. Note that the ellipse is the image of the line segment $y=y_0$, $-\pi < x \leq \pi$. Then rotate the ellipse 90° and translate to the right (this translation relates to the aspect ratio of the torus). Then the right half of the plane in FIG. 20d is the result of squaring a hyperbolic region of the right half plane in FIG. 20c. Of course, this half plane in FIG. 20d containing the nonconvex region is the domain of interest for our solutions of Stokes' equation. A specific example of this procedure is the conformal map $$w = u_1 + \left( u_0 + \frac{i \sin z}{2 \cosh y_0} \right)^2$$

where the z refers to the plane in FIG. 20a and the w to the plane in FIG. 20d. $u_0$ is the distance of the center of the ellipse to the origin in the plane of FIG. 20c; $u_1$ is the distance from the singularity to the origin after the region of FIG. 20d is translated for a particular aspect ratio.

We now proceed to the development of Stokes' analogues of the Laplace five point formula. We will solve the difference equation in the z-plane which yields, under the conformal map, the solution of Stokes' equation in the w-plane. Naturally the two boundary conditions to be imposed in the z-plane will differ from those of the original problem. It is convenient to let $\Psi = x^{\frac{1}{2}} Q$, which gives rise to the Cauchy-Stokes system in the z-plane:

$Q_{xx} + Q_{yy} = \frac{3Q}{4u^2} \left| \frac{dw}{dz} \right|^2$     (equality in the vertical strip)    (a)

$\frac{\partial Q}{\partial n} = \frac{f}{u^{\frac{1}{2}}} \left| \frac{dw}{dz} \right|$     (equality on the line segment)    (b)

$Q = 0$     (equality on the line segment)    (c)

Converting this system by the usual procedure into a difference system yields the five point equation (corresponding to (a) above)

$$Q(x, y+h) = Q(x,y) \left[ \frac{3h^2}{4u^2} \left| \frac{dw}{dz} \right|^2 + \frac{2h^2}{k^2} 2 \right]$$
$$- \frac{h^2}{k^2} [Q(x-k, y) + Q(x+k, y)]$$
$$- Q(x, y-h),$$

where h and k are independent increments in the y and x directions respectively. The (c) boundary condition simply states that Q is zero for the boundary points, viz., the first layer of the difference scheme. The second layer obtains by applying condition (b) and recognizing that Q has (locally) a Taylor expansion along the direction of the normal to Γ. (If s is direction along the normal then $$\psi = O + (s + \frac{s^2}{2}) \frac{\partial f}{\partial n}$$

represents three terms of that expansion.) Thus conditions (b) and (c) give the first two layers and the five point difference formula is operative to get the third layer.

THE NUMERICAL PLOTS

This section consists of the pictures of a number of numerical experimentsusing the techniques of the previous section. These involve variations of distance of the plasma from the origin, height and width of the plasma, dimple size, as well as variations of the ratio of h and k and mesh size for observing the good stability (numerically) of the difference scheme. The computer drawn pictures present three flux lines, viz., $\Psi = 0$ and $\Psi =$ two other constants, one line around the singularity and the other line around the plasma, singularity and $\Psi = 0$ line. (We define a flux line to be a $\Psi =$ constant curve.) Note that the pictures in this section are of $\Psi$ and not of Q curves. $u_1$ and $u_0$ are defined in the previous section; $\alpha = h/k$ and $t = b/a$ where b is the minor and a is the major axis of the ellipse in FIG. 20c. FIG. 21 includes the conformal grid associated with the difference scheme. (For consistency with FIGS. 1 and 2, FIGS. 21, 22 and 23 have been mirror-reflected in the y-axis, after being originally computed precisely as indicated above.)

The parametric form of the equation for the curve, Γ, describing the poloidal plasma cross-section for the parameters of FIG. 21 is $$\omega = 25.1503125 + 0.225 \cos \chi + 0.1503125 \cos 2\chi + i[0.5 \sin \chi + 0.1125 \sin 2\chi]$$

where the parameter $\chi$ varies between $-\pi$ and $\pi$. Any units may be used for $\omega$. In FIG. 21, 0.45 $\omega$-units is .2 inches. The toroidal axis is 9.454 feet to the right of the outer extremity of the plasma. The line of symmetry is the radius axis.

FIG. 22 shows the somewhat enlarged plasma surface, Γ, and flux surfaces for the same parameters as for FIG. 21 but with the grid removed so as to exhibit more clearly the nature of the flux surfaces.

FIG. 23 is similar to FIG. 22, but with a different set of parameters.

These numerical plots exhibit clearly the physical realizability of the structurally stable magnetic field configuration of this invention. These magnetic fields may be practically realized in a device by locating current carrying wires along a given flux surface and everywhere that point and line singularities of these flux surfaces occur; or locating current double layers (see under Part I above) along surfaces which are not flux surfaces in accordance with standard procedures in this art (see, e.g., Stratton, *Electromagnetic Theory*, McGraw-Hill, 1941). FIG. 2B shows an example of this latter method. Since the magnetic configuration described corresponds to a non-zero net flux through the surface between the plasma and the toroidal axis, an equal amount of bias flux must be initially present passing somewhere through this same surface, preferably near the toroidal axis. This bias flux must be made to vanish as the confining magnetic configuration is established.

Alternatively, the net flux through the surface between the plasma and the toroidal axis may be kept at zero by turning on a biasflux near the axis, equal in magnitude but opposite in direction, to the net flux through this surface due to the main field as the main field is turned on.

E. NUMBER OF LIMIT CYCLES MUST BE EVEN

According to criterion (d) of structural stability specified in Part 2A above, the unit-length vector field $\vec{B}/B$ on $\pi$ can have only a finite number N of closed orbits (i.e. periodic solutions of $d\vec{r}/ds = \vec{B}(\vec{r})/B(\vec{r})$); and each such orbit must be *simple* in the sense that equation (6) must hold. But equation (6) implies that (see [5.1]) each such orbit must be *asymptotically stable* either for the given sense of the arc length parameter s, or after s is replaced by $(-s)$. This clearly rules out the possibility of a semi-stable limit cycle. But if the number N were odd, there would have to be at least one limit cycle with trajectories approaching it on one side and leaving it on the other side, i.e., a semi-stable limit cycle. This contradiction proves that N must be an even number.

REFERENCE

[5.1] S. Lefschetz, *Differential Equations: Geometric Theory*, Inter-Science, 1963.

F. ROTATIONAL TRANSFORM ANGLE MUST BE ZERO

Here we employ the Poincare-Denjoy theory of differential equations on a torus. See, for example, Kneser [6.1], Coddington-Levinson [6.2], and hartman [6.3]. In the standard mathematical theory the *rotation number* lies between zero and unity because the arc length of the appropriate circle of minor cross-section is normalized to unity. In the present art the *rotational transform angle* is the same as the standard mathematical rotation number multiplied by $2\pi$.

We now restrict attention to the magnetic field lines on a toroidal magnetic shell which is the surface $\Sigma$ of a unity $\beta$ plasma. The normal component of $\vec{B}$ must be continuous across $\Sigma$, and since there is no magnetic field inside of $\Sigma$, the normal component must also vanish outside of $\Sigma$, i.e., $\vec{B}$ must be tangent to $\Sigma$. Also the combination of Maxwell's Equations of electromagnetism and Bernoulli's principle for fluids implies that the total pressure $p_T$ must be continuous across $\Sigma$, i.e. $B = \sqrt{2\mu p} > 0$. Hence the vector $\vec{B}$ not only cannot vanish on $\Sigma$ but it must have a constant length $B > 0$ everywhere on $\Sigma$.

By hypothesis the toroidal component $B_0$ of $\vec{B}$ is always greater than the poloidal component $\sqrt{B_r^2 + B_z^2}$ (assuming axial symmetry). Hence the vector $\vec{B}$ always cuts the topological circle Γ at a non-zero angle (i.e. it cannot be tangent to Γ). Therefore if $\vec{r}_o$ is an arbitrary point on Γ, the solution $\vec{r} = \vec{r}(s)$ of $d\vec{r}/ds = \vec{B}(\vec{r})/B(\vec{r})$ which satisfies $\vec{r}(0) = \vec{r}_o$ must have a smallest value $S_1 > 0$ for which $\vec{r}_1 = r(S_1)$ lies on Γ; likewise, there will be a smallest $S_{k+1} > S_k$ for which $\vec{r}_{k+1} = \vec{r}(S_{k+1})$ again lies on Γ, for $k = 0, 1, 2, 3, \ldots$ Let $\delta_k$ denote the arc length on Γ between $\vec{r}_k$ and $\vec{r}_{k+1}$ divided by the total arc length of Γ. The rotational transform angle $\alpha$ is defined by $$\alpha = 2\pi \{\lim_{k \to +\infty} (\frac{\delta_1 + \delta_2 + \ldots + \delta_k}{k})\}$$

It is proved in the works cited that $\alpha$ is independent of the particular choice of $\vec{r}_o$ on Γ. The conventional mathematical rotation number is now $(\alpha/2\pi)$.

For the present purpose it is reasonable to say that, by definition, an equilibrium configuration $(\Sigma_o, \vec{B}_o)$ *lacks static structural stability* if there is an arbitrarily close configuration $(\Sigma_1, \vec{B}_1)$ which lacks structural stability in the mathematical sense of Peixoto and Pliss and which is *physically accessible* from $(\Sigma, \vec{B})$, i.e. which can be attained by a continuous deformation $(\Sigma_\sigma, \vec{B}_\sigma)$, $0 \leq \sigma \leq 1$, in which each configuration $(\Sigma_\sigma, \vec{B}_{94})$ is a magneto-static equilibrium which is physically realizeable for some plasma pressure $p_\sigma > 0$.

The necessary and sufficient criteria for structural stability stated by Pliss are equivalent to those of Peixoto but are formulated somewhat differently; they are:

(a) the vector field must have a rational rotation number;

(b) all the periodic field lines must have non-zero characteristic exponents.

The rotational transform angle has been used in the present art by Spitzer, (U.S. Pat. No. 3,002,912), by Kulsrud et al (U.S. Pat. No. 3,012,955) and by Koenig (U.S. Pat. No. 3,088,894), wherein magneto-static equilibrium of the plasma is achieved by means of a *non-zero* rotational transform. It will be shown below that if one reduces the rotational transform in a Stellarator, Tokomak, Screw Pinch, Scyllac (or high-$\beta$ Stellarator), or similr device toward zero then of necessity one must bring the plasma into contact with an external conductor, obviating the device's utility.

In the simplest case, Γ may be taken to be the boundary of a convex body, e.g. an ellipse or a circle, and there turns out to be a simple dichotomy between the cases where the rotation number is a *rational* number (terminating or repeating decimal fraction) and the cases where it is an *irrational* number (infinite nonrepeating decimal fraction): when $(\alpha/2\pi)$ is rational all of the field lines are closed, and when it is irrational all of them are "ergodic" (i.e. wind densely on the torus $\Sigma$ without ever exactly closing upon themselves).

In the present art it is seemingly universally believed and stated, erroneously, that the preceding dichotomy is true in general. For example, the 1965 survey article by Greene and Johnson ([6.4]) repeats this fallacious dichotomy on page 201 (lines 8-9 and 20-21) and then uses it as a basis for the remainder of the 43-page survey. However, there is in actuality a third possibility, treated definitively in 1924 by Kneser [2.1], in which all but a finite number of the field lines are "asymptotic" (to one of finite number of closed limit cycles). It is this third case upon which attention is focused by Pliss's structural stability criteria.

Now consider the case of axial symmetry. If $\Gamma$ lies wholly to the right of the vertical line $r=r_c$, then $\partial\Psi/\partial n \neq 0$ at all points on $\Gamma$, and a particular choice of the $\pm$ sign in equation (2.15) must be made; for example, choose the $+$ sign. Now $\Gamma$ may be chosen to be an analytic curve without essential loss of generality, and since $\Psi=0$ and $\partial\Psi/\partial n=C\sqrt{r^2 r_c^{-2}-1}$ are (for $r>r_c$) analytic boundary conditions on $\Gamma$ the Cauchy-Kovalevski Theorem implies that $\Psi$ is a real analytic function of (r,z) in a neighborhood of $\Gamma$ (increasing outward from $\Gamma$). Thus in a neighborhood of $\Gamma$ the curves $\Psi=$constant form a set of nested circles which by rotation about the axis of symmetry generate a family of nested tori about $\Sigma$. Now $(\alpha/2\pi)$ will be an analytic function of the indexing parameter $\Psi$; if not identically constant it will have both rational and irrational values arbitrarily near to $\Psi=0$, a case eliminated by the definition of static structural stability. Likewise the case where $(\alpha/2\pi)$ is an irrational constant can be a priori eliminated from consideration by Pliss's first criterion. The case where $(\alpha/2\pi)$ is hypothesized to be a rational constant may be eliminated because of the requirements of isolated closed field lines and axial symmetry.

Therefore $\Gamma$ must intersect the line $r=r_c$. No point on $\Gamma$ may lie to the left of this line (i.e., in the region $r>r_c$) because then the square root in equation (2.15) would have to be imaginary. Thus $\Gamma$ must *touch* the line $r=r_c$ but not cross it.

At each point where $\Gamma$ touches the line $r=r_c$, i.e., where $\partial\Psi/\partial n=0$, one must have $B_r=B_z=0$. Hence the field line through such a point is purely azimuthal and, by axial symmetry, continuous around the torus, and forms a closed orbit.

Hence $\Gamma$ can touch the line $r=r_c$ only at a finite number of points, by Peixoto's criterion (d), and all other field lines or "trajectories" must be asymptotic to these closed orbits by Peixoto's criterion (b); hence these closed orbits are limit cycles. As above in sub-part E, there can only be an even number of them.

We shall next show that in this case the rotational transform must be identically zero. Pick a point on $\Gamma$ whose arc-length distance from its limit-cycle's intersection with $\Gamma$, divided by the arc length of $\Gamma$, is less than a pre-specified arbitrary constant $\epsilon$. Now the trajectory through this point spirals endlessly nearer to the limit-cycle without crossing it, in such a manner that each $\delta$ defined above satisfies $\delta_k = \epsilon$. Hence $$\frac{\alpha}{2\pi} = \lim_{k\to\infty} \left(\frac{\delta_1 + \delta_2 + \ldots + \delta_k}{k}\right) < \frac{k\epsilon}{k} = \epsilon.$$

But $\epsilon$ was arbitrary and $(\alpha/2\pi) < \epsilon$ is independent of the original point chosen on $\Gamma$. Hence $(\alpha/2\pi)=0$.

Thus the requirement that $\Gamma$ must touch the line $r=r_c$ exactly an even number of times, as illustrated in FIG. 5, implies that the rotational transform $\alpha$ of the field on $\Sigma$ must vanish.

The rotational transform angle $\alpha$ may be calculated explicitly for the case where $\Gamma$ is a circle, as in Jörgens [6.5] (see also Lüst and Schlüter [6.6], Biermann et al [6.7], and Kippenhahn [6.8]). Letting $\alpha$ tend to zero implies that $\Gamma$ moves closer to $r=r_c$, finally touching the line at the point 18 in FIG. 9 when $\alpha=0$. The results of Jörgens just cited imply that point 18 is an elliptic singularity and that there must be an external conductor through point 18. Hence the usual case where $\Gamma$ is the boundary of a convex body, i.e. where the poloidal cross-section of the plasma is convex, cannot be physically realizeable if the rotational transform is required to vanish.

If, however, the square root in equation (2.15) *changes sign* at each of the even number of points where $\Gamma$ touches the line $r=r_c$ then, by the preceding, the rotational transform vanishes identically, while in subpart B, the corresponding configuration is physically realizable.

In this case the plasma surface cannot leave the line $r=r_c$. There will be an even number of oppositely-directed toroidal surface currents in strips and therefore (by continuity) there must be an even number of intervening zero-current lines or strips (in between the current strips). But where the toroidal current is zero the poloidal field is also zero and so pressure balance requires that such points touch the line $r=r_c$. Therefore the hypothesis of a continuous infinitesimal movement of $\Gamma$ into the open set $r>r_c$ contradicts the physical existence of the postulated types of sheet currents. One might consider a configuration topologically equivalent to that under consideration except that one or more of the original limit-cycles would be replaced by a continuum of closed orbits; however for infinitesimal perturbations this would violate the Peixoto-Pliss criteria.

REFERENCES

[6.1] H. Kneser, *Mathematische Annalen*, vol. 91 (1924), pp. 135-154 [6.2] E. A. Coddington and N. Levinson, *Theory of Ordinary Differential Equations*, McGraw Hill, 1955.

[6.3] P. Hartman, *Ordinary Differential Equations*, Wiley, 1964.

[6.4] K. Brueckner, editor, *Advances in Theoretical Physics*, vol. 1 (1965).

[6.5] K. Jörgens, *Zeitschrift fur Naturforschung*, vol. 13a (1958), pp. 493-498. (English translation available from McDonnell-Douglas Astronautics Company, Santa Monica, California, as paper MDC-G1140.)

[6.6] R. Lüst and A. Schlüter, *Z. Astrophys.*, vol. 38 (1955), p. 190, and *Zeitschrift fur Naturforschung*, vol. 12a (1957), p. 850.

[6.7] L. Biermann, K. Hain, K. Jörgens, and R. Lür Naturforschung, vol. 12a (1957), p. 826.

[6.8] R. Kippenhahn, *Zeitschrift fur Naturforschung*, vol. 13a (1958,), p. 260.

[6.9] J. M. Greene and J. L. Johnson, *Physics of Fluids*, vol. 4 (1961), pp. 875–890.

G. LIMIT CYCLES ARE IN FACT SIMPLE

It was proved above in sub-parts B, E and F that for static structural stability the plasma boundary's cross section must touch the critical line $r=r_c$ an even number of times and that if the square root in equation (2.15) changes sign at each point of contact the corresponding plasma equilibrium is physically realizable. It remains only to prove that each such contact point generates a "simple" limit cycle in order to fulfill all of the criteria of Peixoto and Pliss.

Here the following topics relative to a vector field on a surface will be treated:

(1) "Area-preserving on a surface" will be defined.

(2) It will be shown that "area-preserving on a surface" is equivalent to the vanishing of the two-dimensional divergence (which quantity will also be defined).

(3) It will be shown that the magnetic field in the method described in Part 2A cannot be area-preserving on the plasma surface. (Its two-dimensional divergence cannot vanish everywhere on the surface).

(4) It will also be shown by means of local solution of the equations that the two-dimensional divergence of the magnetic field cannot even vanish on the limit cycles. It is shown finally that this proves the simplicity criterion of Peixoto and Pliss.

We turn now to a more detailed consideration of the preceding four points:

(1) Consider a surface $\Sigma$ with a tangent vector field $\vec{B}$. (In the application to the method described in Part 2A, $\Sigma$ will be the plasma surface and $\vec{B}$ will be the magnetic field). Take a closed oriented curve C lying in $\Sigma$ and let the vector element of length be $d\vec{x}$. Let $\hat{n}$ be the unit normal vector on $\Sigma$ (into the paper). Then $\hat{n} \cdot d\vec{x} = 0$ and $\hat{n} \times d\vec{x}$ is a vector of length $|d\vec{x}|$, tangent to $\Sigma$, and perpendicular to and pointing out from C. See FIG. 24.

We say that $\vec{B}$ is area-preserving on $\Sigma$ if $$\int_C \vec{B} \cdot \hat{n} \times d\vec{x} = 0$$

for every C lying in $\Sigma$. This says that there are just as many $\vec{B}$-lines going out of C as coming in. This is the exact analogue of $$\int_\sigma \vec{B} \cdot \hat{n}\, da = 0$$

for a closed surface $\sigma$, which is the condition for B to be *volume*-preserving and which is equivalent to $\nabla \cdot \vec{B} = 0$ (the three-dimensional divergence vanishes).

(2) We now use the techniques of differential forms to define the two-dimensional divergence of B, $\nabla^{(2)} \cdot \vec{B}$, and to prove the equivalence stated above in (2).

We consider two-unit vectors $\hat{e}_1$ and $\hat{e}_2$ which span the surface $\Sigma$. The vectors $\hat{e}_1, \hat{e}_2,$ and $\hat{n}$ may be taken as a positively-oriented orthonormal triple. A displacement $d\vec{x}$ in $\Sigma$ may be written $$d\vec{x} = \omega^1 \hat{e}_1 + \omega^2 \hat{e}_2$$

where the $\omega^i = \hat{e}_i \cdot d\vec{r}$ are 1-forms. (For background, see H. Flanders, *Differential Forms*, Academic Press, 1963, pp. 40–44.) The star operator * is defined by requiring it to be linear and by the equations $$*\omega^1 = \omega^2$$

$$*\omega^2 = -\omega^1$$

$$*1 = \omega^1 \wedge \omega^2$$

$$*(\omega^1 \wedge \omega^2) = 1$$

If a vector $\vec{B}$ tangent to $\Sigma$ is written $$\vec{B} = B_1 \hat{e}_1 + B_2 \hat{e}_2$$

we define a 1-form by $$\omega = B_1 \omega^1 + B_2 \omega^2.$$

The two-dimensional divergence of B is now defined to be $$\nabla^{(2)} \cdot \vec{B} = *d(*\omega).$$

(This coincides with the usual expression in Cartesian coordinates.) We note that $$\begin{aligned}
*\omega &= B_1 \omega^2 - B_2 \omega^1 \\
&= (\hat{e}_1 \cdot \vec{B})(\hat{e}_2 \cdot d\vec{x}) - (\hat{e}_2 \cdot \vec{B})(\hat{e}_1 \cdot d\vec{x}) \\
&= (\hat{e}_1 \times \hat{e}_2) \cdot (\vec{B} \times d\vec{x}) \\
&= \hat{n} \cdot \vec{B} \times d\vec{x} = \hat{n} \times \vec{B} \cdot d\vec{x} \\
&= -\vec{B} \times \hat{n} \cdot d\vec{x} = -\vec{B} \cdot \hat{n} \times d\vec{x}
\end{aligned}$$

Also, $d(*\omega) = *(\nabla^{(2)} \cdot \vec{B}) = \nabla^{(2)} \cdot \vec{B}\, \omega^1 \wedge \omega^2$. We integrate the latter equation over the interior $\hat{S}$ of a closed curve C and use Stokes' theorem:

$$\int_S \nabla^{(2)} \cdot \vec{B}\, \omega^1 \wedge \omega^2 = \int_S d(*\omega) = \int_C *\omega = -\int_C \vec{B} \cdot \hat{n} \times d\vec{x}$$

If now $\vec{B}$ is area-preserving on $\Sigma$, then the last integral vanishes for all C and so $\nabla^{(2)} \cdot \vec{B} = 0$. The converse holds, and so the two conditions are equivalent.

(3) We calculate $\nabla^{(2)} \cdot \vec{B}$ on the surface $\Psi = $ constant (which is $\Sigma$) for the method described in Part 2A. We note first that $$\hat{n} = \frac{\nabla \psi}{|\nabla \psi|} = \frac{\psi_r \hat{r} + \psi_z \hat{k}}{\sqrt{\psi_r^2 + \psi_z^2}}$$

where subscripts denote partial derivatives and $\hat{r}$ and $\hat{k}$ are unit vectors in the r and z directions in cylindrical polar coordinates. We take $\hat{e}_1 = \hat{\phi}$. Then $$\hat{e}_2 = \hat{n} \times \hat{e}_1 = \frac{\nabla \psi \times \hat{\phi}}{|\nabla \psi|} = \frac{\psi_r \hat{k} - \psi_z \hat{r}}{\sqrt{\psi_r^2 + \psi_z^2}}.$$

We note that on $\Sigma$, $d\Psi = 0$, or $$\Psi_r dr + \Psi_z dz = 0.$$

Now $$\hat{x} = r\hat{r} + z\hat{k},$$

whence $$d\vec{x} = dr\hat{r} + rd\phi\hat{\phi} + dz\hat{k},$$

$$\omega^1 = \hat{e}_1 \cdot d\vec{x} = rd\phi,$$

and $$\omega^2 = \hat{e}_2 \cdot d\vec{x} = \frac{\psi_r dz - \psi_z dr}{\sqrt{\psi_r^2 + \psi_z^2}} = \frac{1}{\psi_r}\sqrt{\psi_r^2 + \psi_z^2}\,dz$$

Next $$\vec{B} = \frac{1}{r}(\hat{r}\psi_z - \hat{k}\psi_r) + \frac{c}{r}\hat{\phi}$$

$$= -\frac{1}{r}|\nabla\psi|\hat{e}_2 + \frac{c}{r}\hat{e}_1$$

so that $$B_1 = \frac{c}{r},\ B_2 = \frac{1}{r}|\nabla\psi|.$$

Now $$*\omega = B_1\omega^2 - B_2\omega^1$$

$$= \frac{c}{r}\omega^2 + \frac{1}{r}|\nabla\psi|\omega^1$$

$$= \frac{c}{r\psi_r}\sqrt{\psi_r^2 + \psi_z^2}\,dz + \sqrt{\psi_r^2 + \psi_z^2}\,d\phi.$$

Since $(r,z)$=constant on $\Sigma$, we may take r to be a function of z, so that the coefficient of dz is a function of z. The exterior derivative of this term therefore vanishes. Thus we have $$d(*\omega) = d(\sqrt{\psi_r^2 + \psi_z^2}\cdot d\phi)$$

$$= \frac{1}{\sqrt{\psi_r^2 + \psi_z^2}}[(\psi_r\psi_{rr} + \psi_z\psi_{rz})dr + (\psi_r\psi_{rz} + \psi_z\psi_{zz})dz]d\phi$$

We replace dr, dz, $d_{100}$ by their expressions in terms of $\omega^1$ and $\omega^2$ and note that $\nabla^{(2)}\cdot\vec{B} = *d(*\omega)$. We get $$\nabla^{(2)}\cdot\vec{B} = \frac{1}{r(\psi_r^2 + \psi_z^2)}[\psi_r\psi_z(\psi_{rr} - \psi_{zz}) + (\psi_z^2 - \psi_r^2)\psi_{rz}].$$

If we wish $\vec{B}$ to be area-preserving, we set $\nabla^{(2)}\cdot\vec{B}=0$. This equation can be written in the form $$\psi_z(\psi_r^2 + \psi_z^2)_r = \psi_r(\psi_r^2 + \psi_z^2)_z,$$

which can be integrated to give $$\psi_r^2 + \psi_z^2 = F(\Psi),$$

where F is an arbitrary function of $\Psi$. But on $\Sigma$, $$\psi_r^2 + \psi_z^2 = \frac{c^2}{r_c^2}(r^2 - r_c^2);$$

so we have $$F(\psi) = \frac{c^2}{r_c^2}(r^2 - r_c^2)$$

Thus the curve $\Psi$=constant must be r=constant, which is impossible for the given design of $\Sigma$. Thus $\vec{B}$ cannot be area-preserving on $\Sigma$, as was to be proved. (4) We construct a solution of equations (2.10), (2.12), (2.15) valid in the neighborhood of a limit-cycle. We denote the position of the limit-cycle as $r=r_c$, $z=z_c$, and write $\rho=r-r_c$, $\zeta=z-z_c$. See FIG. 25. Thus the limit-cycle is at 0 in $\rho\zeta$ space. Since $$\frac{dr}{dz} = \frac{d\rho}{d\zeta} = 0$$

at 0, on $\Sigma$, we assume an equation for $\Sigma$ near 0 as $$\rho = \alpha\zeta^2 + O(\zeta^3)$$

where $\alpha$ is a constant. We also assume for $\Psi$ near 0:

$$\Psi = a + b\rho + h\zeta + e\rho^2 = f\rho\zeta + g\zeta^2 + O(\text{3rd order terms}).$$

Equation (2.16), which is now $$\psi_{\rho\rho} + \psi_{\zeta\zeta} - \frac{\psi_\rho}{r_c + \rho} = 0,$$

yields $$b = 2r_c(g + e).$$

On $\Sigma$, we get $$\Psi = a + b\alpha\zeta^2 + h\zeta + g\zeta^2 = O(\zeta^3)$$

$$\Psi_\rho = b + f\zeta + O(\zeta^2)$$

$$\Psi_\zeta = h + 2g\zeta + O(\zeta^2),$$

So equation (2.12) gives $a=h=0$, $g=-b\alpha$ and equation (2.15) gives $b=0$ and $f^2r_c = z\alpha c^2$. Thus $$\psi = \sqrt{\frac{2\alpha c^2}{r_c}}\,\rho\zeta + O\ (\text{3rd order torus}).$$

and $$B_r = \frac{1}{r_c}\sqrt{\frac{2\alpha c^2}{r_c}}\,\rho$$

$$B_z = -\frac{1}{r_c}\sqrt{\frac{2\alpha c^2}{r_c}}\,\zeta$$

(neglecting second order terms). Now $\rho$ is of order $\zeta^2$ on $\Sigma$, so $B_r$ is small; also, $B_{100}=c/r\approx c/r_c$. Thus we get, on $\Sigma$ near 0, $$\vec{B} = -\frac{1}{r_c}\sqrt{\frac{2\alpha c^2}{r_c}}\,(-\zeta)\hat{k} + \frac{c}{r_c}\hat{\phi}$$

which is portrayed in FIG. 26.

The field lines satisfy the equations $$\frac{d\zeta}{ds} = -l\zeta,\ \frac{d\phi}{ds} = m$$

where $$l = \frac{1}{r_c}\sqrt{\frac{2ac^2}{r_c}}, \quad m = \frac{c}{r_c^2}$$

These integrate to $$\xi = \xi_o \exp\{-\frac{l}{m}(\phi - \phi_o)\}.$$

Finally, note that $$\nabla^{(2)} \cdot \vec{B} = -\frac{1}{r_c}\sqrt{\frac{2ac^2}{r_c}}$$

at 0, so that $$\int_\gamma \nabla^{(2)} \cdot \vec{B}\, ds$$

around the limit cycle is $$-2\pi\sqrt{\frac{2ac^2}{r_c}} \neq 0,$$

and the limit cycle is simple. Clearly, this applies to any limit cycle on the surface of $\Sigma$ when the plasma equilibrium is constructed as above in sub-part B. Therefore all of the criteria of Peixoto and Pliss have been verified and the demonstration that each member of the class of magneto-static plasma equilibria delineated above possesses static structural stability is complete.

H. STATIONARY AZIMUTHAL FLOW

The EMTFD equations at equilibrium with transport coefficients set equal to zero with $\eta = \eta_0$ and $\vec{v} \neq 0$ become $$\nabla \rho \cdot \vec{v} + \rho \nabla \cdot \vec{v} = 0 \qquad (8.1)$$

$$-\rho \nabla \cdot \vec{v} = 0 \qquad (8.2)$$

$$(\vec{v} \cdot \nabla)\vec{v} + \nabla p = (\nabla \times \vec{B}) \times \vec{B} \qquad (8.3)$$

$$\nabla \times (\vec{v} \times \vec{B}) = 0 \qquad (8.4)$$

Equation (8.2) implies $p = 0$ or $\nabla \cdot \vec{v} = 0$. Taking $\nabla \cdot \vec{v} = 0$ yields (since $p = R\rho\eta_0$)

$$\nabla \rho \cdot \vec{v} = 0 \text{ or } \nabla p \cdot \vec{v} = 0 \qquad (8.1a)$$

$$\nabla \cdot \vec{v} = 0 \qquad (8.2a)$$

$$(\vec{v} \cdot \nabla)\vec{v} + \nabla p = (\nabla \times \vec{B}) \times \vec{B} \qquad (8.3a)$$

$$(\vec{B} \cdot \nabla)\vec{v} = (\vec{v} \cdot \nabla)\vec{B} \qquad (8.4a)$$

Assuming axial symmetry implies $\partial p / \partial \theta = 0$ and with equation (8.2a) implies $$rv_r = -\frac{\partial V(r,z)}{\partial z}, \quad rv_z = \frac{\partial V(r,z)}{\partial r}, \quad v_\theta = v_o(r,z);$$

$\nabla \cdot \vec{B} = 0$ implies $$rB_r = -\frac{\partial \psi(r,z)}{\partial z}, \quad rB_z = \frac{\partial \psi(r,z)}{\partial r},$$

where $\Psi$ is the magnetic flux function, V is the velocity stream function.

Equation (8.1a) becomes $$\frac{\partial(p,V)}{\partial(r,z)} = 0,$$

so $p = g(V)$ if $\partial V/\partial r$ or $\partial V/\partial z \neq 0$.
The first component of (8.4a) becomes $$\frac{\partial}{\partial z}\left(\frac{\partial(V,\psi)}{\partial(r,z)}\right) = 0.$$

The third component of (8.4a) becomes $$\frac{1}{r^2}\frac{\partial}{\partial r}\left(\frac{\partial(V,\psi)}{\partial(r,z)}\right) = \frac{1}{r^3}\frac{\partial(V,\psi)}{\partial(r,z)}.$$

These last two imply that $$\frac{\partial(V,\psi)}{\partial(r,z)} = h_o r.$$

The second component of (8.4a) becomes $$\frac{\partial(\psi, \frac{v_\theta}{r})}{\partial(r,z)} = \frac{\partial(V, \frac{B_\theta}{r})}{\partial(r,z)}.$$

The first component of (8.3a) becomes $$-\frac{1}{r}\frac{\partial(V, \frac{1}{r}\frac{\partial V}{\partial z})}{\partial(r,z)} - \frac{v_\theta^2}{r} + \frac{\partial p}{\partial r} = -\frac{1}{r^2}\left[-\frac{\partial \psi}{\partial r}\Delta_*\psi + rB_\theta\frac{\partial(rB_\theta)}{\partial r}\right]$$

The third component of (8.3a) becomes $$\frac{1}{r}\frac{\partial(V, \frac{1}{r}\frac{\partial V}{\partial r})}{\partial(r,z)} + \frac{\partial p}{\partial z} = -\frac{1}{r^2}\left[\frac{\partial \psi}{\partial z}\Delta_*\psi + rB_\theta\frac{\partial(rB_\theta)}{\partial z}\right]$$

where $$\Delta_* \psi = \frac{\partial^2 \psi}{\partial r^2} + \frac{\partial^2 \psi}{\partial z^2} - \frac{1}{r}\frac{\partial \psi}{\partial r}$$

The second component of (8.3a) becomes $$-\frac{1}{r}\frac{\partial(rv_\theta, V)}{\partial(r,z)} = -\frac{1}{r}\frac{\partial(rB_\theta, \psi)}{\partial(r,z)}.$$

In the special case $v_r = v_z = 0$, $v_\theta = (\text{const.})\, r$, the above equations imply that $V = \text{const.}$ and $$rB_\theta = f(\psi), \quad p = \frac{v_o^2 r^2}{2} + g(\psi)$$

where $$\Delta_*\Psi + f(\Psi)f'(\Psi) + r^2 g'(\Psi) = 0.$$

Hence the analysis in sub-part B is immediately applicable.

I. SINGULARITIES OF LIMACON AND CAP-CYCLIDE CROSS-SECTIONS

Consider a torus of known cross-section $\Gamma$. Let $\Gamma$ be given by a simple closed smooth curve, $$r = r(\tau) \quad z = z(\tau) \quad 0 \leq \tau < 2\pi.$$

Assume $r(t), z(t)$ are analytic functions with two minimum values of $r$ called critical points. Consider the region, R, of the $(r,z)$ plane outside $\Gamma$ and with $r > 0$. Let the flux function, $\Psi(x,y)$, satisfy $$\frac{\partial^2 \psi}{\partial r^2} + \frac{\partial^2 \psi}{\partial z^2} - \frac{1}{r}\frac{\partial \psi}{\partial r} = 0 \text{ in } R$$

and
$\Psi = 0$ on $\Gamma$ $$\psi_n = c\epsilon \sqrt{r^2 - r_c^2} \text{ on } \Gamma$$

where
 c is a positive constant
 $r_c$ is the minimum value of $r$ on $\Gamma$
 $\epsilon$ is 1 on $\Gamma$ between critical points
 $\epsilon$ is $-1$ on the remaining part of $\Gamma$.

In Jörgen's paper (Zeitschrift für Naturforschung 13a, 493-498, 1958 "Axially Symmetric Solutions of the Magnetohydrostatic Equations with Surface Currents"), it is shown that the singularities of $$g(w) = \left[\frac{r^2(w) - r_c^2}{r(w)} \frac{d\tilde{w}(w)}{dw}\right]^{\frac{1}{2}}$$

include the singularities of the solution of the above problem.

$$\tilde{w} = r(t) - iz(t)$$

$$w = r(t) + iz(t)$$

$$t = \tau + i\sigma$$

$r(t)$ and $z(t)$ are the complexification of $\Gamma$. $g(w)$ has singularities when $$\frac{d\tilde{w}}{dt}(t) = 0, \quad \frac{dw}{dt}(t) = 0,$$

or $r(t) = 0, r_c, -r_c$, or when $w, \tilde{w}$ are not one-to-one mappings to the t plane. We are interested only in those singularities which are in R.

Figure 27A:
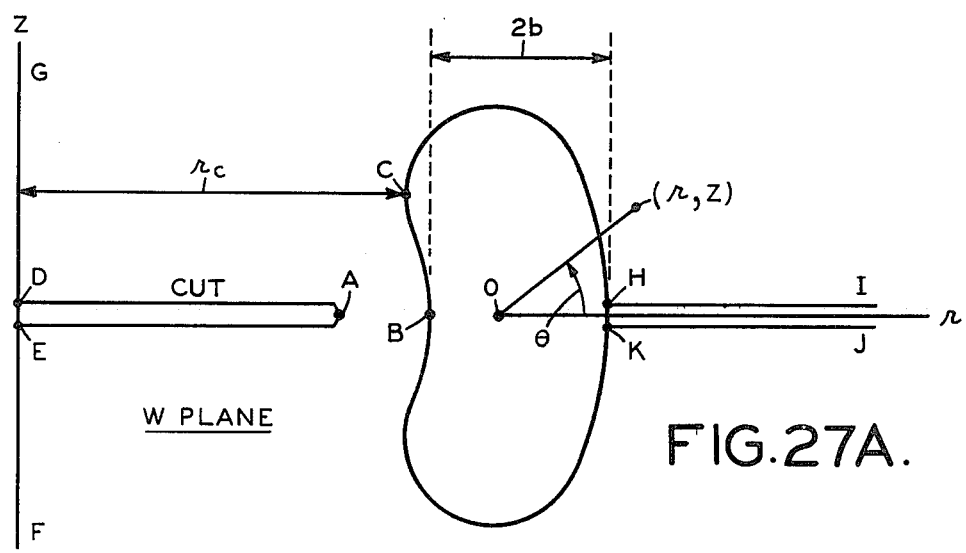
Figure 27B:
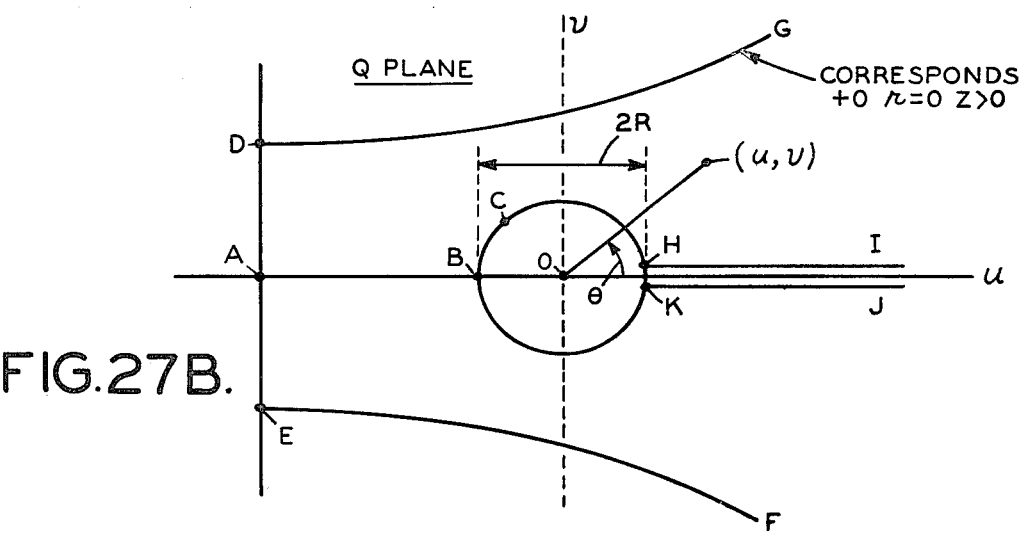

Case 1: A limacon $$W = r_0 + (Q + \mu_0)^{\frac{1}{2}}$$
(See FIG. 27)

$$\begin{cases} w = r + iz \\ Q = u + iv \end{cases}$$

$$\begin{cases} r = r_0 + (u_0 + u)^2 - v^2 & r_0 > 0 \; u_0 > 0 \\ z = 2v(u_0 + u) \end{cases}$$

$$\begin{cases} a = 2R^2 \\ b = 2Ru_0 \\ \beta = r_0 - R^2 + u_0^2 \end{cases} \quad a < b < 2a \quad \beta > 0$$

If $Q = Re^{i\theta}$ then $$\begin{cases} r = \beta + (b + a\cos\theta)\cos\theta \\ z = (b + a\cos\theta)\sin\theta \quad 0 < \theta < 2\pi \end{cases}$$

In the w plane $w_A = r_0 = \beta - \frac{1}{2a}(b^2 - a^2)$ (singularity)
$3H = 2b$ (diameter)
$w_O = \beta$ (center of limacon)
$w_B = r_1 = \beta - b + a$ (dimple)
$w_H = r_2 = \beta + b + a$ (convex point)

$w_C = \beta - \frac{b^2}{4a} + \frac{ib}{2}\sqrt{1 - \frac{b^2}{4a^2}}$ (upper critical point)

Figure 28:
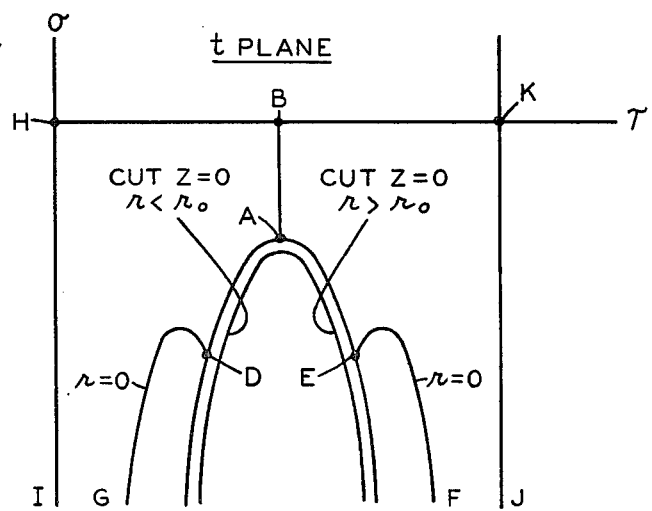

In the Q plane $Q_O = O \quad Q_A = -u_0 = \frac{-b}{\sqrt{2a}} = -\frac{b}{a}R$ $Q_H = R = \sqrt{a/2}$ $Q_D = -u_0 + i\sqrt{r_0 + u_0^2} = -u_0 + i\sqrt{\beta + a/2}$ DG is the upper half of the curve $\frac{v^2}{r_0} - \frac{(u + u_0)^2}{r_0} = 1$ $Q_E = -u_0 - i\sqrt{\beta + a/2} = u_0 - i\sqrt{r_0 + u_0^2}$ $Q_B = -R = -\sqrt{a/2}$ In the t plane $w = r(t) + iz(t)$ $w = \beta + (b + a\cos t)e^{it} = r_0 + \frac{1}{2a}(b + ae^{it})^2$ $t = \tau + i\sigma \quad 0 < \tau < 2\pi$
(See Figure 28) $\sigma < 0$ $t_D = \cos^{-1}\frac{-b}{a\sqrt{1 + \frac{2\beta}{a}}} - \frac{i}{2}\ln(1 + \frac{2\beta}{a})$ $t_A = \pi - i\ln\frac{b}{a}$ $t_B = \pi$
$t_H = 0$
$t_K = 2\pi$ $t_E = 2\pi - \cos^{-1}\frac{-b}{a\sqrt{1 + \frac{2\beta}{a}}} - \frac{i}{2}\ln(1 + \frac{2\beta}{a})$ $t_G = \frac{\pi}{4} - i\infty$ $t_F = \frac{7}{4}\pi - i\infty$ The only singularity of $g(w)$ outside the limacon is when $\tilde{w} = 0$. This is when $dw/dQ = 0$ and is the point A in FIGS. 27A, 27B and 28.

Case 2: Cap Cyclide

The Cap cyclide coordinate system is given by Moon and Spencer in the "Field Theory Handbook".

$$w = iR \frac{1 - iK^{\frac{1}{2}}sn\overline{Q}}{1 + iK^{\frac{1}{2}}sn\overline{Q}} \qquad \begin{array}{l} R > 0 \\ 0 < k < 1 \end{array}$$

Figure 29A:
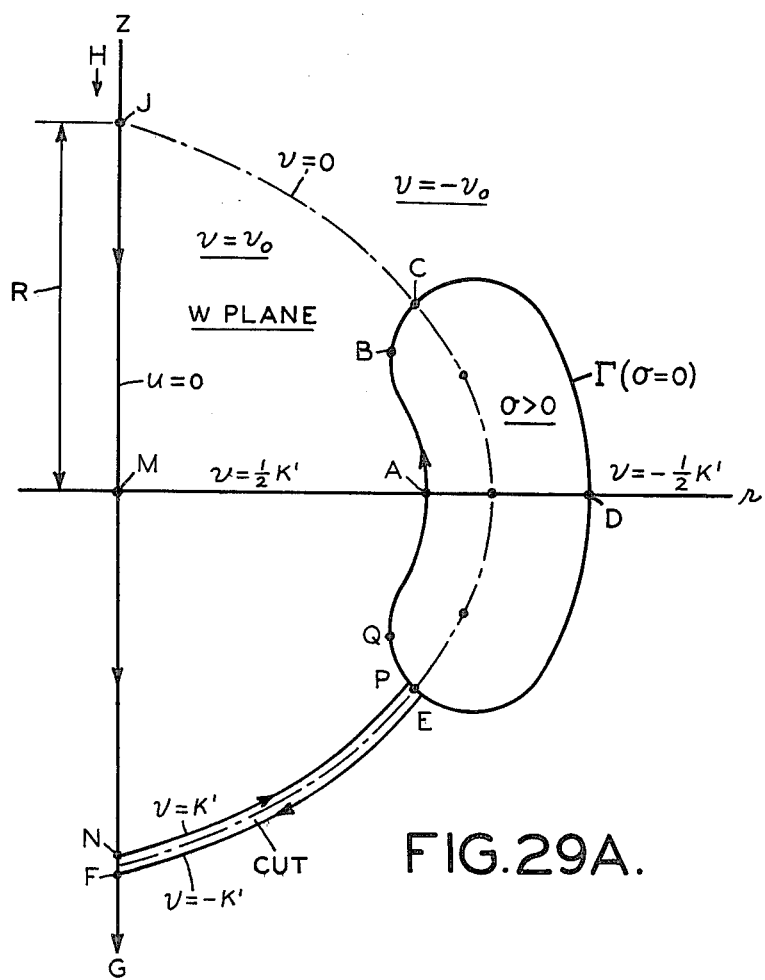
Figure 29B:
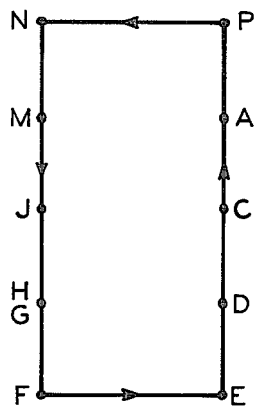

(see FIG. 29)

The region outside $\Gamma$ in the w plane maps into the rectangle indicated. The inside of a circle of radius R in the w plane maps into upper half of the rectangle in the Q plane.

$w = r + iz$ $\overline{Q} = \mu - iv$ $S = sn\mu = \sin\phi$ $$u = \int_0^\phi \frac{d\theta}{\sqrt{1 - k^2 \sin\theta}} \qquad \begin{array}{l} 0 < u < k \\ -k' < v < k' \\ 0 < u_o < k \end{array}$$

Jacobi elliptic functions
$S_1 = sn\ v$ with $k$ replaced by $1 - k^2 = k_1$, $0 < k_1 < 1$ $$sn(u + iv) = \frac{Sd_1 + iCdS_1C_1}{C_1^2 + k^2S^2S_1^2}$$

where $C = \sqrt{1 - S^2}$ \qquad $d = \sqrt{1 - k^2 S^2}$ $C_1 = \sqrt{1 - S_1^2}$ \qquad $d_1 = \sqrt{1 - k_1^2 S_1^2}$ $\frac{d}{dz} snz = cn\ z\ dnz$ \qquad $sn(z + 2K) = -snz$ $\frac{d}{dz} cnz = -snz\ dnz$ \qquad $sn(-z) = -snz$ $\frac{d}{dz} dnz = -k^2 sn\ z\ cn\ z$, $cn(-z) = cnz$ (See M. Abramowitz, P. 570)

$$w(t) = iR \frac{1 - ik^{\frac{1}{2}}sny}{1 + ik^{\frac{1}{2}}sny}$$

$$\tilde{w} = \overline{w}\ (\tilde{t}) = iR \frac{1 + ik^{\frac{1}{2}}sn(u_o + it)}{1 - ik^{\frac{1}{2}}sn(u_o + it)}$$

$y = u_o - it = u_o - i(\tau + i\sigma) = u_o + \sigma - i\tau = \overline{u} - iv$
$\sigma = 0$ corresponds to curve $u = u_o$ which is $\Gamma$
$\sigma > 0$ corresponds to inside $\Gamma$ -continued $$\begin{cases} r = \frac{2R\Lambda}{k^{\frac{1}{2}}\gamma} snu\ dn_1v \\ z = \frac{R\pi}{\gamma} \end{cases}$$

Figure 30:
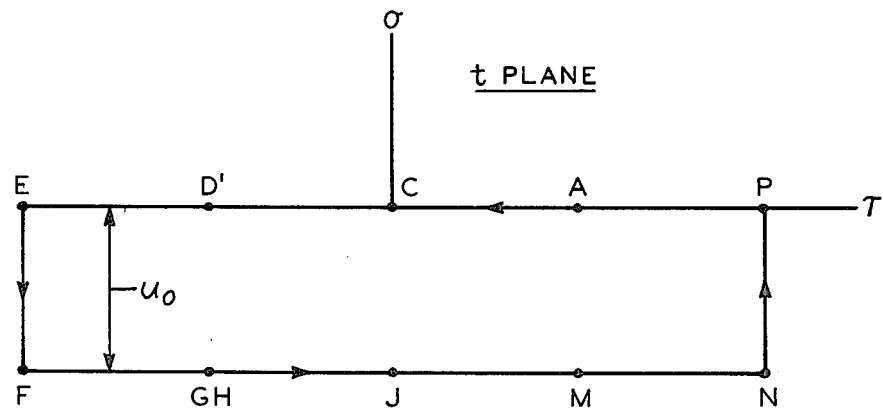

$\Lambda = 1 - dn^2 u sn^2 v$ $\gamma = sn^2 u dn^2 v + \left[\frac{\Lambda}{k^{\frac{1}{2}}} + cnudnusn\ v\ dn\ v\right]^2$ $\pi = \frac{\Lambda^2}{k^{\frac{1}{2}}} - sn^2 udn^2 v - cn^2 udn^2 usn^2 v\ cn^2 v$ $t$ - plane
$-u_o < \sigma < 0$
$-k' < \tau < k'$
(See FIG. 30)

The outside of $\Gamma$ in the w plane maps into the inside of a rectangle in the t-plane $t_A = k'/2$ $t_L = 0$ $t_D - K'/2$ $t_E = -K'$ $t_F = -K' - i\mu_o$ $t_G = t_H - \frac{K' - iu_o}{2}$ $t_J = -i\mu_o$ $t_M = \frac{K'}{2} - iu_o$ $t_N = K' - i\mu_o$ $t_P = K'$ Points corresponding to $\tau \to -\tau$ are inversion points in the w plane.

The singularities are as follows:

| Source | $\tilde{u} = u_o + \sigma$ | V | t values | Comments |
|---|---|---|---|---|
| $\tilde{w} = \infty$ | $2K - 2u_o$ | $\frac{K'}{2}$ | $u_o + it_\infty = -\frac{iK'}{2}$ | $w_\infty$ on axis, $w_\infty$ inside f $0 < u_o < \frac{2}{3} K$ |
| | | | | Outside, if $\frac{2K}{3} < u_o < K$ |
| $w = 0$ | $K$ | $K'$ | $u_o - it_1 = K + iK$ | |
| | $K$ | $0$ | $u_o - it_2 = K$ | $w_1, w_2$ are inside $\Gamma$ on circle at ends of curve $u = K$, $w_2 = \tilde{w}_1$ |
| | | | | $w_3, w_4$ are on circle |
| $\tilde{w} = 0$ | $|K - 2u_o|$ | $0$ | $u + it_3 = K$ | $w_3$ inside if $u_o < \frac{K}{3}$ |
| | | | | Outside if $\frac{K}{3} < u_o < K$ |
| | $|K - 2u_o|$ | $K'$ | $u + it_4 = K + iK'$ | $w_4 = \tilde{w}_3$ |
| $r = 0$ | $K - u$ | $K'$ | $t_5 = K' + iK$ | $w_5, w_6$ are on circle |
| | | | | $w_5 = $ inside if $0 < u_o < K/2$ |
| | | | | Outside if $\frac{K}{2} < u_o < K$ |
| $r = \infty$ | $K - u$ | $0$ | $t_6 = iK$ | $w_6 = \tilde{w}_5$ |
| $r = \pm r_c$ | | | Solution of 8th degree equation | $w_7, w_8, w_9, w_{10}$ |

Critical points occur at $w_c = r_c \pm iz_c$ where $\frac{r_c}{R} = \frac{r_o(1-k)s}{1 - k^2 S^2}$ and -continued $$\frac{z_c}{R} = \sqrt{\left(\frac{kc^2 - d^2}{kc^2 + d^2}\right)^2 - r_o^2}$$

$$\frac{w_1}{R} = r_o + iz_o = \frac{2k^{\frac{1}{2}}}{1+k} + \frac{i(1-k)}{1+k}$$

If $0 < k < 3 - 2\sqrt{2} = 0.1716$, there will always be a dimple.

If $1 > k > 3 - 2\sqrt{2}$, there will be a dimple only if $$S > S_c \sqrt{[\frac{1}{k} \frac{r_o + z_o}{r_o + z_o}]}$$

This occurs when $z_c = 0$

If $\frac{2}{3}K < \mu_1$, there are 5 singularities outside the plasma $$w_\infty = \frac{R(1+k)sn(2K - 2\mu_o)}{1 + k \sin^2(2K - 2\mu_o) + cn(2K - 2\mu_o)dn(2K - 2\mu_o)}$$

$w_3 = R^{i\theta}5$, $\theta_3 = \frac{\pi}{2} - 2\tan^{-1}(k^{\frac{1}{2}}sn(2\mu_o - K))$, $w_4 = \bar{w_3}$, $w_3 = Re^{i\theta}5$ $w_6 = Re^{i\theta}6$, $\theta_6 = \frac{\pi}{2} - 2\tan^{-1}(k^{\frac{1}{2}}sn(K - \mu_o))$, $w_5 = \bar{w_6}$

J. ELECTROMAGNETOTHERMOFLIUDDYNAMICAL ANALYSIS

The preceding discussion has shown how to synthesize and analyze an idealized magneto-static plasma equilibrium, such as has been regularly employed in the present art for the preliminary design of magnetic confinement devices. In reality, when the non-conservative aspects of an ionized gas (including electrical resistivity, thermal conductivity, and hydrodynamic viscosity) are considered, there is no equilibrium unless one assumes a constant influx of mass to compensate for that lost by cross-field diffusion and a steady volume-distributed source of (thermonuclear) energy to compensate for radiative and convective losses.

Moreover there are many phenomena of "micro-instabilities" which may be considered for low-density plasmas.

Recall that the important parameter *beta* designates the *ratio of internal plasma fluid pressure to external confining magnetic field pressure*, i.e.

$$\beta = p/(B_o^2/2\mu) \quad (10.1)$$

By equation (1.10) it is evident that at the plasma boundary $$p + \frac{B_i^2}{2\mu} = \frac{B_o^2}{2\mu} \quad (10.2)$$

whence follows the fundamental relation $$0 < \beta \leq 1. \quad (10.3)$$

For convenience we shall adopt the following terminology:

| | |
|---|---|
| Low Beta | $0 < \beta < 0.10$ |
| Medium Beta | $0.10 \leq \beta < 0.70$ |
| High Beta | $0.70 \leq \beta \leq 1.0$ |

The Scylla IV open-ended theta pinch at Los Alamos reported $\beta = 0.8$ in an experiment of December 1969. The Centaur cusp-ended theta pinch at the U. K. Culham Laboratory has, for hot, dense plasmas, reported values of $\beta$ in excess of 0.99. Hence it is realistic to analyze high beta plasmas, although nearly all prior work in this art has concerned low beta plasmas (Stellarator, Tokomak, Doublet, etc.).

The preceding results in sub-parts A through I apply chiefly to the vacuum magnetic field, specifically to what in the present art is termed a "magnetic bottle" or "magnetic trap", and are valid regardless of whether the plasma confined in this "bottle" is of low or high beta.

For a given external magnetic field strength, and plasma temperature one may refer to low density or high density plasmas instead of low or high beta, because in this case beta is proportional to the density.

It is customary to examine low density plasmas by mathematical techniques from the kinetic theory of plasmas (see e.g. references [10.1] and [10.2]). For the present purposes, however, it will be adequate to treat low and medium beta plasmas by means of a continuum mechanical model in which the various physical effects (e.g. Hall current) due to finite ion and electron gyroradii are included by means of a generalization of Spitzer's extended Ohm's Law [10.3]. It will be explained that if the resultant mathematical model of the plasma equilibrium possesses *dynamic* structural stability, then the neglect of microscopic effects from plasma kinetic theory is justifiable whenever these effects are "sufficiently" small. It will then be shown that the magnitude of these effects decreases to zero as the plasma's beta increases to unity. Hence for high beta the following mathematical model will have assured adequacy for dynamic stability analyses.

An alternative justification for the use of a continuum mechanical model may be obtained from a consideration of the following four expert opinions:

(1) "While high-beta instability theory is not yet sufficiently advanced to answer this question unequivocally, there is reason to believe that micro-instabilities may be weak or possibly even non-existent. If so, this will be another important advantage of high-beta systems." Amasa S. Bishop (Director of Fusion Research, Division of Research, USAEC), lecture of Nov. 12, 1969, before the American Physical Society on "Recent World Developments in Controlled Fusion", published in *Nuclear Fusion*, vol. 10 (1970), pp. 85-93.

(2) "Although the emphasis in toroidal investigations has long been on microinstability . . . , it has, somewhat belatedly, become clear that these mechanisms should defer in priority to the more basic questions of . . . equilibrium, and macrostability, . . . which are inadequately understood. Especially on the present time scale of high-beta experiments, it is quite unlikely that micro-phenomena are important." Harold Grad (Director of the Magneto-Fluid Dynamics division of the Courant Institute of NYU), "Plasmas", *Physics Today*, December 1969, pp. 34-44.

(3) ". . . we define a 'high density plasma' to mean a fully-ionized gas with density in excess of about $10^{16}$ particles/cm$^3$ and with a temperature in excess of some $10^{16}$ °K. Such a plasma is, generally speaking, collision-dominated and behaves in most respects as a fluid rather than as an assembly of independent particles. The instabilities to which the plasma is subject are consequently limited to the fluid, or magnetohydrodynamic instabilities; we are not concerned with the so-called velocity-space instabilities or those which derive from anisotropies in the pressure distribution." G. B. F. Niblett (of Culham Laboratory, UKAEA), "The Production and Containment of High Density Plasmas", *Physics of Hot Plasmas*, edited by Rye and Taylor, Plenum Press, 1970, pp. 361-378.

(4) "In a plasma the collision frequency is given by $$\nu \cong 4\pi nc(\frac{e^2}{mc^2})^2 (\frac{mc^2}{mv_\theta^2})^{3/2} \log$$
$$\cong 2 \times 10^{-9} nT^{-3/2}$$

and for $n \cong 10^{16}/cm, T \cong 10 keV$ this is of the order of $10^6$/sec; hence for systems lasting about 1 sec, the distribution of particle velocities will be roughly isotropic and a magnetohydrodynamic description is appropriate." W. B. Thompson, "Introduction to Controlled Thermonuclear Research," pp. 259-271 of *Plasma Physics* (Reference [10.2]).

In the example just quoted, $\nu = 0.64 \times 10^6$ sec$^{-1}$. To consider a hotter, denser plasma, postulate a confining field B of 20 tesla, density $n = 2.5 \times 10^{16}$ cm$^{-3}$ and temperature T=20keV in which case $\nu = 0.56 \times 10^6$ sec$^{-1}$ and the magnetohydrodynamic description remains appropriate.

We shall employ the following state variables:
$\rho$ = fluid density
$\vec{v}$ = fluid velocity vector
$\tau$ = fluid temperature
$\vec{B}$ = magnetic field vector
$\vec{E}$ = electric field vector
$\vec{j}$ = electric current density of fluid
$\rho_e$ = electric charge density of fluid
$\vec{n}$ = normal vector to free fluid boundary
$\vec{r}$ = radius vector to a given position We shall employ rationalized emu (electromagnetic units) together with the following parameters:
c = velocity of light in vacuum
$c_f$ = velocity of light in fluid = $1/\sqrt{\epsilon\mu_e} \cong c$
$c_e = \mu_e c_f \cong c$
$\mu_e$ = permeability of fluid ($\mu_e = 1$ in vacuum)
$\epsilon$ = dielectric constant of fluid
$\rho_e = (1/c_3^2)\nabla \cdot \vec{E}$
$\eta_1$ = reciprocal of electron-ion collison frequency
$\eta_i = \eta_i(\rho,\tau)$, (i=2,3,4,5) electrical coefficients proportional to $\eta_1$
$\eta = \eta(\rho,\tau)$ = electrical resistivity
$\kappa = \kappa(\rho,\tau)$ = thermal conductivity
$\mu = \mu(\rho,\tau)$ = hydrodynamic viscosity
$\sigma_H$ = source of heat, per unit volume
$\sigma_M$ = source of mass, per unit volume
$\gamma = c_p/c_V$ = ratio of specific heats (>2 for plasmas)
$R = c_p - c_V = (\gamma-1)c_V > 0$ = gas constant
$p = R\rho\tau$ = fluid pressure (perfect gas law)

We omit radiation pressure, although the present model may be readily modified to include it.

Propagation of Electromagnetism $$\frac{\partial \vec{B}}{\partial t} + \nabla \times \vec{E} = 0 \tag{10.1}$$

$$\{\frac{1}{c_f^2}\}\frac{\partial \vec{E}}{\partial t} + \mu_e \vec{j} = \nabla \times \vec{B} \tag{10.2}$$

$$\nabla \cdot \vec{B} = 0 \tag{10.3}$$

Conservation of Charge $$\frac{\partial \rho_e}{\partial t} + \nabla \cdot \vec{j} \cong 0 \tag{10.4}$$

Conservation of Mass $$\frac{\partial \rho}{\partial t} + \nabla \cdot (\rho \vec{v}) = 0 \tag{10.5}$$

Conservation of Momentum $$\rho\{\frac{\partial \vec{v}}{\partial t} + (\vec{v} \cdot \nabla)\vec{v}\} = \tag{10.6}$$
$$= \rho_e \vec{E} + \vec{j} \times \vec{B} - \nabla p +$$
$$+ \mu\{\nabla^2 \vec{v} + (\tfrac{1}{3})\nabla(\nabla \cdot \vec{v})\} +$$
$$- \vec{v}\sigma_M$$

Conservation of Energy $$\rho c_V \frac{\partial \tau}{\partial t} = -p\nabla \cdot \vec{v} - c_V \rho \vec{v} \cdot \nabla\tau + \nabla \cdot (\kappa\nabla\tau) + \tag{10.7}$$
$$\mu\{-(\tfrac{2}{3})(\nabla \cdot \vec{v})^2 + \text{trace } [(\nabla\vec{v})(\nabla\vec{v}) +$$
$$(\nabla\vec{v})(\nabla\vec{v})^*]\} + \eta|\vec{j} - \rho_e\vec{v}|^2 + \sigma_H$$

where $\nabla\vec{v}$ is the Jacobian matrix $(\partial v_i/\partial r_j)$ of $\vec{v}$ with respect to the position vector $\vec{r}$, and where * denotes matrix transposition.

Generalized Ohm's Law $$\eta(\vec{j} - \rho_e\vec{v}) + \eta_1 \frac{d\vec{j}}{dt} + \eta_2 \int_0^t \vec{j} \, dt + \tag{10.8}$$
$$\eta_3 \vec{j} \times \vec{B} + \eta_4 \nabla\tau + \eta_5(\nabla\tau) \times \vec{B} = \vec{E} + \vec{v} \times \vec{B}$$

where as usual $$\frac{d}{dt} = \frac{\partial}{\partial t} + \vec{v} \cdot \nabla \tag{10.9}$$

Boundary Kinematics $$\frac{\partial \vec{n}}{\partial t} = -(\vec{v} \cdot \nabla)\vec{n} + \vec{n} \times (\vec{n} \times [(\nabla\vec{v})^* \vec{n}]) \tag{10.10}$$

which expresses the fact that the fluid-vacuum boundary surface moves with the fluid.

REFERENCES

[10.1] W. B. Thompson, *Introduction to Plasma Physics*, Addison-Wesley, 1962.
[10.2] IAEA, *Plasma Physics*, Vienna, 1965.
[10.3] L. Spitzer, *Physics of Fully Ionized Gases*, Interscience, 2nd ed., 1965.
[10.4] Shih-i Pai, *Magneto-Gasdynamics and Plasma Dynamics*, Prentice-Hall, 1962.

K. DYNAMIC STRUCTURAL STABILITY CRITERION

Introduction

The mathematical model of the plasma pseudo-equilibrium presented in sub-part J above will now be employed to analyze the dynamic stability of plasma configurations of the class disclosed in the present invention. It should be recalled that this analysis possesses assured validity only for dense, "collision-dominated" plasmas such as the medium beta and high beta plasmas involved in the preferred embodiments of this invention. For low beta plasmas the conducting fluid model is of questionable adequacy; for example, in a paper on low $\beta$ "toroidal diffuse pinch" configurations, Coppi and Rem [11.1], page 69) state that the continuum mechanical model "is no longer adequate at the high temperature typical of thermonuclear plasmas, where the mean free paths for interparticle collisons become longer than the length of the system." Fortunately, there are two independent considerations indicating that for useful power reactor purposes high beta is to be preferred; the choice of high beta then relegates the questionable adequacy of the present model for low beta to a topic of merely academic interest. The first of these reasons concerns *dynamic stability*, and the second concerns *economic efficiency*.

Despite two decades of heavily-funded intensive research by many nations, a feasible means of stable plasma confinement in a closed configuration (by means other than those of the present invention, first publicly mentioned [11.22]) has remained undiscovered. For example, Academician L. A. Arzimovich, director of Soviet fusion power research, asserts that ". . . stability of the plasma filament is . . . an *unresolved problem*" ([11.2], p. 1969). Likewise, H. R. Hulme, Chief of Nuclear Research for the British AEA, states that ". . . the most serious deficiency in our knowledge concerns the stability of the plasma and how it can be maintained" ([11.3], p. 110), and ". . . how to keep the plasma stable for a time long enough for thermonuclear reactions to take place is the *outstanding problem*" ([11.3], p. 92). Likewise another expert, D. A. Frank-Kamenetskii, states in 1972: "The *main obstacle* in the quest for the ideal magnetic trap is the instability problem" ([11.4], p. 4) and ". . . to achieve this goal one item is certainly necessary—this is finding a way to cope with plasma instabilities. This is the *single difficulty*, but it is *so serious* that no one can say how close the solution is or which way it lies." ([11.4], p. 6). [Emphases added in preceding quotations.]

It was shown below in sub-parts L and M that in order to design a plasma equilibrium which can be naturally stabilized by a high aspect ratio or artificially stabilized by feedback, one requires dynamic *structural* stability, which means dynamic behaviour that for small perturbations is relatively insensitive to variations in the system's specifications. (A plasma can have dynamic structural stability and yet be dynamically unstable, as will be explained below.) Accordingly, the most significant result of the present section will be a demonstration that, assuming static structural stability as a prerequisite, one always has dynamic structural stability to the extent that the continuum mechanical model used heretofor in sub-part J is validly applicable, i.e., to the extent that the plasma is of high beta and sufficiently dense to be collison-dominated.

It is well-known in this art (see e.g. [11.3], p. 97) that for a given fluid temperature and given confining magnetic field strength the thermonuclear power production per unit volume is proportional to $\beta^2$. The volume of the magnetic field which must be generated is an important parameter of the cost of a fusion reactor. In terms of this particular cost-parameter, compare a low beta reactor of say $\beta_l = 0.10$ with a high beta reactor of say $\beta_h = 0.90$; since $\beta_h^2/\beta_l^2 = (0.9)^2/(0.1)^2 = 81$, *the low beta reactor would cost eighty-one times more to construct, for the same power output, as a high beta reactor*. Of course, if for other reasons such as limitation of heat flux through the walls, additional cost of providing sufficient magnetic field and additional complexity to the mathematical model are acceptable in order to construct a low beta or medium beta reactor, the principles disclosed herein remain fully applicable to the construction of such a reactor with no essential changes.

Inadequacy of MFD Analyses

The present model will be called an EMTFD model. If one sets $c = +\infty$, i.e.

$$(1/c) = 0 \tag{11.1}$$

and ignores $\vec{E}$, then one has an MTFD model. If one sets the *transport coefficients* equal to zero, $$\eta = \kappa = \mu = 0 \tag{11.2}$$

one obtains an MFD (Magneto-Fluid Dynamical) model known as the Lundquist equations. The MFD model has been the basis of virtually all prior stability analyses (see references [11.5] through [11.17]). One linearizes the MFD equations around an equilibrium solution, obtaining wave equations for normal modes of oscillation. Each normal mode evolves in *time* t proportionally to the real or imaginary part of $$e^{\omega t}, (0 > t \to +\infty) \tag{11.3}$$

where $\omega$ is the complex frequency of that mode. For MFD models $\omega^2$ is necessarily a real number. If $\omega^2 > 0$, then there is one positive value of $\omega$ and the mode is *unstable*. If $\omega^2 > 0$, then $\omega$ is pure imaginary and this case is called "stable" in the prior literature. However, this terminology is unwarranted and the conclusions drawn therefrom are misleading (see FIG. 31). For example, U.S. Pat. No. 3,016,342 is based entirely upon this alleged "stability" criterion, as specified in its FIGS. 10 through 18, all of which are graphs of the criterion specified in its line 45 of page 31, but the validity of this theoretical criterion has been disproved by experimental tests. Indeed it is well-known in nonlinear mechanics [11.18] that *unless* $\omega$ has a non-zero real part, no valid conclusions regarding the true nonlinear system can be drawn from the linearized analysis. A simple example in this connection will prove instructive.

Simple Model of Anomalous Diffusion

According to accepted MFD "stability" theory, one would say that the *equilibrium solution*

$$x = 0, y = 0 \tag{11.4}$$

of the elementary dynamical system.

$$\dot{x} = y + (\tfrac{1}{2})\mu(x^2 + y^2)x, \ (0 > \mu < 1) \tag{11.5a}$$

$$\dot{y} = -x + (\tfrac{1}{2})\mu(x^2 + y^2)y, \ (0 > \mu < 1) \tag{11.5b}$$

is "stable" because linearization around equilibrium yields $\dot{x}=y, \dot{y}=-x$ (11.6)

or, eliminating y, $\ddot{x}+x=0, x(t)=x_0 e^{\omega t},$ (11.7)

where $$\omega^2 + 1 = 0, \omega = \pm \sqrt{-1}.$$ (11.8)

No matter how small $\mu$ may be, this "conclusion" is mathematically incorrect and quite misleading.

It is easy to prove [simply differentiate (11.9) and use the given dynamics (11.5a,b)] that $$x^2 + y^2 = \left\{ \frac{1}{\left(\frac{1}{(x_0^2+y_0^2)}\right) - \mu t} \right\}, (0 \leq t < t_\infty),$$ (11.9)

which means that $x^2+y^2$ "blows up" to infinity *faster* than any exponential $e^{\gamma t}$, $\gamma > 0$, no matter how large $\gamma$ may be chosen. In fact, the system blows up within a finite length of time, namely, at time:

$$t_\infty = \frac{1}{\mu(x_0^2 + y_0^2)}.$$ (11.10)

This behavior is *qualitatively* different from anything that can be inferred from the usual linearized equations of physics or mechanics.

Note that, if the initial conditions are such that $x_0^2 + y_0^2$ is "small" relative to $(1/\mu)$, then the initial rate of motion away from equilibrium is very "slow." On the other hand, if such a "large" value as $x_0^2 + y_0^2 = 1/\mu$ is a physically allowable initial ("perturbed") state, then the initial state will reach infinity in one second (truly this is a model of an "explosion").

Hence, *in between* the clearly allowable initial states and those too large to be considered, there must exist states with *every* possible growth rate between "small" and "large".

A study of (11.4) through (11.10) leads to the following conclusions:

(i) Linearized *conservative* mathematical models of plasma dynamics (i.e., MFD models) are *intrinsically inadequate* for prediction of *observable stability*.

(ii) Even though the supposedly negligible nonlinear terms are "infinitesimally small" for small initial perturbations, they permit an *initially* slowly-growing instability which could account for the phenomenon of "anomalous diffusion."

(iii) Neglect of the nonlinear terms means that it is *impossible* to compute the *rate* of the dispersion (the information necessary thereto, i.e., the value of $\mu$, has already been discarded).

Nonlinear Stability Theory [11.18]

Since James Clerk Maxwell's analysis of the stability of Watt's automatic governor a hundred years ago, the subject of *stability of dynamical systems* has been studied intensively by pure mathematicians and control system technologists. Important concepts have been introduced by such men as Routh (1877), Poincaré (1885), Liapunov (1892), Hurwitz (1895), Malkin (1931), Persidskii (1933), Andronow and Pontrjagin (1937), Dubosin (1940), Krasovskii (1954), and Zubov (1957).

A logical terminology has been long established, and today in nonlinear mechanics and control theory it is universally accepted that practically useful results cannot be obtained without making the logical distinctions which are denoted by such terms as:

(Liapunov) *stability* (or "neutral stability");
*local* stability;
*global* stability;
*asymptotic* stability;
*uniform* asymptotic stability;
*structural stability;* and
*total stability*—also called
stability under continually acting disturbances.

In the present instance, one may classify the complex frequencies of (11.3) as follows:

| | | |
|---|---|---|
| $Re\{\omega\} \leq 0$ | STABILITY | (11.11a) |
| $Re\{\omega\} > 0$ | INSTABILITY | (11.11b) |
| $Re\{\omega\} \neq 0$ | STRUCTURAL STABILITY | (11.11c) |
| $Re\{\omega\} < 0$ | ASYMPTOTIC STABILITY | (11.11d) |
| $Re\{\omega\} \leq -\delta < 0$ | UNIFORM ASYMPTOTIC STABILITY | (11.11e) | where the word *uniform* implies that the *degree of stability* $\delta$ is *independent* of the mode under consideration.

Unless one is a priori assured that (11.11c) holds, i.e. unless the system is structurally stable, then the mere *absence of instability*, (11.11b), does not imply what is desired, namely (11.11e); in fact, the negation of (11.11c) would permit $$Re\{\omega\}=0$$ (11.12)

which, as shown in the preceding section, provides no guarantee whatsoever that true stability of the nonlinear system has been attained.

Figure 31:
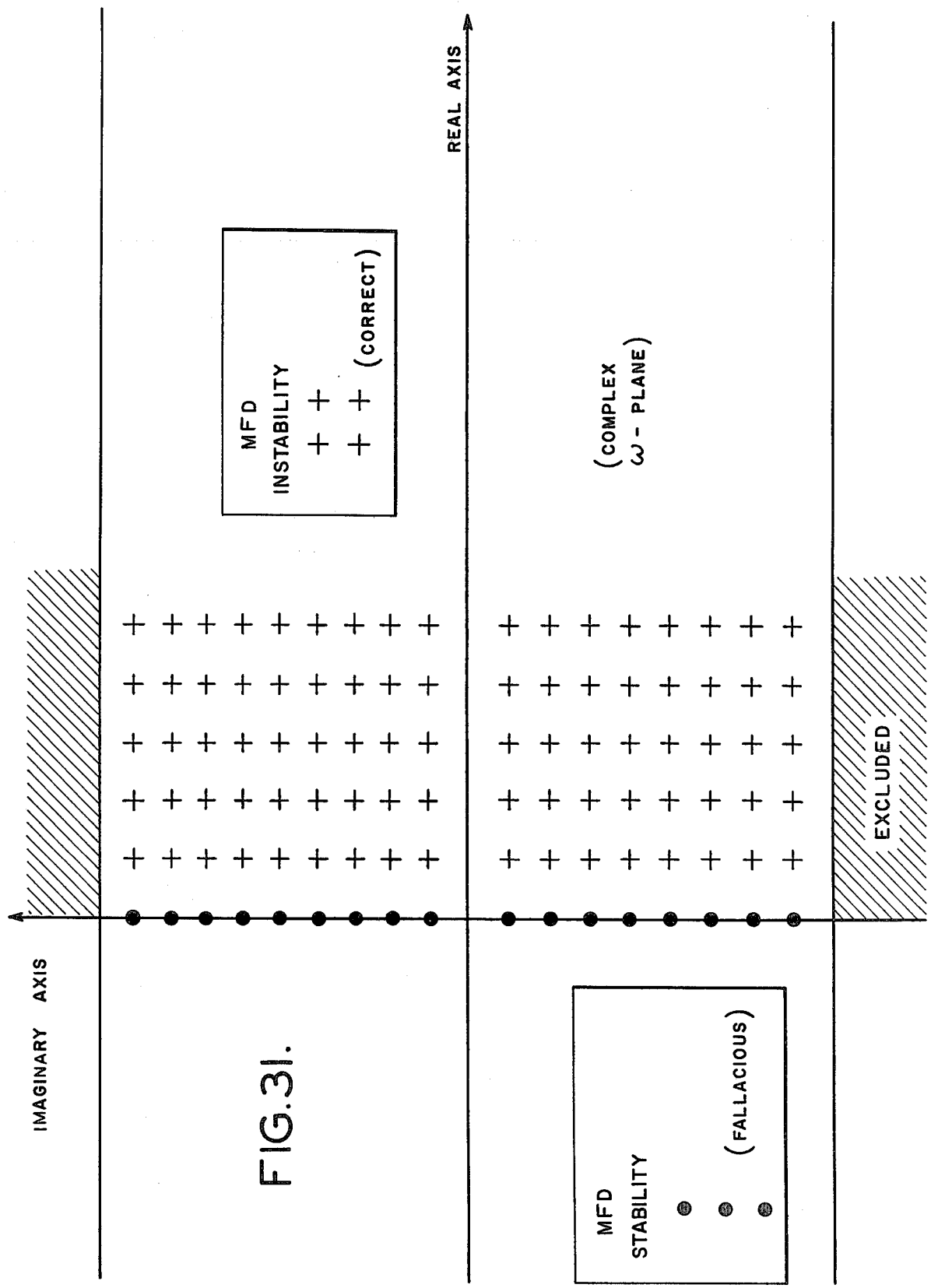
Figure 32:
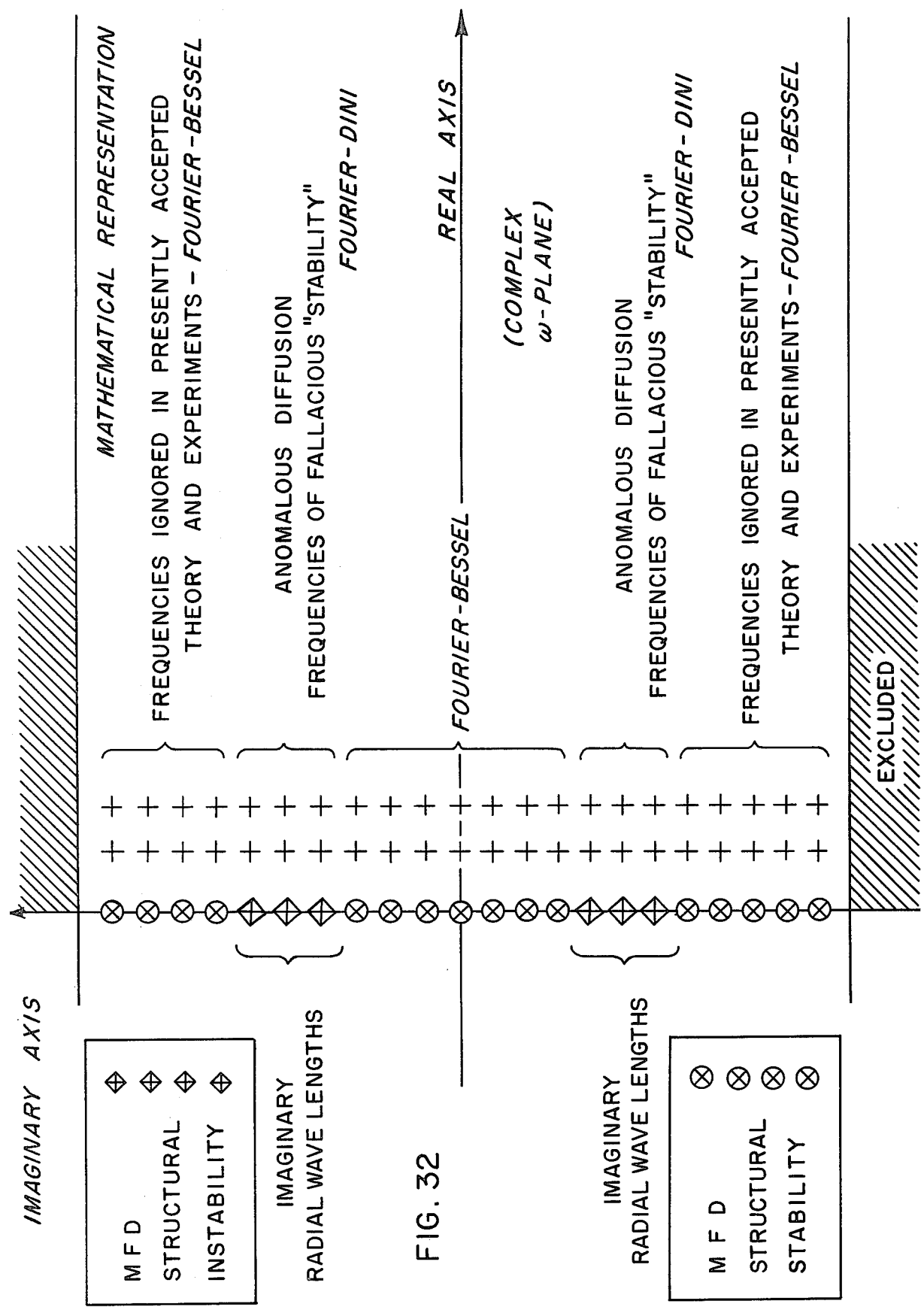
Figure 33:
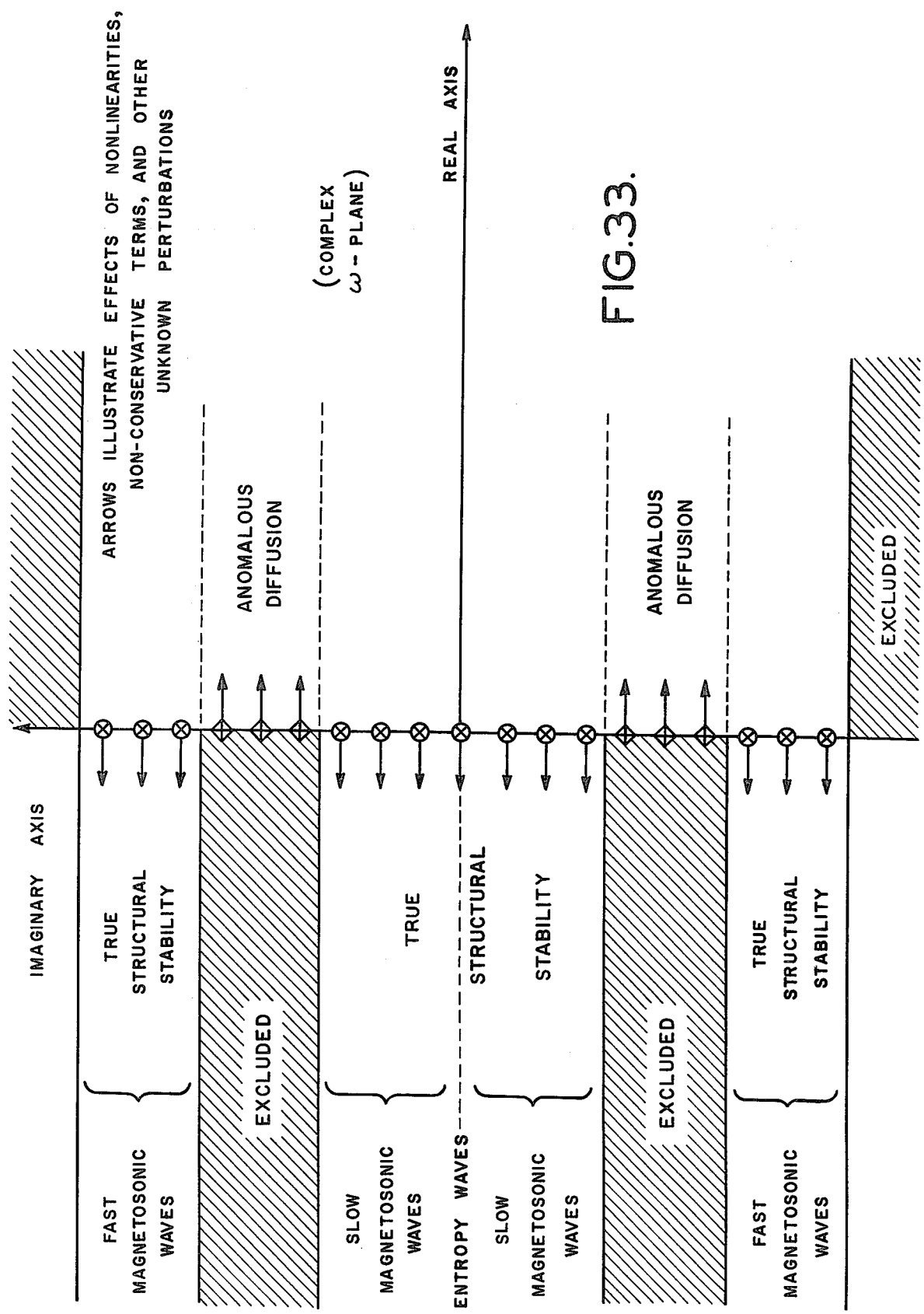

The difficulties associated with "stability" analyses based on (11.12) are depicted graphically in FIGS. 31, 32 and 33.

It is insufficient to attain (11.12) in the MFD model, as depicted in FIG. 31, because in the EMTFD model the complex frequencies on the imaginary axis will always move away from it as illustrated in FIG. 33. What is needed is a method of classifying the various regions of the imaginary axis as suggested in FIG. 32. This can be done by carrying out a complete EMTFD analysis and then letting the displacement current and the three transport coefficients tend to zero, as in (11.1) and (11.2), and noting whether the corresponding complex frequencies move onto the imaginary axis from the right half-plane or the left half-plane.

Linearization

It is an adequate approximation to assume $$\kappa = \kappa_1 \tau^{5/2}, \mu = \mu_1 \tau^{5/2}, \eta = \hat{\eta}_1 \tau^{-3/2}$$ (11.13)

and to linearize around a uniform state $$\rho = \rho_0, \tau = \tau_0, v = 0, \vec{B} = \vec{B}^0, \vec{E} = 0, \vec{j} = 0$$ (11.14)

where $\rho_0, \tau_0$ and $\vec{B}^0$ are constants. We employ cylindrical coordinates and take $\vec{B}^0$ parallel to the z-axis, i.e., $\vec{B}^0 = |\vec{B}^0|\vec{u}_z$.

Define $$\kappa_0 = \kappa(\tau_0), \mu_0 = \mu(\tau_0), \eta_0 = \eta(\tau_0),$$ (11.15)

and define *kinematic viscosity* $\mu_0$ and *thermal diffusivity* $\kappa_0$ by $$\tilde{\mu}_0 = \mu_0/\rho_0, \tilde{\kappa} = \kappa_0/\rho_0 c_p \tag{11.16}$$

Then define *perturbations* $(\tilde{p}, \tilde{\tau}, \vec{b}, \vec{e})$ by $$\rho = \rho_0(1+\tilde{p}), \tau = \tau_0(1+\tilde{\tau}), \vec{B} = \vec{B^0} + \vec{b}, \vec{E} = \vec{e}. \tag{11.17}$$

and define the *Alfvén speed* $v_0$ and the *speed of sound* $v_s$ by $$v_o = |\vec{B^o}|/\sqrt{\mu_e \rho_o}, \quad v_s = \sqrt{\gamma R \tau_o} \tag{11.18}$$

Inserting the preceding quantities into the state equations in sub-part J one finds the following perturbation equations:

$$\partial \tilde{p}/\partial t = -\nabla \cdot \vec{v} \tag{11.19}$$

$$\partial \tilde{\tau}/\partial t = -(\gamma-1)(\nabla \cdot \vec{v}) + \gamma \tilde{\chi}_0 \nabla^2 \tilde{\tau}, \tag{11.20}$$

$$\partial \vec{v}/\partial t = (v_o/\sqrt{\rho_o})\vec{j} \times \vec{u}_z - \nabla\{(v_s^2/\gamma)[\tilde{p} + \tilde{\tau}] - \tag{11.21}$$

$$(\tfrac{1}{3})\tilde{\mu}_0(\nabla \cdot \vec{v})\} + \tilde{\mu}_0 \nabla^2 \vec{v},$$

$$\partial \vec{b}/\partial t = -\nabla \times \vec{e}, \tag{11.22}$$

$$n_o \vec{j} = \vec{e} + (v_o \sqrt{\rho_o})(\vec{v} \times \vec{u}_z), \tag{11.23}$$

$$(1/c^2)(\partial \vec{e}/\partial t) + \vec{j} = \nabla \times \vec{b}. \tag{11.24}$$

where $\vec{u}_z$ is the unit vector in the z-direction. (Here we have used a simplified Ohm's law based on the hypothesis that $\eta_1 = 0$, i.e. that the plasma is collision-dominated.)

Now consider a cylindrical plasma of arbitrary cross-section. Equations (11.19)–(11.24) can be solved in closed form for circular cross-sections by means of trigonometric and Bessel functions. If q denotes any of the state variables, assume the form $$q = e^{\omega t + i(m\theta + kz)} q_0(r), \quad (i^2 = -1), \tag{11.25}$$

and insert into (11.19)–(11.24). The result is the same as introduction of the operators $$\omega = \frac{\partial}{\partial t}, \quad \lambda^2 = -\nabla^2, \quad ik = \frac{\partial}{\partial z} \tag{11.26}$$

into the equations and manipulating them algebraically as if $\omega, \lambda^2$ and k were real or complex numbers. The most important waves correspond to eigenvalue problems of the form $$\nabla^2 b_z = -\lambda^2 b_z, \quad \frac{\partial^2 b_z}{\partial z^2} = -k^2 b_z. \tag{11.27}$$

Perturbation of the boundary conditions (1.5) and (1.10) determines perturbed boundary conditions which make (11.27) a well-posed problem defining *Helmholtz numbers*

$$\lambda^2 = \lambda_{mk}^2 \tag{11.28}$$

for every pair of integers (m,k), if one re-scales the z-axis so that the ends $z = -\pi$ and $z = +\pi$ are identified. For large aspect ratios this approximation of a torus by identifying the ends of a cylinder has adequate validity because in the present method the rotational transform is indeed zero and for large aspect ratios all field lines on the plasma surface are approximately straight lines parallel to the toroidal axis, and so any segment of the torus is adequately approximated by a segment of a plasma cylinder which is a portion of a straight theta pinch. The dispersion relation for a theta pinch in the MFD case is well-known (see equation (5-105) on page 135 of reference [11.11], as is the fact that according to MFD theory it is a "stable" configuration; moreover, a full EMTFD analysis yields precisely the same result, namely (1.11e), so that in this case the MFD prediction proves to be reliable.

The use of (11.26) in (11.19)–(11.24) leads to a polynomial dispersion relation of the form $$\omega^6 + a_5\omega^5 + a_4\omega^4 + a_3\omega^3 + a_2\omega^2 + a_1\omega + a_0 = 0, \tag{11.29}$$

where the coefficients $a_i$ are polynomials in $\mu^2, k^2, (1/c^2)$, and the transport coefficients $\eta_0, \mu_0, \kappa_0$. The six roots of (11.29) form three complex conjugate pairs corresponding to *electromagnetosonic* waves, "fast" *magnetosonic* waves, and "slow" *magnetosonic* waves (see [11.15] or [11.16]); equation (11.29) can be factored in closed form in the limit where (11.1) and (11.2) hold. In this case (11.12) holds if and only if $$\lambda_{mk}^2 \geq \phi k^2 \tag{11.30a}$$

where by definition $$\phi = \frac{4v_o^2 v_s^2}{(v_o^2 + v_s^2)^2} = \frac{8\gamma\beta(1-\beta)}{(2-[2-\gamma]\beta)^2} \tag{11.30b}$$

Figure 7:
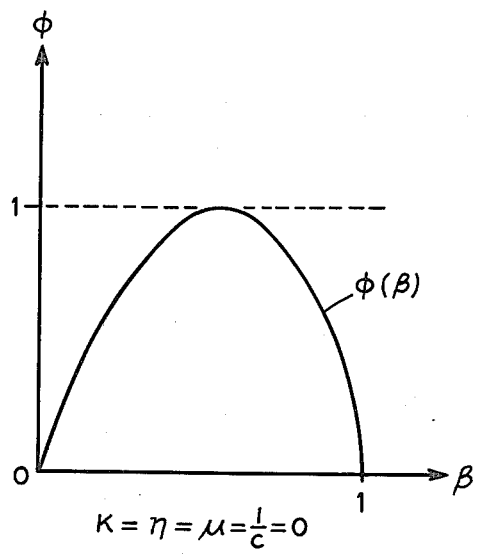
FIGS. 7, 8 and 9 are graphs of assistance in explaining the theoretical principles in Part II hereof underlying this invention.
Figure 8:
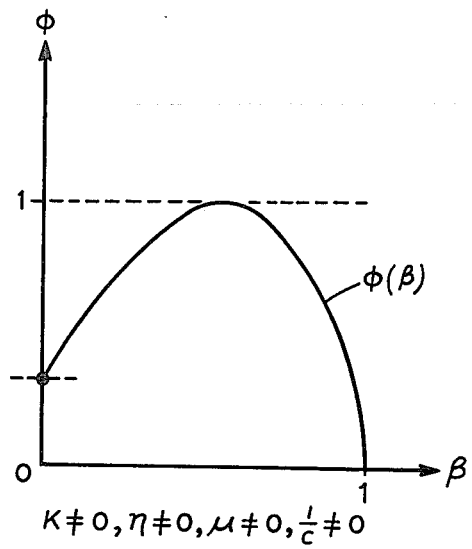

In the second expression for $\phi$ we have made use of the boundary condition (1.10) in the readily-derived form $$\left\{\frac{\beta}{1-\beta}\right\} = \left(\frac{2}{\gamma}\right)\left(\frac{v_s}{v_o}\right)^2, \tag{11.31}$$

which enables one to plot $\phi$ as a function of $\beta$ as depicted in FIG. 7. In the MFD case the boundary conditions defining the Laplacian operator $\nabla^2$ imply that it is self-adjoint, whence its eigenvalues $\mu^2$ are necessarily real, and so (11.30) is automatically satisfied *for all modes* (m,k) *whenever* $\phi = 0$, i.e. whenever either of $$\beta = 0, \beta = 1 \tag{11.32}$$

holds. In the EMTFD case there is an analogue of (11.30a), in which (11.30b) is replaced by a more complicated function of $\beta$ and the transport coefficients, which behaves as illustrated in FIG. 8. The finite "jump" in $\phi$ at $\beta = 0$ is caused by the well-known "resistive instabilities", which constitute, as stated in paragraph two, page 1 of U.S. Pat. No. 3,278,384 the principal cause of the fact that the specific magnetic configurations provided by U.S. Pat. Nos. 2,910,414; 3,002,912, 3,012,955; 3,015,618; and 3,088,894 have all turned out to be dynamically unstable and therefore unworkable. However, in the EMTFD case $\phi = 0$ remains valid at $$\beta = 1, \tag{11.33}$$

as illustrated in FIG. 8.

Another indication of the desirability of high density comes from asymptotic analysis of the roots of (11.29) as $k^2 \to +\infty$. Referring to (11.11e), this proves that $$\delta \leq (\tfrac{1}{4}) \frac{p}{\mu_o} \sim \{ \frac{(\rho_o)^2}{(\tau_o)^3} \}^{\frac{1}{2}} \qquad (11.34)$$

which shows (see Bass [11.23]) that improvements in the degree of asymptotic stability can, for short wavelength "kink" modes, be made only by increasing the ratio of the square of the density to the cube of the temperature.

As a check on the preceding analysis, note that if one neglects the displacement current, i.e. assumes (11.1), then the perturbation equations (11.19)–(11.24) become identical with those of Coppi [11.19] and Bernstein and Robinson [11.20].

The only author attempting to treat the case $\eta \neq 0$, $\kappa \neq 0$, $\mu \neq 0$ seems to be Trehan [11.21], but his work is seriously flawed by several errors. In his equations (90)–(111), pages 37–39, he includes resistivity and viscosity; he then attempts to add thermal conductivity in his equations (123)–(131), pages 41–42, but all of these equations [except (124)] are incorrect because of omission of a factor $\rho^\gamma$ on the left-hand side of his equation (123). Correction of this error leads to major changes in his (127)–(128). (In reference [11.21], equations (127)–(128) are not solved correctly even as they stand, because comparison of (130)–(131) with the definition (99) implies that all plasma waves are growing exponentially.) When (129)–(130)–(131) of [11.21] are corrected, the results become special cases of the present results concerning (11.29).

In conclusion, the present analysis demonstrates that the class of magnetic confinement configurations disclosed in the present invention constitutes a class of high beta toroidal plasma equilibria which possess uniform asymptotic stability, against arbitrary small perturbations, provided only that the configurations are specified to have sufficiently large aspect ratios.

REFERENCES

[11.1] B. Coppi and J. Rem, *Scientific American*, vol. 227, July 1972, pp. 65–75.

[11.2] L. A. Arzimovich, *Elementary Plasma Physics*, Blaisdell, 1965 (translation from 1963 Russian edition).

[11.3] H. R. Hulme, *Nuclear Fusion*, Springer-Verlag New York, 1969.

[11.4] D. A. Frank-Kamenetskii, *Plasma, the Fourth State of Matter*, Plenum, 1972 (translation from 1968 Russian edition).

[11.5] W. B. Kunkel, ed. *Plasma Physics in Theory and Application*, McGraw-Hill, 1966.

[11.6] IAEA (Seminar Trieste, 1964), *Plasma Physics*, Vienna, 1965.

[11.7] L. Spitzer, *Physics of Fully Ionized Gases*, Interscience, 2nd ed. 1962.

[11.8] S. Glasstone and R. H. Lovberg, *Controlled Thermonuclear Reactions*, van Nostrand, 1960.

[11.9] D. J. Rose and M. Clark, Jr., *Plasmas and Controlled Fusion*, M.I.T. Press, 1961.

[11.10] W. B. Thompson, *An Introduction to Plasma Physics*, Addison-Wesley, 1962.

[11.11] G. Schmidt, *Physics of High Temperature Plasmas*, Academic Press, 1966.

[11.12] S. I. Pai, *Magneto-Gasdynamics and Plasma Dynamics*, Prentice-Hall, 1962.

[11.13] S. Chandrasekhar, *Hydrodynamic and Hydromagnetic Stability*, Oxford University Press, 1961.

[11.14] W. I. Futterman, ed., *Propagation and Instabilities in Plasmas*, Stanford University Press, 1963.

[11.15] A. Jeffrey, *Magnetohydrodynamics*, Wiley, 1966.

[11.16] A. Jeffrey and T. Taniuti, *Non-linear Wave Propagation*, Academic Press, 1964.

[11.17] A. Jeffrey and T. Taniuti, *Magnetohydrodynamic Stability and Thermonuclear Containment*, Academic Press, 1966.

[11.18] W. Hahn, *Stability of Motion*, Springer-Verlag New York, 1967.

[11.19] B. Coppi, "On the Stability of Hydromagnetic Systems with Dissipation," reference [11.14], p. 70–86.

[11.20] I. B. Bernstein and B. B. Robinson, *Ann. Phys.*, vol. 18 (1962), p. 110.

[11.21] S. K. Trehan, "Macroscopic Theory of Plasma Waves," pp. 21–46 of reference [11.].

[11.22] R. W. Bass, paper 3A1, "The ULTRON Configuration," *Bull. Amer. Phys. Soc.*, Nov. 1971, p. 1239.

[11.23] R. W. Bass, paper G3, "A Simple Necessary and Sufficient Condition for Structural Stability of Non-Conservative Toroidal Plasma Equilibria," *Fifth Annual Meeting, Plasma Physics Div. of Amer. Phys. Soc.*, Nov. 1963.

L. MINIMUM ASPECT-RATIO FOR FINITE GYRO-RADIUS STABILIZATION

It was shown above in sub-part K that an infinitely long straight theta-pinch device possesses both static and dynamic structural stability. Hence it can be "bent" slightly, in a manner maintaining equilibrium, such as that disclosed in the present invention, without destruction of its dynamic stability. The objective of the present discussion is to calculate the maximum degree of such toroidal curvature which is tolerable.

It will be seen that for present purposes it suffices to approximate the plasma volume as an axially symmetric torus of circular cross-section. Let a denote the major radius and b denote the minor radius of this torus. The *aspect ratio* is defined to be the ratio (a/b).

Under physically reasonable assumptions, it will be demonstrated that the *plasma equilibrium of FIGS. 2A, 2B, 3A and 3B* possesses dynamic asymptotic stability if its aspect ratio exceeds approximately two hundred and forty.

B=20 tesla, at a plasma temperature of T=5keV, which corresponds to confinement of ionized hydrogen at a density of $10^{17}$ particles per cubic centimeter, and an average ion gyro-radius $R_c$ exceeding 0.05 cm, assuming a high beta plasma for a boundary layer or skin thickness L less than 0.10 cm, and a minor radius of b=1.0 cm, and adequate major radius would be a=2.4 m.

It is well-known in the present art that regions of unfavorable magnetic field curvature (concave toward the plasma) induce "local ripple instabilities" or "resistive ballooning instabilities." These "localized flute" modes are similar to that Rayleigh-Taylor instabilities present when a heavier liquid is supported by a lighter liquid; but in the latter case, such instabilities can be adequately damped by the presence of surface tension (Chandrasekhar [12.1]).

The electrostatic sheath surrounding the plasma has an effective surface tension (Rose and Clark [12.2], p.

291). It was shown by Rosenbluth, Krall and Rostoker [12.3] that this effect can damp local flute modes. Here the exposition and notation of Schmidt ([12.4], pp. 283–297) will be followed.

Without any significant loss of generality it will be assumed that $a \geq (3/2L)$. Then equation (8-153) of Schmidt is violated and so his result regarding his equation (8-137) is applicable for $0 < \beta \leq 1$. Note that in his notation $R = a$.

Assuming the field lines to be horizontal circles of radius of curvature $R = a$, the longest wavelength of a mode perpendicular to the field line would be about one-half of the minor circumference (because of the limit-cycles). Hence we may take, in Schmidt's notation, $k = 2\pi/\lambda$ where $\lambda \leq \pi b$, or $$k \geq \frac{2}{b}. \tag{12.1}$$

It will further be assumed that $$\frac{b}{20} \leq R_c < L \leq \frac{b}{10} < b < a = R. \tag{12.2}$$

Under these conditions, the hypothesis $$a \geq 240b \tag{12.3}$$

implies that $$k^2 R_c (\frac{3}{2} L + \frac{R}{2})^2 \geq 6RL, \tag{12.4}$$

which is precisely equation (8-137) of [12.4], and which therefore prevents the growth of local flute modes.

In order to prove (12.4), note that $a \geq 240b, R_c \geq b/20$ and $(b/10) \geq L$ together imply that $$\tag{12.5}$$

$$R_c^2 a \geq \frac{b^2}{400} a \geq \frac{b^3 240}{400} = (\frac{24}{4}) b^2 (\frac{b}{40}) \geq 6b^2 L$$
or
$$R_c^2 a \geq 6b^2 L.$$

Now, using (12.5), and (12.1), one has $$k^2 R_c^2 (\frac{3}{2} L + \frac{R}{2})^2 \geq R_c^2 \frac{4}{b^2} (\frac{3}{2} L + \frac{R}{2})^2 \geq$$

$$R_c^2 \frac{4R^2}{4b^2} = R_c^2 \frac{a^2}{b^2} \geq \frac{a(6b^2 L)}{b^2} = 6RL,$$

that is, (12.4) holds, as required.

REFERENCES

[12.1] S. Chandrasekhar, *Hydrodynamic and Hydromagnetic Stability*, Oxford University Press, 1961.
[12.2] D. J. Rose and M. Clark, Jr., *Plasmas and Controlled Fusion*, M.I.T. Press, 1961.
[12.3] M. N. Rosenbluth, N. A. Krall and N. Rostoker, *Nucl. Fusion*, 1962 Suppl., Part 1, p. 143.
[12.4] G. Schmidt, *Physics of High Temperature Plasmas*, Academic Press, 1966.

M. SEVEN-STEP PROCEDURE FOR FEEDBACK STABILIZATION OF DISTRIBUTED-PARAMETER SYSTEMS SUCH AS PLASMAS

Sophisticated design of multi-channel stability augmentation or stabilization systems is not part of the prior art of the subject of the present invention. To date only very elementary applications of contemporary *systems engineering* theory to plasma stabilization have been reported. In such applications what constitutes *negative feedback* is obvious. However, when one considers simultaneously many degrees of freedom, as in a continuum-mechanical or distributed-parameter system, together with many sensors and many actuators, the problem of design of a feedback control filter network or equivalent digital computer-control means to link the sensors effectively to the actuators in such a multi-channel situation far exceeds the power of human intuition. It is then necessary to employ a systematic theoretical multi-channel design procedure, of the type known in the art of design and development of aerospace-vehicle stabilization systems, but hitherto little used in plasma confinement technology. The purpose of the present appendix is to indicate as concisely as possible how to apply such procedures to the problem of assuring adequate dynamic structural stability of plasmas confined by the principles of the present invention.

As shown in sub-parts E, F and G above, requiring static structural stability of the magnetic field line configuration on the plasma's surface leads to *unfavorable curvature* of the magnetic field lines on the outer part of that magnetic shell tangent to the plasma's surface. Thus the plasma is dynamically unstable (see sub-parts J and K), but the choice of static structural stability allows system *identifiability* (in a sense to be explained), which in turn allows the possibility of both *observability* and *controllability* with suitable choices of actuators and sensors; the latter properties then render it a routine matter to stabilize the naturally-unstable normal modes.

For each postulated kidney-bean shaped plasma cross-section 141, one may determine loci of conductors and corresponding strengths of currents in the conductors sufficient to produce a magneto-static equilibrium of the type defined here; analytical and numerical procedures for this determination have been presented in sub-parts C, D and I.

It was also shown in sub-parts J and K how to set up and linearize the EMTFD equations around an equilibrium and how to perform a normal mode analysis (small oscillation analysis) of it. This in effect converts the problem into the standard *state-variable* control problem (see Kalman, Falb, and Arbib [13.1]), except that there are infinitely many degrees of freedom. However, this problem may be "truncated" by neglect of all but a finite number of modes, say the first thirty modes. There are theoretical justifications for such a truncation (note the subject of *completely continuous* operators in the mathematical discipline of functional analysis) and it has been demonstrated experimentally to be effective both in computer simulations (see Dolph and Lewis ([13.2]) and in design of aerospace vehicles.

In terms of this high-dimensional but conventional control problem, one may now compute the *matrices of controllability* and *observability* defined by Kalman ([13.1]) and use them to select and size *actuators* and to select and position *sensors* and then to design a conventional feedback control system which will artificially stabilize the unstable modes (see for example ([13.3]).

In 1961 it was proved by R. W. Bass that if an open-loop autonomous linear system is both observable and controllable in the sense defined by R. E. Kalman in 1960, then constant coefficient gain factors can always be computed (see [13.1], p. 49) such that with their use physically realizeable passive stable networks or equivalent digital filters can be designed, by a computationally-effective algorithm, which will connect the sensors with the actuators in such a way that each and every *pole* (complex frequency of a natural mode) of the resulting closed-loop system can be made equal to any arbitrarily pre-specified value.

For high-beta plasmas, the local particle density may be measured by sensors based upon infrared lasers. Another standard sensor system consists of a plurality of magnetic probes (Rogowski loops or pick-up coils) situated in the vacuum surrounding the plasma and used to detect variations in the present vacuum field from the *nominal* or ideal field (that is, the field known theoretically to correspond with the equilibrium that it is desired to preserve). A corresponding system of actuators could be a plurality of secondary conductors in which secondary currents could be rapidly altered to generate alterations in the confining vacuum field; this is technologically feasible because there are available switches which can completely reverse the direction of a fifteen ampere current in as little as one hundred nanoseconds.

It has been disclosed in sub-parts J and K herein that the linearized EMTFD equations can be reduced in Helmholtz's equation $(\nabla^2 + \lambda^2)\phi = 0$ for normal modes or standing waves of sound in an ideal gas. The complex normal frequencies are all roots of an associated polynomial dispersion relation of the tenth degree, whose coefficients are polynomials in the Helmholtz numbers (eigen-values of the Laplacian). The feedback loop is closed by noting that the Helmholtz numbers $\lambda^2$ are determined by a boundary value problem involving the electric and magnetic field vectors on the external surface of the vacuum surrounding the plasma; but if these fields are switched in response to sensed variations in the field near the plasma, the eigenvalue problem for the Laplacian is no longer independent of the dispersion relation, but, together with it, constitutes an implicit system determining the complex frequencies. The feedback coefficients are free parameters in this system, which can be adjusted to give the complex frequencies desirable properties, for example negative real parts. One algorithm applicable for this purpose is the procedure of Kalman and Bass cited previously.

The technique outlined so far may be referred to as *a prior model control*. It is desirable to compare results obtained from such a priori models with those obtained from empirical models. Frequently the two approaches are pursued in parallel and ultimately merged, or else alternated until the results show sufficient similarity for an inference of reliability and adequacy to be obtained. Since the *empirical model control* is less well-known, it will be summarized here in greater detail in the remainder of part II in a form applicable to dynamic stabilization of statically structurally stable plasma equilibria.

Elements of Systems Engineering Theory:

a. Mathematical Modeling

Consider what engineers schematically and conceptually refer to as an *arbitrary black box* (fixed but unknown device or system).

Assume that information can be fed into and taken out of the box, but that otherwise the box is not influenced or communicated with.

A mathematical model is a rule for computation, or algorithm, which reliably relates the box's outputs to its inputs.

b. Empirical Model Diagnosis

Suppose that numerous input-output experiments are performed upon a given black box. Suppose that (with the aid of sophisticated mathematics and much numerical data-processing) one can *deduce* a satisfactory mathematical model of the input-output process represented by the box.

A model inferred from direct experiments (rather than deduced theoretically from detailed postulates about the specific character of the process inside the box) is called an *empirical model*. The procedure of performing input-output experiments and processing the data to *identify* the empirical model is called system *diagnosis* (see [13.8]). Contemporary plasma physics literature reflects little awareness of the revolutionary progress in empirical system diagnosis which has occurred in modern systems engineering.

c. Empirical Model Control

As already explained, a typical plasma equilibrium of interest lacks natural (dynamical) stability.

Suppose that one instruments the reactor with *sensors* which have the property that their dial pointers read zero if and only if the plasma is in the desired equilibrium. (For example, optical sensors can note displacements of the plasma volume; magnetic field variations can be detected by pick-up coils, etc.). The readings on these dials will constitute the system output.

New augment the system with *actuators* which can alter the forces acting on the plasma. (For example, additional strong currents can be switched on and off in coils near the plasma.)

The resultant experimental system now resembles an arbitrary black box. The system inputs are the deviations from zero of the sensor readings.

If an analog or digital *computer control system*, or *computrol* system, can be designed to link the sensors with the actuators via *negative feedback*, then the plasma can be forced to remain in or near the equilibrium, i.e. the equilibrium can be artificially stabilized. Specifically, if increasing outputs result in actuator commands which start the outputs to decrease again, then we have negative feedback. If such a computrol system can be designed and implemented, then the outputs will always fluctuate near zero, meaning that the plasma must remain near equilibrium; this is called *automatic regulation*.

The only difficulty in designing a computrol system is the following. With a single output to be regulated and only a single actuator to operate, it is easy to ascertain by direct physical intuition just exactly what constitutes negative feedback.

However, in a fusion reactor there may be many sensors and many actuators, and, what is worse, in the empirical model linking the uncontrolled output of the sensors to arbitrary actuator inputs, there may be *scores* of distinct, but cross-coupled channels. In such complicated systems, it is impossible to determine just what constitutes negative feedback by either intuition or by any classical engineering techniques.

Fortunately, higher mathematics and systems engineering theory, particularly under the stimulus of aerospace requirements, has in the past decade completely resolved this basic problem. Given the empirical system model, computer programs are available which will automatically unravel the above-mentioned complications and print out the complete design of the most effective computrol system to *close the loop* between sensor output and input by strictly negative feedback. When such a computrol system is developed, and used to link sensors with actuators, the information flow is circular and endless: a deviation of the system from equilibrium causes a sensor output which causes a computrol command to the actuator input which modifies the equilibrium, which thereby produces a new sensor output, etc. ad infinitum. Because of this endless circularity, one speaks of a *closed loop* system and says that one has developed a *closed-loop automatic feedback control system*, or *feedback stabilization system*.

In some cases the equilibrium of the process to be regulated has some natural stability, but not as much as would be desirable. In such cases, one speaks of a *stability augmentation* system rather than a stabilization system.

The preceding approach, called *empirical model control*, works well only to the extent that certain *quantitative criteria* are met. These criteria will now be explained.

d. Identifiability, Observability, Controllability

Obviously the preceding technical approach cannot be used if it is not possible to perform a satisfactory empirical diagnosis by means of input-output tests (accompanied by appropriate data processing), that is, if the given instrumented equilibrium lacks *identifiability*. It is easy to prove that an equilibrium lacks satisfactory identifiability if it lacks the property of *static structural stability*.

Once the parameters defining an empirical model have been identified by an experimental diagnostic procedure, it is possible to check whether or not two important quantitative properties, called *observability* and *controllability* are, present in satisfactory amounts. Roughly speaking, the former measures the adequacy of the sensor subsystem and the latter does the same for the actuator subsystem. If numerical computation of either of these criteria indicates inadequacy, then the corresponding subsystem must be modified; subsequently, the open-loop system must be reidentified, and then the observability and controllability recomputed. This process must be repeated until adequate sensor and actuator subsystems have been developed. At that point the computrol algorithms already mentioned can be used to complete the design of an adequate computrol system.

When an engineering system has the property that small changes in the quantities defining the system can only produce small quantitative changes (and *no* qualitative changes) in the system's observable characteristics; then it has *structural stability* as defined above in sub-parts E, F and G.

A statically or dynamically *structurally* stable system can be in the previously-defined sense either stable or unstable; what structural stability means is that a mathematical model can be identified whose *predictions are reliable* even in the presence of unknown and undesired small disturbances, noise, manufacturing tolerances, operational errors, etc. Roughly speaking, a mathematical model has structural stability if it can be *deformed slightly* in arbitrary and unknown ways *without altering* the system's *predicted* behavior (be that either stability or instability).

For a magnetic confinement apparatus to be more than a delicate laboratory curiosity, it obviously must have structural stability (both static and dynamic).

Hitherto the most extensively analyzed magnetic confinement devices are the Stellarator and the Tokomak. Experiments have shown that neither has structural stability. The Stellarator at Garching bei Muenchen has exhibited a distribution of its radial density versus magnetic rotational transform angle which contradicts prior theoretical predictions; but it is easy to see that these predictions were based upon a model which fails to satisfy known criteria necessary for structural stability.

The same objection applies to the basic mathematical model of the Tokomak, which could not be made to work even briefly until, after a decade of trial-and-error efforts, it was learned that the confining magnetic field strength had to be within one hundredth of one per cent of its nominal design value in order for an equilibrium to be attained (see [13.4], p. 641, par. 3).

f. Experimental Evidence of Relevance of Static Structural Stability

The standard theory of toroidal magneto-fluid dynamical equilibria (which goes back to Spitzer, Kruskal, and Kulsrud [13.5] involves a nested family of toroidal magnetic shells, the most important characteristic of each being its *rotational transform angle* or Poincaré rotation number [13.6]. When the number is rational at least one magnetic field line is closed; when it is irrational no field line is closed and every line winds ergodically over a dense subset of the entire shell. It can be proved theoretically that if the number is not constant and varies continuously with increases in the radial parameter indexing the shells, certain gross physical properties of the shells should jump, discontinuously, infinitely often as the radial parameter is increased. (A certain integral important in dynamic stability criteria may have value $V_1$ at all rational values and value $V_2$ at all irrational values.) Such paradoxical behavior contradicts all experience of macroscopic phenomena and indicates clearly the something is wrong with the mathematical model.

This suspicion of mathematical pathology has been strikingly confirmed by experimental results. On the basis of known results in those parts of electromechanical engineering studied by the discipline of nonlinear mechanics, one might expect a finite number of the rational shells to expand into shells of a finite thickness and to alternate with shells of finite thickness (consisting of shells of identical rotation numbers) having the properties associated with an irrational rotation number. (This is shown clearly in FIG. 8, page 43, [13.77].) To the surprise of many, this is exactly what has been observed in certain plasma physics experiments which were designed and performed with great care at Garching bei Muenchen (the Wendelstein l=2 Stellarator). As shown in FIG. 6, page 41, of [13.7], the plasma density drops sharply at alternating, finitely thick layers, centered on shells, the denominator of whose rotation number is 3, 4, 5, . . . , 15. This phenomena cannot be explained on the basis of the standard continuum-mechanical macroscopic theories. However, it would be very desirable to avoid the complexity of micro equilibrium studies and examinations of this topic based on kinetic theory.

g. Consequences for Fusion Reactor Configurations

Fortunately, the standard continuum-mechanical model of the preceding situation can be demonstrated to have glaring defects when it is examined from the point of view of the Andronov-Pontrjagin theory of structural stability. An important *necessary* (but far from sufficient) condition for the rotation number of a magnetic shell to remain invariant under small perturbations of the external currents generating the magnetic field, in which the values of the currents, or their geometry, or both, are altered sufficiently slightly, is that the rotation number must be *rational*. This shows two things. Firstly, there is to be expected a real physical distinction between the two types of shells. Secondly, none of the shells are components of a valid methematical model, with observable consequences, since the irrational shells all fail the rotation number test and the rational shells, though they pass this test, fail the further test that the only acceptable rotation number is *identically zero*.

The systems engineering approach thus automatically excludes every hitherto suggested closed toroidal magnetic confinement means.

h. Unique Acceptable Magnetic Confinement Means

There are two distinct aspects of the structural stability of a plasma-equilibrium model; these are, respectively, *static* and *dynamic* structural stability.

In the former, one poses a geometric or topological question, "Does the qualitative pattern of the magnetic field lines on the magnetic shell tangent to the plasma surface remain unchanged when small changes are made in the geometry of external current-carrying conductors, or in the values of the external currents?"

If not, it is unreasonable to expect to proceed reliably to the next question: "Given an equilibrium with fixed external conductors and currents, how does the plasma behave in time if its initial state is not exactly at, but merely near to, that of the equilibrium; and is this predicted time-behavior invariant under small changes in the external conductors and currents?"

As mentioned above in connection with the EMTFD analysis of sub-parts J and K, this second problem, called that of dynamic structural stability, can be attacked by techniques from the theory of small oscillations in fluid or continuous media. (Recall the standing acoustic modes in pipe organs or the standing microwave fields in cavity resonators.) Although plasma confinement researchers have exhibited no awareness of this decisively important fact, it is well known in non-linear stability theory that a linearized (or small oscillation) analysis can give accurate and reliable predictions of stability or instability regarding the true non-linear system only if the linearized model has dynamic *structural* stability. In other words, the prediction of whether or not a particular mode of oscillation will start to grow, or will instead decay in time, is valid for engineering purposes only if the linearized model has *structural* stability; but in sub-part K it was proved that the EMTFD model (unlike all prior models) does have this required property. [If one includes *simultaneously* displacement current, electrical resistivity, thermal conductivity, and viscosity in the one fluid EMTFD equations, and carries the Hall effect term and other finite gyro-radius terms in the complete version of Ohm's law due to Professor L. Spitzer, then it is a priori certain that the complex frequencies of all normal modes of oscillation will have non-zero real parts, which ensures dynamic structural stability.] Therefore, until recently the only remaining unsolved problem concerned static structural stability, the principal objective of the present invention.

A Seven-Step Procedure:

The following exposition is intended to give a brief review of how a modern system-theory and information-sciences oriented fusion reactor designer would go about controlling an unknown dynamical plant or process. The most important basic concepts are IDENTIFIABILITY, OBSERVABILITY, and CONTROLLABILITY.

Identifiability means that parameters defining an empirical input-output model of the process can be obtained from appropriate experimental test the testing generates data which can be processed by means of suitable computer programs of yield estimates of the parameters which specify the empirical mode. The requirement of static structural stability assures identifiability in the present method.

*Observability and Controllability* pertain to the selection, positioning, and sizing of *sensors* and *actuators* adequate for regulation of the plant.

Although particular sensing instruments and actuating means may be used in identifying the empirical model, they may be far from ideal with respect to effectiveness in designing a closed-loop regulator system for the process.

*Observability and controllability* are mathematical criteria due to R. E. Kalman [13.1] which enable the designer to assign *quantitative* figures-of-merit to various hypothetical choices of alternative sensor/actuator sub systems and thereby make an effective final choice.

Any sensor subsystem together with the empirical model of the plant constitutes a *plant-sensor pair*. A *plant-actuator* pair is defined similarly.

A plant-sensor pair is *observable* if at least one sensor is stimulated by every possible dynamical mode of the plant, i.e., if every variable defining the instantaneous state of the plant has an effect on at least one sensor. More specifically, the pair is observable if it is possible, in principle, to estimate with adequate effectiveness the complete set of state variables at any time by suitable computer-processing of the past sensor outputs (up to and including the present output). A plant sensor-pair is not observable if dynamical modes can be excited which have no effect upon any sensor, e.g., some internal state variable (such as a pressure) can be increasing exponentially yet no sensor will indicate that the plant is beginning to explode.

A plant-actuator pair is *controllable* if at least one actuator can excite every state variable. More specifically, the pair is controllable if it is possible, in principle, to force or drive any state variable to any desired value by appropriate command inputs to the actuators. A plant-actuator pair is not controllable if some dynamical modes exist upon which no actuator has any effect, e.g., the plant may be exploding but no possible combination of actuator inputs can halt or reverse the process.

After final selection of the sensor/actuator subsystems so that the plant-sensor pair has a high degree of observability and so that the plant-actuator pair has a high degree of controllability, it is possible to proceed with the design of a *feedback control filter* or *control computer* which will link the sensors to the actuators in a closed-loop feedback controlled system; specifically, the control computer embodies suitable *information processing algorithms* which enable the actuator inputs to respond to the sensor outputs in such a manner as to drive the plant's state toward its desired condition.

The unknown plant, process, or open-loop system may be identified by input-output experiments and appropriate data-processing in a sequence of three steps.

STEP ONE

In the first step, one identifies the Markov parameters of the unknown process. The details of two particular methods of doing this (a frequency-response method for processes which have natural input-output stability, and a regression-analysis type of method for naturally unstable processes) are given in [13.10].

STEP TWO

In the second step, one identifies the *input-distribution-matrix*, the *output-distribution matrix*, and the *dynamical coefficient matrix*, as well as the *dimension* n of the system's state-vector. These three matrices, together with n, can be computed from the Markov parameters by means of the Ho-Kalman Algorithm [13.1].

STEP THREE

In the third step, or check on step two, one obtains an *independent* estimate of the dimension n, and simultaneously greatly refined estimates of the precise numerical values of the three matrices, by means of techniques from multi-channel stochastic optimal nonlinear filtering [13.11]; compare [13.12] and [13.8].

At this point the *diagnosis* of the unknown plant may be regarded as complete.

STEP FOUR

The next step is to optimize the input- and the output-distribution matrices by means of imaginary experiments (performed analytically and computationally) in which the existing sensors and actuators are compared with other feasible sensor/actuator subsystems. For example, the nature of the sensors and actuators may be changed; or their location may be altered; or their associated gain parameters may be varied, and the results assessed quantitatively.

The quantitative measures of the sensor/actuator subsystem effectiveness are the magnitudes of the inverses of the matrices of *controllability* and *observabiltiy*. The first may be computed from the input-distribution matrix and the dynamical coefficient matrix, while the second may be computed from the output-distribution matrix and the dynamical coefficient matrix. A technique for optimizing the above-mentioned inverses, i.e., keeping the dynamical coefficient matrix fixed and optimizing the input- and output-distribution matrices, is given in [13.13].

It may turn out that the existing sensors and actuators are adequate. But if the preceding analysis indicates poor controllability or poor observability, or both, it will be necessary to modify the sensor/actuator subsystems and then repeat the first four steps above in order to make sure that the input-and output-distribution matrices have been properly identified and that the new system actually does have adequate controllability and observability.

STEP FIVE

The fifth step is to design (purely for the purpose of optimization studies, because it may not be practicable to fully implement it) an optimal feedback control filter based on optimal filtering theory and stochastic optimal control theory (cf. Mortensen [13.14] for the completely general *nonlinear* case). This step can be accomplished by means of the GASP computer program [13.15]; compare [13.3], Chapter 15, pp. 341-375.

STEP SIX

The sixth step is to design a practical version of the optimal feedback filter, in which the filter is a priori constrained as to the degree of complexity allowed.

The resultant feedback control filter may still not be practical; e.g., it may require impractically large gains (which result from poor controllability or poor observability). One cure is to improve the sensor/actuator subsystem, i.e., repeat steps five and six.

An alternative cure is to relax the constraint on the complexity of the control computer. Considering the revolutionary improvements in modern information-processing technology, this is often the technique of choice. It can be shown that if p is the number of poles in the control filter (which for economy it is desired to keep small), if l is the number of sensors, if m is the number of actuators and if n is the number of state variables (as determined in steps two and three), then step six can always be completed whenever $$[(\frac{m}{m+l})(n-l)] \leq p \leq n-l.$$

In step five one finds the n optimal filter poles for a Kalman-Bucy filter. This is usually impractically large. In step six, if one is willing to take p as large as $p=n-1$ then the two matrix equations become uncoupled and can always be solved, yielding a Luenberger filter. In the presently recommended approach one starts with the smallest integer p which is larger than $[m/(m+l)](n-l)$ and performs step six. If simulations show that the resultant closed-loop system is not satisfactory, then replace p by $(p+1)$ and repeat step six. When simulations reveal that the point of diminishing returns has been reached, i.e., further increases in the dimensionality of the filter yield comparatively insignificant performance improvements, then the value of p has been found which is best from the point of view of *cost-effectiveness*.

STEP SEVEN

The seventh and final step is to convert the system design into one which is still optimal when *saturation* is taken into account. The result is *always* a system in which some variable is switched in a discontinuous manner, i.e., a *bang-coast-bang* system in which a tri-stable switch can have either the positions $+1$, 0 or $-1$. Since bang-coast-bang systems have a name which connotes discontinuity, many non-specialists associate the name with an unacceptable kind of control, which makes it necessary to explain that in practice *all* closed-loop feedback control systems operate in a bang-coast-bang mode, *when analyzed in sufficient detail*. This is because some physical variable always saturates except when the closed-loop system's outputs are so close to their desired values that *every* component in the entire system is operating within its range of linearity, which rarely happens. The way around this difficulty is to take advantage of it.

Specifically, choose the m variables in the closed-loop system's actuator-subsystem's complete block-diagram which saturate first, and regard the saturation limits as a priori constraints on the size of the control inputs. In doing this it usually becomes necessary to raise the dimensionality n of the problem by incorporating the actual sensor subsystems and actual actuator subsystems together with the actual unknown plant or process in an experimental assembly known as an *on-line subsystem test* wherein the feedback control filter and those environmental interactions difficult to provide directly are provided by a *hybrid computing system* coupled directly with the other subsystems and operating in real time. Upon repeating steps one through six with this more detailed model, the dimension n is usually raised.

Now suppose that so far the input-output experiments upon the openloop plant have been conducted in an artificial laboratory environment not subject to various disturbances that would be encountered in practice. These effects should be incorporated (e.g., by computer simulation) in the on-linesubsystem test referred to above. Frequently, satisfactory results can be obtained by forcing only the unstable or least stable of the original n open-loop poles into new positions, and by forcing a few of the newly added p filter poles into desirable positions, and letting the remaining poles fall where they may.

It should be emphasized that by means of a *separation loop* it can be assured in advance that the filter poles are the *same* when the two subfilters comprising the feedback filter are considered *separately* as the open-loop components (to which steps one through three are applicable, e.g., for standardization purposes), and when the poles are regarded, after the loops are all closed, as part of the (n + p) poles of the entire closed-loop. (In conventional design procedures, they are always shifted, as there is no separation loop.)

The level of detail necessary to arrive at the bang-coast-bang model varies with the situation at hand. In the most detailed model, the saturating variable is the switching information itself (or output of the feedback control filter), and at this level there is almost perfect correspondence between the theoretical model and reality.

It was discovered by Madame Flugge-Lotz [13.16] that linear feedbacks to switches usually lead to the phenomenon of high-frequency switching called "chattering"; mathematically, the *average* of the values of each of the state variables behaves *exactly* as if the system were actually governed by perfectly proportional power amplifiers! The mathematical theory by which one can compute the equivalent linear system (corresponding to the actual switched chattering system) and vice versa was first derived in general by André and Seibert (see [13.17]and [13.18]). Mathematically, saturated control of this type forces the n state variables onto an (n−1) - dimensional subspace or "hyperplane" of the state space, and keeps the state on this hyperplane while "sliding" the state to its target value; for this reason Russian authors refer to "chattering " as operation in the *sliding regime*.

The foundations for a general technique for optimizing switching systems was laid by students of Lefschetz, especially Bellman, who pioneered in the variational treatment of general discontinuous control problems (cf. [13.19]). In 1956, R. W. Bass noted ([13.17], p. 191) that the optimal switcing times could be mechanized by an on-line simulation of the system "adjoint" to the original open-loop plant. In 1957, Pontriagin, Gamkrelidze, Boltianskii and Mischenko published the celebrated "Maximum Principle", which unifies and generalizes the previously known special cases into a complete theory [13.20]. The synthesis of optimal switching feedback systems was further developed by Wonham and Johnson [13.21] and by Bass, Gura and Webber [13.22], [13.23], [13.24].

The system as designed in step six must next be augmented by an additional *fine-tuning filter*, which processes the outputs of the sensors *and* the switching elements to give a correction feedback signal which modifies the output of the control feedback filter designed previously. (The use of feedback from switches as an input to the filters which drive the same switches is called "hard feedback" by Russian authors). The fine-tuning filter is a dual-mode filter (the modes being selected, by an additional switch, as high-frequency or low-frequency according to whether or not the main switches are chattering or stable, e.g., whether the valves are not saturated or are saturated).

One may now proceed to the completion of step seven by *ultra-fine tuning*. The actual switches will have the additional complexities of *dead-zone, hysteresis,* and *time-delay*. For techniques suitable for handling these effects, see Bass [13.17].

With the elimination or optimization of any remaining unacceptable steady-state "hunting", the seventh step is complete.

CONCLUSION: COMPUTER CONTROL

The seven steps outlined above will lead systematically to the design and development of a satisfactory computroller. Notice that the final version of the system which links the l sensor outputs with the m actuation inputs is a rather complicated collection of filters and switches. In principle each filter can be realized by a passive, stable RLC network, but active elements (summers and switches) are also needed. Thus one has both analog techniques and switches. The result begins to resemble a hybrid computer.

This suggests consideration of design of the compu-trol system, which links the sensor outputs (suitably transduced) to the actuator inputs, as a *special-purpose* digital filter or digital data-processing system. Another approach would be on-line use of a parallel-logic multiprocessor general-purpose digital computer in real time. Considerations of cost-effectiveness relative to a particular application will determine this final decision.

REFERENCES

[13.1] R. E. Kalman, P. L. Falb, and M. Arbib, *Topcis in Mathematical System Theory*, McGraw Hill, 1969

[13.2] C. L. Dolph and D. C. Lewis, *Quaterly of Applied Mathematics*, vol. 16, 1958, pp. 97–110

[13.3] B. D. O. Anderson and J. B. Moore, *Linear Optimal Control*, Prentice-Hall, 1971

[13.4] *New Scientist*, Sept. 25, 1969

[13.5] L. Spitzer, *Physics of Fully Ionized Gases*, Interscience, 2nd ed. 1962

[13.6] E. A.Coddington and N. Levinson, *Theory of Ordinary Differential Equations.* McGraw Hill, 1955

[13.7] *Physics Today*, December 1969

[13.8] D. Graupe, *Identification of Systems*, van Nostrand-Reinhold, 1972

[13.9] W. Hahn, *Stability of Motion*, Springer-Verlag, New York 1967

[13.10] R. W. Bass, Diagnosis of Unknown Multichannel Processes from Input-Output Experiments, CSATR 72-031-01, Computer Software Analysts, Inc., Los Angeles, Calif. October 1972

[13.11] R. W. Bass, V. D. Norum and L. Schwartz, "Optimal Multichannel Nonlinear Filtering", *J. Math. Analysis and Applications*, vol. 16 , 1966, pp. 152–164

[13.12] R. S. Bucy and P. D. Joseph, *Filtering for Stochastic Processes with Applications*, Interscience, 1968

[13.13] C. D. Johnson, "Optimization of a Certain Quality of Complete Controllability and Observability for Linear Dynamical Systems", *ASME Trans. J. Basic. Eng.*, vol. 91, 1961, pp. 228–238.

[13.14] R. E. Mortensen, "Stochastic Optimal Control With Noisy Observations", *Int. J. of Control,* vol. 4, 1966, pp. 455–464.

[13.15] R. F. Webber, W. Freested, and R. W. Bass, "The GASP Program—An Integrated Tool for Optimal Control and Filter Design", *Proc. TACC,* 1968.

[13.16] I. Flügge-Lotz, *Discontinuous and Optimal Control,* McGraw Hill, 1968

[13.17] R. W. Bass, "Equivalent linearization, nonlinear circuit synthesis and the stabilization and optimization of control systems, " *Proceedings,* Symposium on Nonlinear Circuit Analysis, Polytechnic Inst. of Brooklyn MRI Series vol. VI (1956) pp. 163–198

[13.18] J. André and P. Seibert, "Über stückweise lineare Differentialgleichungen, die bei Regelungsproblem en auftreten, I, II," *Arch. Math.,* vol. 7, 1956, pp. 148–156, 157–165

[13.19] R. E. Bellman, I. V. Glickberg and O. A. Gross, *Some Aspects of the Mathematical Theory of Control Processes,* Rand Corp., Jan. 16, 1958

[13.20] L. S. Pontryagin, V. G. Boltyanskii, R. V. Gamkrelidze and E. F. Mischenko, *The Mathematical Theory of Optimal Processes,* Interscience, 1962

[13.21] W. M. Wonham and C. D. Johnson, "Optimal Bang-Bang Control with Quadratic Performance Index," *Trans. ASME Ser. D: J. Basic Eng.,* vol. 86 (1964), pp. 107–115

[13.22] R. W. Bass and I. Gura, "High Order System Design via State-Space Considerations," *Proc. Joint Auto. Control Conf.* (1965), pp. 311–318

[13.23] R. W. Bass and R. F. Webber, "On Synthesis of Optimal Bang-Bang Feedback Control Systems with Quadratic Performance Index," *Proc. Joint Auto. Control Conf.* (1965, pp. 213–219

[13.24] R. F. Webber and R. W. Bass, "Simplified Algebraic Characterization of Optimal Singular Control for Autonomons Linear Plants", Martin Marietta Corp. Res. Rep. R-67-6, March 1967

While the invention has been described in connection with specific embodiments thereof and in specific uses, various modifications thereof will occur to those skilled in the art without departing from the spirit and scope of the invention as set forth in the appended claims.

The terms and expressions which have been employed in this specification are used as terms of description and not of limitation, and there is no intention in the use of such terms and expressions to exclude any equivalents of the features shown and described or portions thereof, but it is recognized that various modifications are possible within the scope of the invention claimed.

We claim:

1. Apparatus for confining a high temperature plasma which comprises envelope means shaped to form a toroidal hollow chamber containing a plasma comprising a selected gas at a predetermined small fraction of atmospheric density and at a predetermined elevated temperature, and magnetic field lines generating means for confining, within said chamber, said plasma in a smooth toroidal shape without cusps having a non-convex poloidal cross-section by a smooth magnetic surface comprising a set of magnetic field lines tangent to the surface of said plasma, in which said set of magnetic field lines is characterized by having no field line of zero strength at any point, by having a selected finite even non-zero number N and not more than N closed toroidal axially symmetric magnetic field lines, and by having a zero rotational transform angle, said magnetic field line generating means including first current means to effect a poloidal flow of current transversely around and exteriorly of said plasma, in order to tend to displace said magnetic field lines inwardly toward the longitudinal axis of said plasma and thereby compress said plasma about its longitudinal axis, as well as to curve said magnetic field lines about the toroidal axis of said plasma, second current means to effect a toroidal flow of current longitudinally of said plasma and exteriorly thereof adjacent the side of said plasma having a relatively small radius in comparison to the diametrically opposite large radius side of said plasma, thereby to further curve selected ones of said magnetic field lines at a selected region on the surface of said plasma in a direction away from said toroidal axis and toward the longitudinal axis of said plasma so that the poloidal cross-section of said plasma is non-convex, and third current means positioned exteriorly of both said plasma and said second current means to effect toroidal flow of current longitudinally of said plasma and in a direction opposite to the direction of the flow of current effected by said second current means, thereby to prevent movement of said plasma in a direction toward the large radius side of said plasma, and where the values of the currents in said first, second and third current means are selected so that said plasma is bounded by only a single such smooth magnetic surface having static structural stability, said smooth magnetic surface being the product of the interaction of two separate and distinct families of magnetic surfaces produced by said currents in said first, second and third current means.

2. Apparatus for confining a toroidal high temperature plasma within a vacuum by a magnetic field so that magnetic field lines at the interface of said plasma and said vacuum are characterized by structural stability, which comprises means for generating in said vacuum surrounding said plasma a magnetic surface that urges the surface of said plasma into a toroidal configuration, wherein said magnetic surface is characterized by a smooth surface without cusps having magnetic field lines with a zero rotational transform, said magnetic field lines being tangent to the surface of said plasma and including at least but not more than two closed toroidal axially symmetric magnetic field lines which divide the magnetic field lines between said closed magnetic field lines at said surface into two regions, a first region and a second region, and a non-convex poloidal cross-section having two poloidal stagnation points corresponding to said two closed field lines, said means for generating a magnetic surface including first current means to effect a poloidal flow of current transversely around and exteriorly of said plasma, in order to tend to displace said magnetic field lines inwardly toward the longitudinal axis of said plasma and thereby compress said plasma about its longitudinal axis, as well as to curve said magnetic field lines about the toroidal axis of said plasma, second current means to effect a toroidal flow of current longitudinally of said plasma and exteriorly thereof adjacent the side of said plasma having a relatively small radius in comparision to the diametrically opposite large radius side of said plasma, thereby to further curve selected ones of said magnetic field lines at a selected region on the surface of said plasma in a direction away from said toroidal axis and toward the longitudinal axis of said plasma so that the poloidal cross-section of said plasma is non-convex, and third current means positioned exteriorly of both said plasma and said second current means to effect toroidal flow of current longitudinally of said plasma and in a direction opposite to the direction of the flow of current effected by said second current means, thereby to prevent movement of said plasma in a direction toward the large radius side of said plasma, and where the values of the currents in said first, second and third current means are selected so that said plasma is bounded by only a single such smooth magnetic surface having static structural stability, said smooth magnetic surface being the product of the interaction of two separate and distinct families of magnetic surfaces produced by said currents in said first, second and third current means.

3. Apparatus for confining a toroidal high temperature plasma within a vacuum by as magnetic field so that magnetic field lines at the interface of said plasma and said vacuum are characterized by structural stability, which comprises means for generating in said vacuum surrounding said plasma a magnetic surface that urges the surface of said plasma into a toroidal configuration, wherein said magnetic surface is characterized by a smooth surface without cusps having magnetic field lines with a zero rotational transform which are tangent to said smooth surface, including at least but not more than N closed toroidal axially symmetric magnetic field lines which divide the magnetic field lines between said closed field lines at said surface into N regions, and a non-convex poloidal cross-section having N poloidal stagnation points corresponding to said N closed toroidal magnetic field lines, where N is a selected finite even number greater than two (N=4, 6, 8, . . . ), said means for generating a magnetic field including first current means to effect a poloidal flow of current transversely around and exteriorly of said plasma, in order to tend to displace said magnetic field lines inwardly toward the longitudinal axis of said plasma and thereby compress said plasma about its longitudinal axis, as well as to curve said magnetic field lines about the toroidal axis of said plasma, second current means to effect a toroidal flow of current longitudinally of said plasma and exteriorly thereof adjacent the side of said plasma having a relatively small radius in comparison to the diametrically opposite large radius side of said plasma, thereby to further curve selected ones of said magnetic field lines at a selected region on the surface of said plasma in a direction away from said toroidal axis and toward the longitudinal axis of said plasma so that the poloidal cross-section of said plasma is non-convex, and third current means positioned exteriorly of both said plasma and said second current means to effect toroidal flow of current longitudinally of said plasma and in a direction opposite to the direction of the flow of current effected by said second current means, thereby to prevent movement of said plasma in a direction toward the large radius side of said plasma, and where the values of the currents in said first, second and third current means are selected so that said plasma is bounded by only a single such smooth magnetic surface having static structural stability, said smooth magnetic surface being the product of the interaction of two separate and distinct families of magnetic surfaces produced by said currents in said first, second and third current means.

4. Apparatus for the magnetic confinement within a vacuum of a toroidal high temperature plasma under conditions such that the magnetic field at the surface of said plasma is characterized by structural stability, which comprises means for generating a magnetic surface in said vacuum surrounding said plasma which confines said plasma in a smooth-surfaced toroidal configuration without cusps wherein the poloidal cross-section of said plasma is non-convex, said means for generating said magnetic surface including means for applying to the surface of said plasma a set of magnetic field lines tangent to the surface of said plasma, said magnetic field lines including at least, but not more than N closed toroidal axially symmetric field lines which divide the magnetic field lines between said closed field lines at the surface of said plasma into N regions, where N is a selected finite even non-zero number, in which the magnetic field lines within each region do not cross any closed magnetic field lines, and in which the poloidal component of the magnetic field lines in each said region is opposite in direction to the poloidal component of the magnetic field lines in any immediately adjacent region, said means for generating a magnetic surface including first current means to effect a poloidal flow of current transversely around and exteriorly of said plasma, in order to tend to displace said magnetic field lines inwardly toward the longitudinal axis of said plasma and thereby compress said plasma about its longitudinal aixs, as well as to curve said magnetic field lines about the toroidal axis of said plasma, second current means to effect a toroidal flow of current longitudinally of said plasma and exteriorly thereof adjacent the side of said plasma having a relatively small radius in comparison to the diametrically opposite large radius side of said plasma, thereby to further curve selected ones of said magnetic field lines at a selected region on the surface of said plasma in a direction away from said toroidal axis and toward the longitudinal axis of said plasma so that the poloidal cross-section of said plasma is non-convex, and third current means positioned exteriorly of both said plasma and said second current means to effect toroidal flow of current longitudinally of said plasma and in a direction opposite to the direction of the flow of current effected by said second current means, thereby to prevent movement of said plasma in a direction toward the large radius side of said plasma, and where the values of the currents in said first, second and third current means are selected so that said plasma is bounded by only a single such smooth magnetic surface having static structural stability, said smooth magnetic surface being the product of the interaction of two separate and distinct families of magnetic surfaces produced by said currents in said first, second and third current means.

5. The method of producing in a toroidal vacuum volume a high temperature plasma confined by a magnetic field so that the magnetic field lines at the interface of said plasma and said vacuum have a zero rotational transform and are characterized generating a smooth magnetic surface within said vacuum volume composed of magnetic field lines which are tangent to the surface of said plasma and which confine said plasma in a smooth-surfaced toroidal configuration without cusps having a non-convex poloidal cross-section, in which said magnetic field lines include at least but not more than a selected finite even non-zero number of closed toroidal axially symmetric magnetic field lines, said step of generating a smooth magnetic surface including the further steps of first current means to effect a poloidal flow of current transversely around and exteriorly of said plasma, in order to tend to displace said magnetic field lines inwardly toward the longitudinal axis of said plasma and thereby compress said plasma about its longitudinal axis, as well as to curve said magnetic field lines about the toroidal axis of said plasma, second current means to effect a toroidal flow of current longitudinally of said plasma and exteriorly thereof adjacent the side of said plasma having a relatively small radius in comparison to the diametrically opposite large radius side of said plasma, thereby to further curve selected ones of said magnetic field lines at a selected region on the surface of said plasma in a direction away from said toroidal axis and toward the longitudinal axis of said plasma so that the poloidal cross-section of said plasma is non-convex, and third current means positioned exteriorly of both said plasma and said second current means to effect toroidal flow of current longitudinally of said plasma and in a direction opposite to the direction of the flow of current effected by said second current means, thereby to prevent movement of said plasma in a direction toward the large radius side of said plasma, and where the values of the currents in said first, second and third current means are selected so that said plasma is bounded by only a single such smooth magnetic surface having static structural stability, said smooth magnetic surface being the product of the interaction of two separate and distinct families of magnetic surfaces produced by said currents in said first, second and third current means.

6. In a method for producing a high temperature plasma which has the steps of maintaining a selected gas within an endless toroidal chamber at a predetermined relatively low density, and establishing a high temperature plasma from said gas within said chamber, the improvement in said method comprising the step of generating within said chamber a smooth magnetic surface that confines said plasma within said chamber in a smooth-surfaced toroidal configuration without cusps having a non-convex poloidal cross-section, in which said smooth magnetic surface comprises a set of magnetic field lines which are tangent to the surface of said plasma and of which at least but not more than a selected even finite non-zero number have closed toroidal axially symmetric paths, said set of magnetic field lines being characterized by a zero rotational transform angle, so that said set of magnetic field lines is characterized by structural stability, said step of generating a smooth magnetic surface including the further steps of first current means to effect a poloidal flow of current transversely around and exteriorly of said plasma, in order to tend to displace said magnetic field lines inwardly toward the longitudinal axis of said plasma and thereby compress said plasma about its longitudinal axis, as well as to curve said magnetic field lines about the toroidal axis of said plasma, second current means to effect a toroidal flow of current longitudinally of said plasma and exteriorly thereof adjacent the side of said plasma having a relatively small radius in comparison to the diametrically opposite large radius side of said plasma, thereby to further curve selected ones of said magnetic field lines at a selected region on the surface of said plasma in a direction away from said toroidal axis and toward the longitudinal axis of said plasma so that the toroidal cross-section of said plasma is non-convex, and third current means positioned exteriorly of both said plasma and said second current means to effect toroidal flow of current longitudinally of said plasma and in a direction opposite to the direction of the flow of current effected by said second current means, thereby to prevent movement of said plasma in a direction toward the large radius side of said plasma, and where the values of the currents in said first, second and third current means are selected so that said plasma is bounded by only a single such smooth magnetic surface having static structural stability, said smooth magnetic surface being the product of the interaction of two separate and distinct families of magnetic surfaces produced by said currents in said first, second and third current means.

7. The method of producing in a toroidal vacuum volume a high temperature plasma comprising the step of generating within said vacuum volume a smooth magnetic surface which confines said plasma in a smooth-surfaced toroidal configuration without cusps having a non-convex poloidal cross-section, in which said smooth magnetic surface includes magnetic field lines tangent to the surface of said plasma and having a zero rotational transform angle, in which at most a selected even finite non-zero number of said magnetic field lines are closed, toroidal and axially symmetric, so that said magnetic field lines are characterized by structural stability, said step of generating said smooth surface including the further steps of first current means to effect a poloidal flow of current transversely around and exteriorly of said plasma, in order to tend to displace said magnetic field lines inwardly toward the longitudinal axis of said plasma and thereby compress said plasma about its longitudinal axis, as well as to curve said magnetic field lines about the toroidal axis of said plasma, second current means to effect a toroidal flow of current longitudinally of said plasma and exteriorly thereof adjacent the side of said plasma having a relatively small radius in comparison to the diametrically opposite large radius side of said plasma, thereby to further curve selected ones of said magnetic field lines at a selected region on the surface of said plasma in a direction away from said toroidal axis and toward the longitudinal axis of said plasma so that the poloidal cross-section of said plasma is non-convex, and third current means positioned exteriorly of both said plasma and said second current means to effect toroidal flow of current longitudinally of said plasma and in a direction opposite to the direction of the flow of current effected by said second current means, thereby to prevent movement of said plasma in a direction toward the large radius side of said plasma, and where the values of the currents in said first, second and third current means are selected so that said plasma is bounded by only a single such smooth magnetic surface having static structural stability, said smooth magnetic surface being the product of the interaction of two separate and distinct families of magnetic surfaces produced by said current in said first, second and third current means.

8. The method of stably confining high temperature plasma within a toroidal vacuum volume by a set of magnetic field lines tangent to the surface of said plasma, comprising the step of generating within said vacuum volume a smooth magnetic surface which confines said plasma in a smooth-surfaced toroidal configuration without cusps, in which said plasma has a non-convex poloidal cross-section with at least but not more than a selected finite even non-zero number of poloidal stagnation points, in which each of said poloidal stagnation points lies on a corresponding closed toroidal axially symmetric magnetic field line tangent to the surface of the plasma, so that said set of magnetic field lines tangent to the surface of said plasma is characterized by structural stability, said step of generating a smooth surface including the further steps of first current means to effect a poloidal flow of current transversely around and exteriorly of said plasma, in order to tend to displace said magnetic field lines inwardly toward the longitudinal axis of said plasma and thereby compress said plasma about its longitudinal axis, as well as to curve said magnetic field lines about the toroidal axis of said plasma, second current means to effect a toroidal flow of current longitudinally of said plasma and exteriorly thereof adjacent the side of said plasma having a relatively small radius in comparison to the diametrically opposite large radius side of said plasma, thereby to further curve selected ones of said magnetic field lines at a selected region on the surface of said plasma in a direction away from said toroidal axis and toward the longitudinal axis of said plasma so that the poloidal cross-section of said plasma in non-convex, and third current means positioned exteriorly of both said plasma and said second current means to effect toroidal flow of current longitudinally of said plasma and in a direction opposite to the direction of the flow of current effected by said second current means, thereby to prevent movement of said plasma in a direction toward the large radius side of said plasma, and where the values of the currents in said first, second and third current means are selected so that said plasma is bounded by only a single such smooth magnetic surface having static structural stability, said smooth magnetic surface being the product of the interaction of two separate and distinct families of magnetic surfaces produced by said currents in said first, second and third current means.

9. In combination with the method as defined in claim 8, the additional step of providing asymptotic dynamic stability by pre-programmed open-loop multi-channel control.

10. In combination with the method as defined in claim 8, the additional step of providing asymptotic dynamic stability by closed-loop multi-channel feedback control.

* * * * *

UNITED STATES PATENT AND TRADEMARK OFFICE
CERTIFICATE OF CORRECTION

PATENT NO. : 4,236,964

DATED : December 2, 1980

INVENTOR(S) : Robert W. Bass, Helaman R.P. Ferguson, Harvey J. Fletcher, John H. Gardner, B. Kent Harrison, Kenneth M. Larson It is certified that error appears in the above-identified patent and that said Letters Patent are hereby corrected as shown below:

Column 5, line 63, change "mangetic" to -- magnetic --.

Column 6, line 1, change "mangetic" to -- magnetic --.

Column 6, line 51, change "closed lines" to -- closed field lines --.

Column 7, line 22, change "24b" to -- 23b --.

Column 8, line 25, change "r" to -- $\Gamma$ --.

Column 8, line 30, change "to" to -- in --.

Column 10, line 12, change "filed" to -- field --.

Column 10, line 14, change "litle" to -- little --.

Column 11, line 37, change "(1967)" to -- (1967)) --.

Column 11, line 40, change "Systèmes" to -- "Systèmes --.

Column 12, line 65, change "is" to -- in --.

Column 13, line 3, change "arc" to -- are --.

Column 13, line 56, change "inventin" to -- invention --.

Column 14, line 2, change "mathematicl" to -- mathematical --.

Column 15, line 34, change "2104/2n" to -- $\partial\psi/\partial n$ --.

UNITED STATES PATENT AND TRADEMARK OFFICE
CERTIFICATE OF CORRECTION

PATENT NO. : 4,236,964

DATED : December 2, 1980

INVENTOR(S) : Robert W. Bass, Helaman R.P. Ferguson, Harvey J. Fletcher, John H. Gardner, B. Kent Harrison, Kenneth M. Larso It is certified that error appears in the above-identified patent and that said Letters Patent are hereby corrected as shown below:

Column 15, line 36, change "shapethat" to -- shape that --.

Column 16, line 57, change "low-beat" to -- low-beta --.

Column 19, line 1, change "B" to -- $\vec{B}$ --.

Column 19, line 1, change "B $\cdot$ n" to -- $\vec{B} \cdot \vec{n}$ --.

Column 20, line 38, change "fucntion" to -- function --.

Column 20, line 41, change "$f(\psi) \ f(\psi)$" to -- $f(\psi) \ f^1(\psi)$ --.

Column 21, line 28, change "symetircal" to -- symmetrical --.

Column 21, line 40, change "$|\nabla\psi|$" to -- $|\nabla\psi|^2$ --.

Column 21, line 62, change "filed" to -- field --.

Column 22, line 7, change "$\Delta\psi$" to -- $\Delta_*\psi$ --.

Column 22, line 67, change "$(\sqrt{r + r_c}) \equiv \epsilon$" to -- $(\sqrt{r + r_c})\{\epsilon$ --.

Column 23, line 64, change "constant" to -- constants --.

Column 24, line 24, change "$\xi < \xi^1$" to -- $\xi > \xi^1$ --.

Column 24, line 25, change "$q_n(\xi) \ p_n(\xi)$" to -- $q_n(\xi^1) \ p_n(\xi)$ --.

Column 24, line 28, change "$\int_0^\Sigma$" to -- $\int_0^\Pi$ --.

Column 24, line 47, change "$\tilde{w}$" to -- $\dot{\tilde{w}}$ --.

UNITED STATES PATENT AND TRADEMARK OFFICE
CERTIFICATE OF CORRECTION

PATENT NO. : 4,236,964

DATED : December 2, 1980

INVENTOR(S) : Robert W. Bass, Helaman R.P. Ferguson, Harvey J. Fletcher, John H. Gardner, B. Kent Harrison, Kenneth M. Larson It is certified that error appears in the above-identified patent and that said Letters Patent are hereby corrected as shown below:

Column 26, line 24, change "$> \pi > 2\pi$" to -- $0 < \pi < 2\pi$ --.

Column 27, line 38, change "$\frac{3\pi}{4} - i\infty$" to -- $\frac{3\pi+}{4} -i\infty$ --.

Column 27, line 39, change "$\frac{7\pi}{4} - i\infty$" to -- $\frac{7\pi-}{4} -i\infty$ --.

Column 28, line 15, change "$\int_\ell$" to -- $\oint_\ell$ --.

Column 29, line 13, change "the" to -- The --.

Column 29, line 16, change "to abe" to -- to be --.

Column 29, line 34, change "$\Delta$" to -- $\Delta*$ --.

Column 30, line 27, change "$\frac{2h^2}{k^2} 2$" to -- $\frac{2h^2}{k^2} + 2$ --.

Column 30, line 52, change "experimentsusing" to -- experiments using --.

Column 31, line 12, change "radius" to -- radial --.

Column 31, line 48, change "$\pi$" to -- $\Sigma$ --.

Column 31, line 68, change "hartman" to -- Hartman --.

Column 32, line 19, change "$B_O$" to -- $B_\theta$ --.

Column 32, line 46, change "$\vec{B}_{94}$" to -- $\vec{B}_\sigma$ --.

Column 32, line 64, change "similr" to -- similar --.

Column 33, line 16, change "[2.1]" to -- [6.1] --.

UNITED STATES PATENT AND TRADEMARK OFFICE
CERTIFICATE OF CORRECTION

PATENT NO. : 4,236,964

DATED : December 2, 1980

INVENTOR(S) : Robert W. Bass, Helaman R.P. Ferguson, Harvey J. Fletcher, John J. Gardner, B. Kent Harrison, Kenneth M. Larson It is certified that error appears in the above-identified patent and that said Letters Patent are hereby corrected as shown below:

Column 33, line 68, change " $\delta$ defined" to -- $\delta_i$ defined --.

Column 33, line 68, change "$\delta_k = \epsilon$" to -- $\delta_k < \epsilon$ --.

Column 34, line 65, change "Lür" to -- Lüst --.

Column 34, line 66, change "Naturforschung" to -- Zeitschrift für Naturforschung --.

Column 36, line 30, change "$\hat{E}_1$" to -- $\hat{e}_1$ --.

Column 36, line 34, change "$\omega^1 \omega^2$" to -- $\omega^1 \wedge \omega^2$ --.

Column 36, line 35, change "$\hat{S}$" to -- $S$ --.

Column 37, line 47, change "$d_{100}$" to -- $d_\phi$ --.

Column 38, line 7, change "(4)" to -- [Start new paragraph with] (4) --.

Column 38, line 36, change "$g\zeta^2 = 0(\zeta^3)$" to -- $g\zeta^2 + 0(\zeta^3)$ --.

Column 38, line 55, change "$B_{100}$" to -- $B_\phi$ --.

Column 39, line 44, change "$\nabla\rho \cdot \vec{v} = \rho\nabla \cdot \vec{v}$" to -- $\nabla\rho \cdot \vec{v} + \rho\nabla \cdot \vec{v}$ --.

Column 41, line 1, change "$f(\psi) f(\psi)$" to -- $f(\psi) f^1(\psi)$ --.

Column 43, line 13, change "$\bar{Q} = \mu - i\nu$" to -- $\bar{Q} = u - i\nu$ --.

UNITED STATES PATENT AND TRADEMARK OFFICE
CERTIFICATE OF CORRECTION

PATENT NO. : 4,236,964            Page 5 of 7

DATED : December 2, 1980

INVENTOR(S) : Robert W. Bass, Helaman R.P. Ferguson, Harvey J. Fletcher, John H. Gardner, B. Kent Harrison, Kenneth M. Larson It is certified that error appears in the above-identified patent and that said Letters Patent are hereby corrected as shown below:

Column 43, line 14, change "$S = sn\mu$ " to -- $S = snu$ --.

Column 44, line 23, change "$t_D - K^1/_2$" to -- $t_D = -K^1/_2$ --.

Column 44, line 26, change "$t_F = -K^1 - i\mu_0$" to -- $t_F = -K^1 - iu_0$ --.

Column 44, line 31, change "$t_j = - i\mu_0$" to -- $t_J = - iu_0$ --.

Column 44, line 36, change "$t_N = K^1 - i\mu_0$" to -- $t_N = K^1 - iu_0$ --.

Column 44, line 53, change "$\tilde{w}$" to -- $\dot{\tilde{w}}$ --.

Column 50, line 38, change "($0 > t$" to -- ($0 \leq t$ --.

Column 50, line 42, change "$\omega > 0$" to -- $\omega^2 < 0$ --.

Column 50, line 63, change "($0 > \mu < 1$)" to -- ($0 < \mu << 1$) --.

Column 50, line 65, change "($0 > \mu < 1$)" to -- ($0 < \mu << 1$) --.

Column 52, line 66, change " $\mu_0$" to -- $\tilde{\mu}_0$ --.

Column 52, line 67, change "$K_0$" to -- $\tilde{K}_0$ --.

Column 54, line 21, change "$\mu^2$ " to -- $\lambda^2$ --.

Column 54, line 47, change "$\mu^2$ " to -- $\lambda^2$ --.

UNITED STATES PATENT AND TRADEMARK OFFICE
CERTIFICATE OF CORRECTION

PATENT NO. : 4,236,964

DATED : December 2, 1980

INVENTOR(S) : Robert W. Bass, Helaman R.P. Ferguson, Harvey J. Fletcher, John H. Gardner, B. Kent Harrison, Kenneth M. Larson It is certified that error appears in the above-identified patent and that said Letters Patent are hereby corrected as shown below:

Column 56, line 50, change "B=20 tesla" to -- [new ¶] For example, consider a confining field strength of B = 20 tesla --.

Column 57, line 41, change "$\frac{b}{40}$" to -- $\frac{b}{10}$ --.

Column 60, line 27, change "New" to -- Now --.

Column 62, line 33, change "the" to -- that --.

Column 63, line 4, change "methematical" to -- mathematical --.

Column 64, line 5, change "of" to -- to --.

Column 65, line 34, change "observabiltiy" to -- observability --.

Column 67, line 54, change "switcing" to -- switching --.

Column 67, line 63, change "[13,23]" to -- [13.23] --.

Column 68, line 39, change "Topcis" to -- Topics --.

Column 71, line 30, change "as" to -- a --.

Column 73, line 15, changed "characterized" to -- characterized

UNITED STATES PATENT AND TRADEMARK OFFICE
CERTIFICATE OF CORRECTION

PATENT NO. : 4,236,964

DATED : December 2, 1980

INVENTOR(S) : Robert W. Bass, Helaman R.P. Ferguson, Harvey J. Fletcher, John H. Gardner, B. Kent Harrison, Kenneth M. Larson It is certified that error appears in the above–identified patent and that said Letters Patent are hereby corrected as shown below:

by structural stability, comprising the steps of --.

Column 74, line 30, change "toroidal" to -- poloidal --.

Signed and Sealed this

Sixth Day of April 1982

[SEAL]

Attest:

Attesting Officer

GERALD J. MOSSINGHOFF

Commissioner of Patents and Trademarks